United States Patent [19]

Tomonaga et al.

[11] Patent Number: 5,610,913
[45] Date of Patent: Mar. 11, 1997

[54] SWITCHING EQUIPMENT FOR PERFORMING A SWITCHING OPERATION FOR A HIGH-SPEED PACKET IN BROADBAND INTEGRATED SERVICES DIGITAL NETWORK

[75] Inventors: Hiroshi Tomonaga; Naoki Matsuoka; Miwako Watanabe; Satoshi Kuroyanagi; Yutaka Ezaki; Akira Hakata; Ryuichi Takechi; Masaaki Kawai, all of Kawasaki, Japan

[73] Assignee: Fujitsu Limited, Kanagawa, Japan

[21] Appl. No.: 401,032

[22] Filed: Mar. 8, 1995

[30] Foreign Application Priority Data

Mar. 17, 1994 [JP] Japan .................................. 6-047437
Dec. 15, 1994 [JP] Japan .................................. 6-311413

[51] Int. Cl.$^6$ .................................................. H04L 12/56
[52] U.S. Cl. .......................... 370/219; 370/236; 370/253; 370/399; 370/419
[58] Field of Search ................................ 370/60.1, 94.2, 370/13, 16, 54, 110.1

[56] References Cited

U.S. PATENT DOCUMENTS

| | | | |
|---|---|---|---|
| 5,343,462 | 8/1994 | Sekihata et al. | 370/60.1 |
| 5,430,722 | 7/1995 | Jacob et al. | 370/94.1 |
| 5,461,607 | 10/1995 | Miyagi et al. | 370/16 |
| 5,475,696 | 12/1995 | Taniguchi | 371/42 |

OTHER PUBLICATIONS

A. Day, "International Standardization of BISDN", IEEE LTS, Aug. 1991, pp. 7, 13–20.
B. E. Bash et al., "VISTAnet: A BISDN Field Trial", IEEE LTS, Aug. 1991, pp. 22, 25–30.
A. Takahashi et al. "A Broadband Switching System for Public Network" ISS, May 1990, vol. V, pp. 103–109.
K. Hajikano et al., "Asynchronous Transfer Mode Switching Architecture for Broadband ISDN", ICC, Jun. 1988, pp. 0911–0915.
Y. Kato et al, "A VLSIC for the ATM Switching System", ISS, Oct. 1992, vol. III, pp. 27–32.
K. Chipman et al., "High Performance Applications Development for B–ISDN", ISS, Oct., 1992, pp. 22–26.
H. Tomonaga et al., "High-Speed Switching Module for a Large Capacity ATM System", IEEE, Dec., 1992, pp. 123–127.
Y. Doi et al., "A 160 Gbit/s Large–Capacity ATM Switching System using a Dynamic Link Speed Controlled Switch Architecture", IEEE, 1993, pp. 24–28.
Y. Doi et al., "An ATM Switch using Multichip Module Technology", SSE, Nov., 22, 1991, Abstract.
K. Endo et al, "A Full–matrix Large ATM Switch constructed by Small Size Switch Elements with Control Point Switching Scheme", SSE, 1993 Spring, Intro.
S. Sasaki et al., "Multi–chip Module Packaging Technology for Communication Switching Systems", SSE, Nov. 22, 1991, Abstract.
H. Tomonaga et al., "A Structure of Ultrahigh–Speed ATM Switch", SSE, Nov., 1993, Abstract.
H. Tomonaga et al., "A Line Interface Structure for a Large Capacity ATM Switching System", SSE, Apr. 4, 1994, pp. 1–13, cover sheet, 1–6.

*Primary Examiner*—Douglas W. Olms
*Assistant Examiner*—Min Jung

[57] ABSTRACT

Switching equipment in provided for performing a switching process of a fixed length cell consisting of data and a cell header. A line interface provided in the switching equipment accommodates a plurality of lines and, at the same time, processes the data from each line on a cell unit. The line interface includes individual units and a common unit. The individual units are individually connected to the plurality of lines accommodated therein and individually process the cells. The common unit is connected to the individual units and, at the same time, effects batch-processing of the cells processed by the individual units.

38 Claims, 52 Drawing Sheets

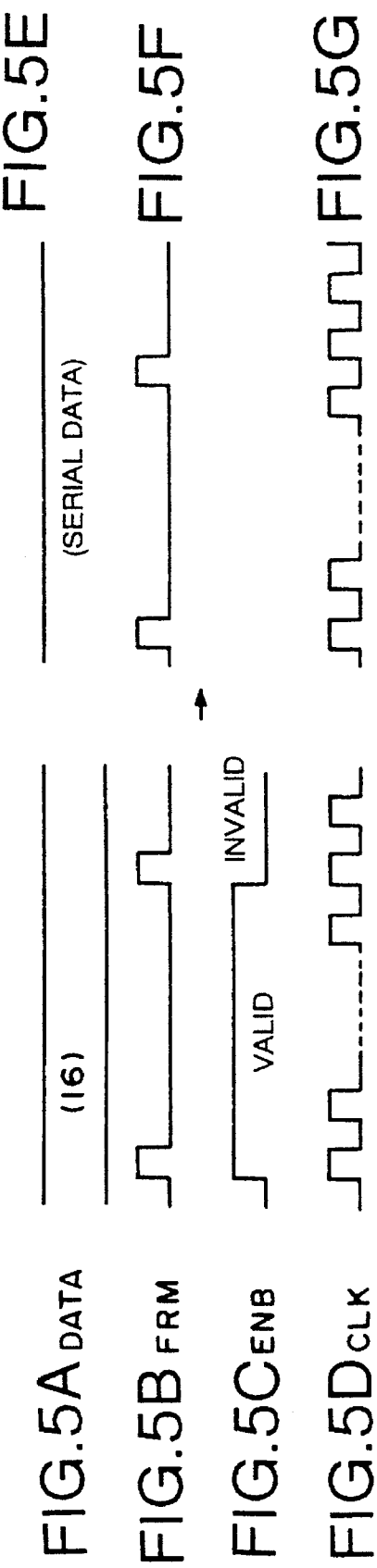

FIG.6A DATA 
FIG.6B FRM 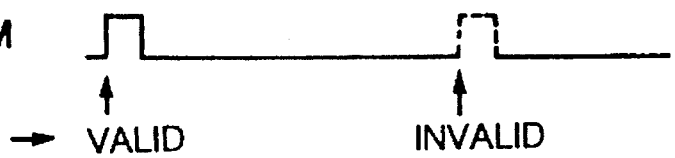
→ VALID    INVALID
FIG.6C CLK 
FIG.7A DATA (4)
FIG.7B FRM
FIG.7C CLK

FIG. 23

| | NUMBER OF VCIs USED | |
|---|---|---|
| VPI | CASE1 | CASE2 |
| 1 TELEPHONE (COMPANY A) | 2 | 3 |
| 2 TELEPHONE (COMPANY B) | 1 | 6 |
| 3 FAX | 3 | 4 |
| 4 TV | 4 | 13 |
| 5 DATA COMMUNICATIONS | 32 | 11 |
| 6 DEDICATED LINE A | 0 | 1 |
| 7 DEDICATED LINE B | 0 | 1 |
| 8 DEDICATED LINE C | 0 | 1 |
| TOTAL | 40 | 40 |

SWITCHING EQUIPMENT FOR PERFORMING A SWITCHING OPERATION FOR A HIGH-SPEED PACKET IN BROADBAND INTEGRATED SERVICES DIGITAL NETWORK

BACKGROUND OF THE INVENTION

The present invention relates to switching equipment for performing a switching operation of a high-speed packet (cell) in a broadband ISDN (Integrated Services Digital Network).

The broadband ISDN (B-ISDN) is capable of offering a variety of multimedia for voices, data and motion pictures. Further, an ATM switching equipment transfers the data on a cell unit in an asynchronous transfer mode (ATM) and is applicable to a wide range of communications from a low speed to a high speed. Accordingly, in the broadband ISDN, lines composed of optical fibers are connected to the ATM switching equipment.

In the early phase of broadband ISDN, a band width that would be employed by a subscriber is in the order of several megabytes per second (Mbps). If there are a small number of subscribers, it is enough that the ATM switching equipment accommodates, e.g., 50 to 100 lines of 150 Mbps lines. Also, if there are a small number of subscribers, as illustrated in FIG. 53, a transmission system 57 provided in front of an ATM switching equipment 100a performs multiple processing. The lines are thereby effectively utilized.

Further, when the transmission system 57 effects the multiplex processing, if a fault occurs in the broadband ISDN, much damage can result. Therefore, as illustrated in FIG. 54, the transmission systems 57, subscriber line interfaces (hereinafter referred to as line interfaces) 103, switches 104 and transit line interfaces 30 are duplicated in an active system and a standby system. Then, if trouble occurs, the switching equipment moves the switching operation from the active system to the standby system.

The line interface 103 is an interface for converting signals transmitted with a synchronous digital hierarchy (SDH) from the subscriber's terminal 101 into an ATM format and transmitting the signals to the switch 104. The switch 104 switches over an internal signal path in order to transmit the generated cells based on the ATM format to one of trunk lines. Herein, in the line interface shown in FIG. 55, a photoelectric (OE/EO) converting portion 11 converts an optical signal from a subscriber's line 53 composed of the optical cable into an electric signal or reversely converts the electric signal into the optical signal.

A synchronous digital hierarchy (SDH) terminal portion 12 of FIG. 55 terminates an SDH format transmitted via the transmission system 57 from the subscriber's terminal. The SDH format is a format in which a width (channel capacity) of the transmission path is divided into hierarchies (several stages), i.e., into physical layers so that the signals can be flexibly transmitted at a high efficiency when multiplexing through the transmission system 57.

FIG. 56 shows the SDH format. An SDH frame is structured such that there are provided nine rows in length, and there are provided a section overhead (SOH) as 9-octet control data and a 261-octet virtual container (VC-4). Based on this frame structure, an SDH basic bit rate is unified into 155.52 Mbits/s.

FIG. 57 illustrates cell mapping to the SDH frame. In FIG. 57, the SDH frame contains path overhead (POH) as an item of control data added to the virtual container. The SDH frame is mapped by an ATM cell consisting of a header and an item of user data.

A cell synchronous portion 13 in FIG. 55 effects cell error control on the basis of header error control data written to cell header and carries out a cell synchronous detection in order to reduce a cell loss due to the fact that a transmission path dot error turns out an ATM cell header error. A usage quantity parameter control (UPC) portion 14 as band management portion manages a band that should be employed by the user by monitoring traffic density.

An accounting portion 15 counts the cells and notifies the processor of data thereof as an item of accounting data. An operation and maintenance (OAM) portion 16 as alarm transfer cell management portion manages an OAM cell (an alarm transfer cell). A monitoring cell (MC) portion 17 monitors cell quality by measuring a cell error characteristic, cell loss characteristic and a cell delay characteristic by use of the MC cell.

A VPI/VCI conversion table 180 stores a virtual channel identifier (VCI) and a virtual path identifier (VPI) that are inputted and an output destination virtual channel identifier and an output destination virtual path identifier in a corresponding relationship.

A VPI/VCI (header) converting portion 18 reads the virtual channel identifier and the virtual path identifier that are written to the cell header. The VPI/VCI converting portion 18 converts the virtual path identifier into the output destination virtual path identifier and further converts the virtual channel identifier into the output destination channel identifier with reference to the VPI/VCI conversion table 180.

An output destination path is determined per cell by these output destination virtual channel and path identifiers. A microprocessor 19 controls the UPC portion 14, the accounting portion 15, the OAM portion 16, the MC portion 17 and the VPI/VCI converting portion 18.

Also, normally, when the switching equipment deals with the ATM cells, as illustrated in FIG. 52A, a cell enable signal ENB serving as an identifier to indicate whether the data cell is valid or invalid, a cell frame signal FRM defined as an identifier indicating a heading of the data cell and a clock pulse CLK are added in parallel to the data cell consisting of parallel signals.

The data cell is composed of, e.g., 16-bit parallel signals. The cell enable signal (ENB) outputs "H" (high) until the next FRM pulse but keeps "L" (low) status during other periods. The cell frame signal (FRM) outputs "H" by only 1 bit in synchronism with the cell heading but keeps the "L" status during other periods.

However, the line interface contains a plurality of large scale integrated lines (LSIs) to perform the above high-level function. Further, when the number of subscribers to the broadband ISDN increases, the line interface also rises in number. This results in a scale-up of the line interfaces.

Moreover, when multiplexing the subscriber's line but effecting no duplication, if the fault is caused in a certain line interface, the line corresponding to this line interface is blocked. This results in the problem that all the multiplexed subscriber's lines can not be used.

Further, when transferring the data cell, 16 signal lines are needed for the data cell of a 16-bit parallel signal, one signal line for the cell frame signal, one signal line for the cell enable signal and one signal line for the clock pulse. Thus, the signal lines total 19. For this reason, there arises the problem that when a plurality of lines are accommodated, the number of signal lines considerably increases.

Further, FIG. 58 schematically illustrates a construction of the ATM switching equipment 100 employed for connecting the subscriber's terminal (TE) 101 to the transmission path in such an ATM system. Referring to FIG. 58, each subscriber's terminal (TE) 101 is connected directly or indirectly via a private branch exchange (PBX) 102 to the line interface 103.

Connected to the line interface 103 there is a switch interface 105 for converting signals transmitted in the synchronous digital hierarchy (SDH) format from the subscriber's terminal (TE) 101 into the ATM format and transmitting the signals to the switch 104.

The switch (SW) 104 switches over the internal signal path to transmit the ATM format based cell generated in the line interface 103 to any transmission path (not shown). Note that the switch interface 105 is an interface between the line interface 103 and the switch (SW) 104.

Also, the switch (SW) 104 is equipped with a plurality of buffers (not shown) for temporarily storing the cells transmitted to the trunk lines. Further, the switch (SW) 104 is duplicated to cope with the fault and can be switched over to either a "0" system switch 104a or a "1" system switch 104b.

Further, in the ATM switching equipment 100, if the line interface 103 breaks down, it is necessary for the line interface 103 to be removed for repair or replacement.

Under these conditions, as illustrated in FIG. 52B, on an input side of the switch interface 105, it follows that all of the data cell, the cell enable signal and the cell frame signal is stacked at "H" or "L" (stacked at "H" in the example of FIG. 52).

In the conventional ATM switching equipment 100, the switch interface 105 simply determines whether a cell is valid or not on the basis of the cell enable signal (ENB) but it is incapable of recognizing that the line interface 103 has been removed.

Accordingly, in the state of 52B, wherein the line interface 103 is removed, it follows that the switch interface 105 concludes that the effective data is still being transmitted.

In this case, the switch interface 105 recognizes all of the header containing the VCI and the user data as the effective data cell consisting of bits of "H". Then, this entity less cell is transmitted to the switch (SW) 104.

Consequently, this entity less cell is written to the buffer, and this buffer includes inaccurate information. Besides, there exists the possibility that the entityless cell can be mixed in with the data cells of other subscribers who select all "H" as VCIs by chance and enters communications of other subscribers that are being accurately carried out.

Up to now, if the line interface breaks down, the line is manually blocked, and thereafter the line interface is removed. Under such circumstances, it is necessary to have a line design such that when the line interface is removed, no adverse influence is exerted on other elements by automatically blocking the line.

It should be noted, as explained above, that high-speed data communications are practicable in the broadband ISDN. Therefore, a single unit of switching equipment is capable of processing a large amount of communication data. Further, even if the number of subscribers increases in the future, it is necessary that communication assets be effectively utilized.

Accordingly, it is required that the number of subscribers accommodated in the single switching equipment be increased. For this purpose, the ATM switching equipment has to incorporate the corresponding number of line interfaces.

This, however, introduces the problem that the scale of each ATM switching equipment 100 must be greatly increased. However, there is a great demand to have the ATM switching equipment 100 use less space for installation thereof.

Therefore, even if the number of the accomodatable subscribers increases, it is necessary that the scale-up of the ATM switching equipment be restricted. Further, even when the line interface remains a single line, it is also necessary to provide a design capable of surely detecting the removal of the line interface. Demanded further is a design capable of preventing the entity less cell from entering the switch portion (SW).

SUMMARY OF THE INVENTION

It is a first object of the present invention to provide switching equipment capable of down-sizing a conventional line interface.

It is a second object of the present invention to provided switching equipment capable of positively detecting that a cell generating portion contained in the line interface has broken down or been removed.

FIG. 1 is a diagram showing the principle of the switching equipment according to an embodiment of the present invention. Such switching equipment performs a switching operation of a fixed length cell consisting of data and a cell header. The switching equipment comprises a line interface 3 for accommodating a plurality of lines and, at the same time, processing the data from each line of a cell unit. The line interface includes individual units 31 and a common unit 32. The individual units are individually connected to the plurality of lines accommodated therein and individually process the cells.

The common unit 32 is connected to the individual units 31 and, at the same time, batch-processes the cells processed by the individual units.

The embodiment of the present invention can still be utilized even when incorporating the following additional constructive elements.

Each of individual units may include a terminal portion, a cell synchronous portion and an interface portion.

The terminal portion terminates the line. The cell synchronous portion, which is connected to the terminal portion, effects cell error control on the basis of header error control data written to the cell header and performs a cell synchronous detection. The interface portion is connected to the cell synchronous portion and, at the same time, transfers the cell to the common unit.

Further, the common unit may include a cell multiplex portion, a band management portion, an accounting portion, an OAM portion, an MC portion, a header converting portion and a control unit. Note that the band management portion may be provided in each individual unit instead of being provided in the common unit.

The cell multiplex portion multiplexes the cell sent from each of the individual units. The band management portion is connected to the cell multiplex portion and, at the same time, manages a band that should be used by a subscriber of a subscriber's terminal by monitoring a flow rate of the cells. Note that the band management portion may be provided in each individual unit.

The accounting portion collects pieces of accounting data by counting the number of the cells. The alarm transfer cell management portion is connected to the band management portion and, at the same time, manages an alarm transfer cell. The monitoring cell (MC) portion is connected to the alarm transfer cell management portion and, at the same time, measures at least one of a cell error characteristic, a cell loss characteristic and a cell delay characteristic by use of a monitoring cell.

The header converting portion is connected to the accounting portion and, at the same time, converts a virtual path identifier and a virtual channel identifier that are written to the cell header into an output destination virtual path identifier and an output destination virtual channel identifier. The control unit controls these portions.

Moreover, the cell synchronous portion adds an identification flag for identifying a self individual unit to the cell header. The common unit performs the cell processing per line on the basis of the identification flag added to the cell header within the cell sent from each of the individual units.

Further, the individual units may include identification flag portions, individually connected to the common unit, for generating identification flags for identifying self individual units in synchronism with the cells.

The common unit performs the cell processing per line on the basis of the identification flags sent from the respective identification flag portions.

The switching equipment further comprises a switching equipment processor connected to the control unit. The switching equipment processor transmits control commands for controlling the individual units to the plurality of individual units through the control unit and fault monitoring commands for monitoring faults of the individual units the processor receives a reply to the command which is transmitted from each of the individual units through the control unit.

The cell in each of the individual units is composed of a data cell in which the data is decomposed to a fixed length, a clock pulse synchronizing with the data cell, a cell enable signal indicating whether the data cell is valid or not and a cell frame signal having a bit indicating a heading of the data cell.

Three signal lines are connected per subscriber's line between each of the individual units and the common unit. The individual unit writes the cell enable signal to the data cell, at the same time, serially transfers the data cell to the common unit via the single signal line among the three signal lines and transfers the clock pulse and the cell frame signal to the common unit via two other signal lines.

Further, the cell synchronous portion may write, to the data cell, the cell enable signal indicating whether or not the data cell is valid.

The cell frame signal indicating the heading of the data cell is employed for indicating whether or not the data cell is valid.

Also, each of the individual units and the common unit include real time processing portions for executing the processing on the cells in real time and processing portions for executing the processing on the cells with the introduction of a time-delay.

The processing portion has a cell extracting portion, a cell processing portion and a cell inserting portion. The cell extracting portion extracts an item of header data and an item of alarm transfer cell data out of the cell. The cell processing portion performs a plurality of processes on the basis of the header data and the alarm transfer cell data that are extracted by the cell extracting portion. The cell inserting portion controls the cell transmitted from the cell extracting portion on the basis of the result of processing by the cell processing portion and, at the same time, inserts the alarm transfer cell data.

Switching equipment according to the present invention performs a switching process of a fixed length cell having data, header data and alarm transfer cell data. The switching equipment comprises a line interface for accommodating a plurality of lines and, at the same time, processing the data from each line on a cell unit.

The line interface includes a first processing portion for executing the processing on the cell in real time and a second processing portion connected to the first processing portion, for executing the processing on the cell with a time delay.

The second processing portion has a cell extracting portion, a cell processing portion and a cell inserting portion. The cell extracting portion extracts the header data and the alarm transfer cell data out of the cell. The cell processing portion performs a plurality of processes on the basis of the header data and the alarm transfer cell data that are extracted by the cell extracting portion.

The cell inserting portion controls the cell transmitted from the cell extracting portion on the basis of the result of processing by the cell processing portion and, at the same time, inserts the alarm transfer cell data.

Herein, the cell processing portion may includes a band management portion, a header converting portion and an alarm transfer cell management portion.

The band management portion manages, when the number of cells exceeds a predetermined quantity on the basis of the header data, a band used by a subscriber by indicating that the cells be disposed of.

The header converting portion converts a virtual path identifier and a virtual channel identifier within the header data into an output destination virtual path identifier and an output destination channel identifier. The alarm transfer cell management portion manages the alarm transfer cell data.

The cell inserting portion disposes of the cells in accordance with the processing by the band management portion, rewrites the header data in accordance with the processing by the header converting portion and inserts the alarm transfer cell data in accordance with the processing by the alarm transfer cell management portion.

The first processing portion may be a cell management portion for measuring a cell error characteristic, a cell loss characteristic and a cell delay characteristic by use of a monitoring cell.

Also, each of the individual units may include a photoelectric converting portion and a cell synchronous portion. The photoelectric converting portion converts an optical signal containing data from a subscriber terminal via a subscriber's line into an electric signal. The cell synchronous portion, which is connected to the photoelectric converting portion, effects cell error control on the basis of header error control data written to the cell header and performs a cell synchronous detection.

The common unit may include a conversion table and a header converting portion. The conversion table stores a virtual path identifier written to the cell header per cell and an output destination virtual path identifier in a corresponding relationship. The header converting portion converts the virtual path identifier written to the cell header into the output destination virtual path identifier with reference to the conversion table.

Herein, the common unit may include a fixed accounting portion for notifying the switching equipment processor of being a fixed accounting subscriber without counting the number of cells. The common unit uses whole bands given to the subscriber's line.

The individual units may include a subscriber individual unit connected to the subscriber's terminal via the subscriber's line and a private branch exchange individual unit connected to another subscriber's terminal via the subscriber's line and a private branch exchange as well.

Each of the subscriber individual unit and the private branch exchange individual unit includes a photoelectric converting portion, a cell synchronous portion, a conversion table and a header converting portion.

The photoelectric converting portion converts the optical signal containing the data coming from the subscriber's terminal via the subscriber's line to an electric signal. The cell synchronous portion, which is connected to the photoelectric converting portion, performs the cell error control on the basis of the header error control data written to the cell header and effects the cell synchronous detection.

The conversion table stores a virtual path identifier and a virtual channel identifier that are written to the cell header per cell, an output destination virtual path identifier and an output destination virtual channel identifier in a corresponding relationship. The header converting portion converts the virtual path identifier and the virtual channel identifier that are written to the cell header into the output destination virtual path identifier and the output destination virtual channel identifier with reference to the conversion table.

The conversion table provided in the subscriber individual unit stores the virtual path identifiers and the virtual channel identifiers, the number of which is less than the number of the virtual path identifiers and virtual channel identifiers, within the conversion table provided in the private branch exchange individual unit.

Further, the header converting portion includes a first conversion table and a second conversion table. The first conversion table stores internal identifiers for regulating all the virtual channel identifiers when simultaneously using the plurality of virtual paths, corresponding to the virtual path identifier and virtual channel identifier that are written to the cell header per cell. The second conversion table stores the output destination virtual path and channel identifiers, corresponding to the internal identifiers.

The header converting portion converts the virtual path identifier and the virtual channel identifier that are written to the cell header into the output destination virtual path identifier and the output destination channel identifier with reference to the first and second conversion tables.

The individual units include active system individual units, one or more standby system individual units and a switching portion. The active system individual unit is connected individually to each of the plurality of subscriber's terminals and, at the same time, generates a fault line identifier when a fault occurs. The switching portion is connected to each of the active and standby system individual units and effects a switchover to any standby system individual unit on the basis of the fault line identifier when the fault is caused in any active system individual unit.

Herein, a plurality of optical signals having different wavelengths are employed for distinguishing an upward direction from a downward direction of the optical signals between the subscriber's terminal and the active system individual unit. Further, each of the subscriber's terminals, the active system individual unit and the standby system individual units includes a wavelength division multiplex portion for dividing and multiplexing the plurality of optical signals having the different wavelengths.

The switching portion may be constructed of a photocoupler for diverting the optical signals from each subscriber's line to the active system individual unit corresponding to the subscriber's line and an optical switch for supplying the standby system individual unit with one optical signal among the optical signals inputted to the photocoupler.

The wavelength division multiplex portion may be constructed of a photocoupler composed of two input terminals and two output terminals and a photo isolator, connected to one terminal of the photocoupler, for transmitting the optical signal in only one direction.

Furthermore, switching equipment according to an embodiment of the present invention, which is connected to the subscriber's terminal, processes the cells and transfers the processed cells to another terminal. The cell is composed of a data cell in which the data is decomposed to a fixed length, a cell enable signal indicating whether this data cell is valid or not and a cell frame signal containing a bit indicating the heading of this data cell.

The switching equipment includes a line interface, a cell transfer portion and a detecting portion. The line interface processes the cell on the basis of the signal from the subscriber's terminal. The cell transfer portion is connected to the line interface and, at the same time, transfers the cell sent from the line interface toward other lines.

The detecting portion is provided in the cell transfer portion and, at the same time, detects whether or not the cell is transmitted from the line interface. The detecting portion detects a change in the cell frame signal added to the cell transmitted from the line interface. It detects that the cell is not yet transmitted when the frame signal does not change for a duration longer than the normal cell periodic time.

The present invention can be carried out in a variety of forms. To start with, the terminal of the subscriber may be a telephone, a facsimile and a computer. Further, the data contained in the signals transmitted therefrom may be voice data and video data.

A relationship between the line interface and the cell transfer portion can be considered for the following cases. In the first case, the line interface is prepared for every subscriber's terminal and performs the processing from the cell processing to the header conversion. In this case, the cell transfer portion is the switch itself.

In a second case, the line interface may be an individual unit of the line interface prepared per subscriber's terminal. The case is such that the line interface effects the cell processing but does not perform the header conversion. A function of the line interface in the first case is diverted, in the second case, into the individual unit of the line interface and the common unit of the line interface as a part of the cell transfer portion. The cell transfer portion is made up of the switch and the common unit of the line interface which incorporates the function to perform the header conversion.

The common unit of the line interface may be employed in common to the plurality of subscriber terminals. Note that the relation between the line interface and the cell transfer portion is not confined to the above-mentioned case but may be considered in a variety of forms.

Further, the line interface may be equipped with a standby system line interface. The standby line interface may be provided for every cell generating portion. There is provided one standby system line interface for the plurality of line interfaces. The line from each line interface may be selectively switched over to the standby system line interface.

If the line interface is removed from the switching equipment or breaks down, the detecting portion determines that the cell is not yet transmitted. Accordingly, even when the detecting portion detects that the line interface breaks down, this does not deviate from the scope of the present invention.

When the detecting portion determines that the cell is not yet transmitted, the cell enable signal may be forcibly set in an invalid status. The line to the subscriber's terminal to which the line interface should be connected may be blocked. Further, in accordance with a result of the detection, the line interface may be switched over to the standby system line interface.

The detecting portion, after determining that the cell is not yet transmitted, detects the transmission of the cell. At this time, it can be determined that switching over to the normal line interface has been carried out. Accordingly, the cell transmission is detected, and a continuity test is automatically started. The continuity test involves the use of test cells. When using the standby system line interface, the continuity test may be conducted with respect to the standby system line interface at a normal time.

Further, the individual units are composed of a plurality of groups. Each group has a plurality of line individual units provided per line. The common unit has a plurality of line common units that is one more than the number of the plurality of groups. The respective line individual units are connected mutually to the respective line common units.

Each of the line common units corresponding to the number of the groups among the plurality of line common units selects the plurality of the corresponding line individual units and processes the cells in common. The remaining single line common unit may be a standby system common unit employed when a fault occurs in one of the line common units.

Further, each of the plurality of line common units includes a fault notifying portion for notifying, when a fault occurs in its own common unit, all the other line common units of a fault identification number. The remaining single line common unit processes the cells from the plurality of corresponding line individual units by effecting a switchover to the single line common unit itself from the fault line common unit on the basis of the fault identification number received from the fault line common unit.

The individual units include a synchronous digital hierarchy individual unit and an asynchronous transfer mode individual unit. The synchronous digital hierarchy individual unit processes the data in a synchronous digital hierarchy format which is transmitted via the lines and, at the same time, generates an identification number indicating the individual unit itself. The asynchronous transfer mode individual unit processes the data in an asynchronous transfer mode format which is transmitted via the lines and, at the same time, generates an identification number indicating the individual unit itself.

The common unit further includes a control unit. The control unit controls the synchronous digital hierarchy individual unit and the asynchronous transfer mode individual unit on the basis of the identification numbers received when at least one of the synchronous digital hierarchy individual unit and the asynchronous transfer mode individual unit is connected.

The control unit performs, when identifying the synchronous digital hierarchy individual unit from the identification number, synchronous digital hierarchy physical layer alarm processing but performs, when identifying the asynchronous transfer mode individual unit, asynchronous transfer mode layer alarm processing.

According to an embodiment of the present invention, the line interface accommodating the plurality of lines is separated into the individual units and the common unit. The individual units are individually connected to each of the plurality of lines accommodated therein and, at the same time, individually perform the cell processing. Then, the common unit batch-processes the cells processed by the individual units.

That is, the common unit batch-processes some of functions of the individual unit provided per line, and hence the down-sizing of the individual units is attained. Especially when the number of the subscribers increases considerably, the effect thereof is large.

Further, in the individual units, there are carried out the photoelectric conversion processing of the data and a cell synchronous detection. In the common unit, the cells from the plurality of individual units are multiplexed, thus effecting the cell processing. The common unit is capable of processing the cell per line in accordance with the identification flag given from each individual unit. The switching equipment processor is capable of controlling the plurality of individual units.

Moreover, the data cell, the clock pulse and the cell frame signal are transferred via the three signal lines, thereby making it possible to reduce the number of the signal lines down to a value smaller than that in the prior art.

Also, the line interface is divided into the first processing portion for executing in real time the processing on the cells containing the header data and the alarm transfer cell data and the second processing portion, connected to the first processing portion, for executing the processing on the cells with the introduction of a time delay.

Then, in the second processing portion, when the cell extracting portion extracts the header data and the alarm transfer cell data out of the cells, the cell synchronous portion performs the plurality of processes on the basis of the header data and the alarm transfer cell data that are extracted by the cell extracting portion. Further, the cell inserting portion controls the cells sent from the cell extracting portion on the basis of the processing result of the cell synchronous portion and, at the same time, inserts the alarm transfer cell data.

That is, in the second processing portion, the cell extracting portion and the cell inserting portion are employed in common with respect to the plurality of processes in the cell synchronous portion, thereby attaining the down-sizing of the line interface.

Further, the line interface accommodates the plurality of lines, and the data is inputted via the lines to the line interface. The optical signal containing the inputted data is converted into the electric signal by the photoelectric converting portion. Then, the cell synchronous portion performs the cell error control on the basis of the header error control data written to the cell header and effects the cell synchronous detection. Furthermore, the conversion table stores the virtual path identifier, the virtual channel identifier that is written to the cell header per cell, the output destination virtual path identifier and the output destination virtual channel identifier in the corresponding relationship.

Next, the header converting portion converts the virtual path identifier and the virtual channel identifier that are written to the cell header into the output destination virtual path identifier and the output destination virtual channel identifier with reference to the conversion table.

That is, the line interface is constructed to directly accommodate the lines, and, hence, even if trouble happens in any line, only the relevant line is blocked.

Further, since only the virtual path is offered as a service, it is unnecessary for the conversion table to store the data of the virtual channel identifier. It is thus possible to reduce the memory capacity by a data quantity of the virtual channel identifier.

Also, in the switching equipment, the signal from the subscriber's terminal is converted into the cell composed of the data cell in which the data contained in the above signal is decomposed to the fixed length in the line interface, the cell enable signal indicating whether this data cell is valid or not and the cell frame signal having the bit indicating the heading of the data cell. The cell is transferred to the cell transfer portion. If the line interface is normal, the cell transfer portion transfers the cell toward the destination subscriber's terminal.

If the line interface breaks down or is removed, the detecting portion detects that the cell fame signal does not change for a duration longer than the normal cell periodic time, thus detecting that the cell is not yet transmitted. Accordingly, it is feasible to accurately detect that the cell is not yet transmitted.

Further, a variety of control operations can be carried out in accordance with a result of this detection. For instance, the cell enable signal is forcibly brought into the invalid status, thereby preventing a mistake that the cell is to be transmitted. Furthermore, it is possible to block the line to the subscriber's terminal connected to the line interface. Also, the line interface can be switched over to the standby system line interface.

Moreover, if the trouble happens in one of the line common units, the remaining single line common unit is employed as a standby system common unit, and, therefore, the cells of the plurality of lines can be processed. Further, any common unit can be employed as a standby system common unit, and consequently the fault common unit can be easily replaced.

Furthermore, the remaining single line common unit is switched over to the common unit itself from the fault common unit on the basis of the fault identification number received from the fault common unit. Therefore, the cells from the plurality of line individual units can be processed.

Also, the common unit is capable of, when the synchronous digital hierarchy individual unit or the asynchronous transfer mode individual unit is connected, controlling the synchronous digital hierarchy individual unit and the asynchronous transfer mode individual unit on the basis of the identification numbers.

Furthermore, the control unit is capable of performing the synchronous digital hierarchy physical layer alarm processing or the ATM layer alarm processing on the basis of the identification numbers.

BRIEF DESCRIPTION OF THE DRAWINGS

Other objects and advantages of the present invention will become apparent during the following discussion in conjunction with the accompanying drawings, in which:

FIG. 5 including FIGS. 5A and 5B illustrates waveforms of an example of a serial transfer of a data cell; FIG. 5A is a waveform showing parallel data; FIG. 5B is a diagram showing serial data;

FIG. 6 is a waveform showing a second example of the serial transfer of the data cell;

FIG. 7 is a waveform showing a third example of the serial transfer of the data cell;

FIG. 23 is a diagram showing a usage example of a VPI/VCI;

FIG. 52 including FIG. 52A is a diagram showing the cell at the normal time; FIG. 52B is a diagram illustrating the cell when the line interface or the individual unit is removed;

DETAILED DESCRIPTION OF THE PREFERRED EMBODIMENTS

Figure 2:
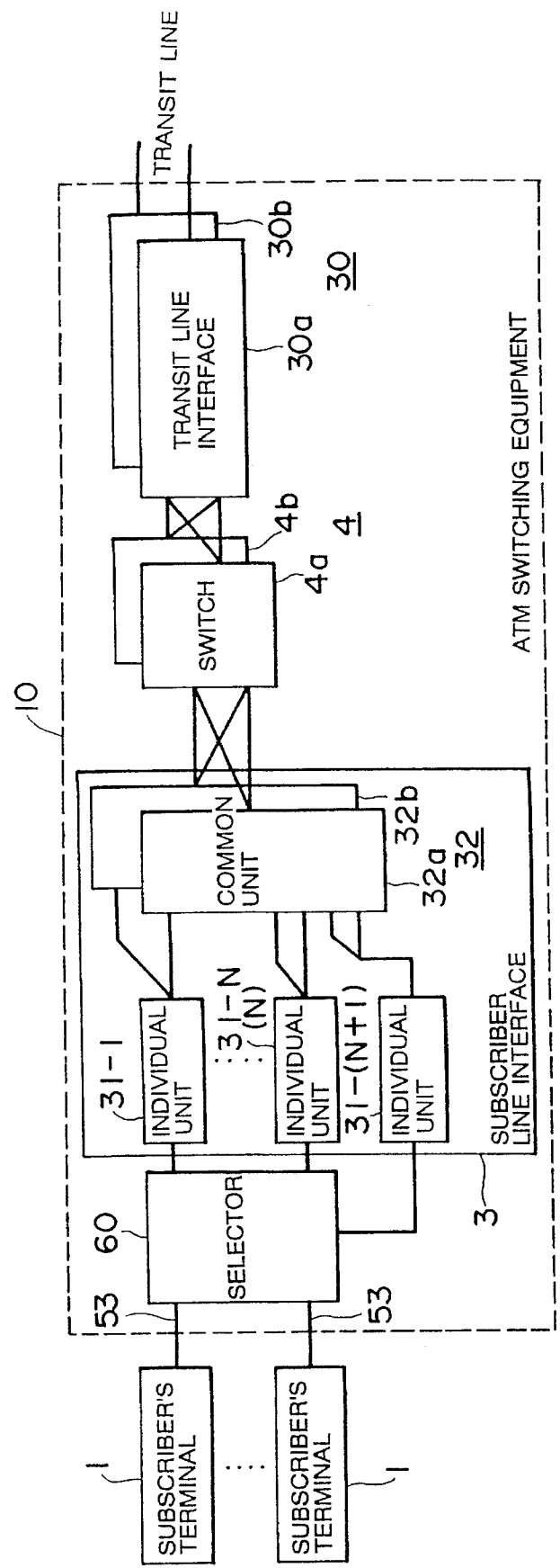
FIG. 2 is a block diagram illustrating a configuration of a first embodiment of a first ATM switching equipment according to the present invention.

Embodiments of an ATM switching equipment according to the present invention will hereinafter be described. FIG. 2 is a block diagram illustrating a configuration of the ATM switching equipment in an embodiment 1 of the present invention.

The ATM switching equipment 10 shown in FIG. 2 includes a selector 60 connected to a plurality of subscriber's terminals 1, a line interface 3 connected to the selector 60, a switch 4 connected to the line interface 3 and a transit line interface 30 connected to the switch 4.

The line interface 3 provides an interface for converting signals sent with a synchronous digital hierarchy (SDH) from the subscriber's terminals 1 in an ATM format and transmitting the signals to the switch 4. The switch 4 switches an internal signal path to transmit a generated cell based on the ATM format to one of a plurality of trunk lines.

The line interface 3 includes individual units 31-1 to 31-N of a 0 system (active system) and one individual unit 31-(N+1) of a 1 system (standby system) and one common unit 32.

The individual units 31-1 to 31-N are individually connected via subscriber's line 53 to the plurality of subscriber's terminals 1 and, at the same time, individually perform cell processing. The common unit 32 is connected to all these individual units and, at the same time, batch-processes the cells processed in the individual units 31.

The selector 60 sets the subscriber's line 53 corresponding to the plurality of subscriber's terminals 1 in the plurality of 0-system individual units 31-1 to 31-N and, at the same time, if some problem occurs, switches over the affected individual unit to a 1-system individual unit. The common unit 32 includes a 0-system common subunit 32a and a 1-system common subunit 32b.

The switch 4 consists of a 0-system switch 4a and a 1-system switch 4b. The transit line interface 30 is constructed of a 0-system transit line interface 30a and a 1-system transit line interface 30b.

Thus, the ATM switching equipment is based on a dual construction. Accordingly, if a problem arises, each element is switched from the 0-system to the 1-system. With this processing, communication troubles can be avoided. In particular, the common unit 32 batch-processes the cells given from the individual units and, therefore, if the problems occurs in the common unit, this is clearly evident by the in switching to the 1-system common unit.

Figure 3:
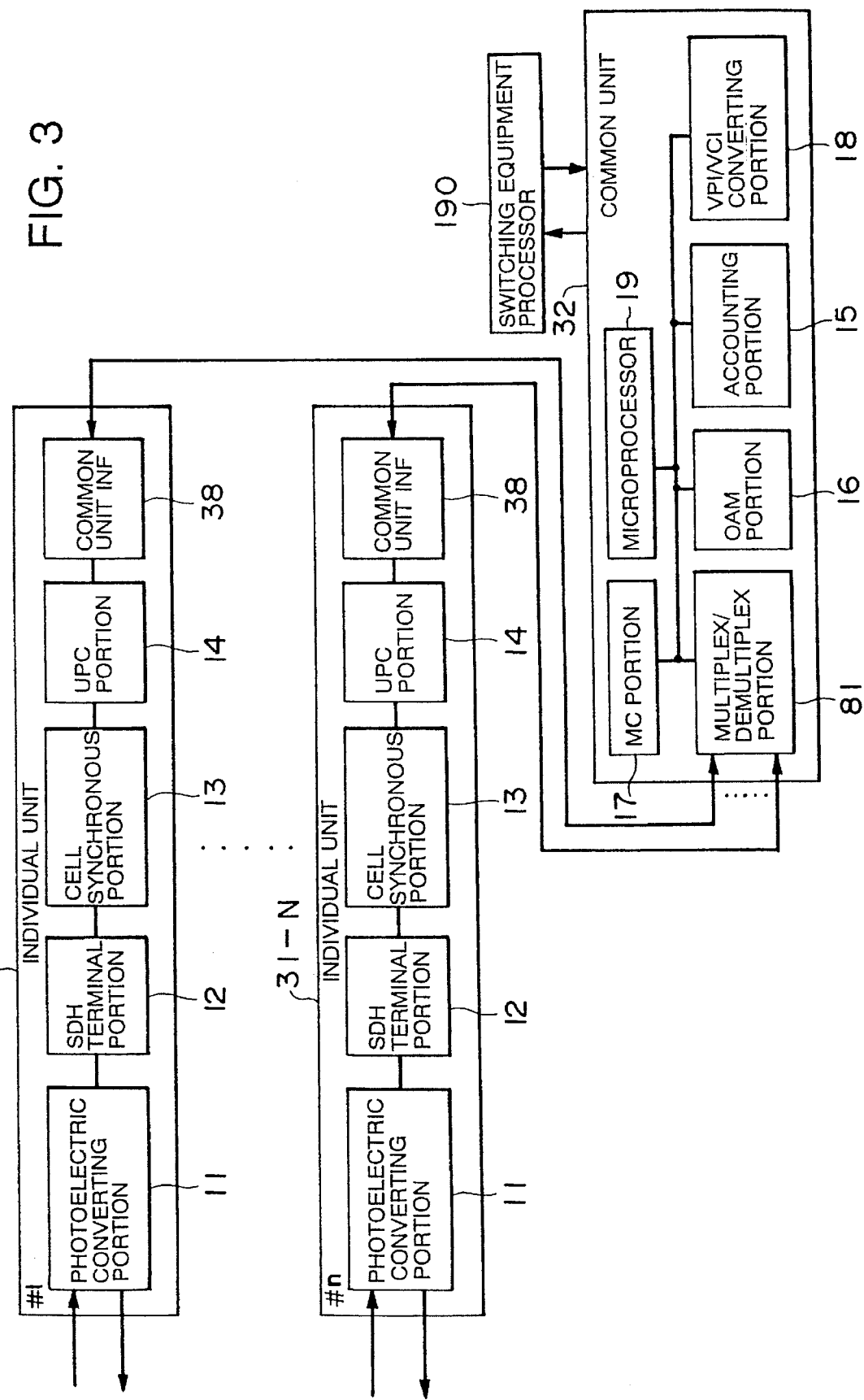
FIG. 3 is a block diagram illustrating a separate configurational example of a line interface within the ATM switching equipment shown in FIG. 2.

FIG. 3 is a block diagram showing a separate configuration example of the line interface within the ATM switching equipment illustrated in FIG. 2. That is, the line interface 3 is separated into the individual units and the common unit. Referring to FIG. 3, the line interface 3 is constructed of a plurality of 0-system individual units 31-1 through 31-N and the 0-system common unit 32, connected to the plurality of individual units 31, for batch-processing the cells processed in the plurality of individual units 31, respectively.

The individual units 31-1 to 31-N convert data transmitted from the subscriber's terminals 1 on the cell unit and transfer the data to the common unit 32.

Each of the individual units 31-1 to 31-N is constructed of a photoelectric converting portion 11, an SDH terminal portion 12 connected to the photoelectric converting portion 11, a cell synchronous portion 13 connected to the SDH terminal portion 12, a UPC portion 14 connected to the cell synchronous portion 13 and a common interface (INF) 38 connected to the UPC portion 14 and the common unit 32 as well.

The photoelectric converting portion 11 converts optical signals from the subscriber's line 53 each composed of a optical cable into electric signals or inversely converts the electric signals into optical signals. The SDH terminal portion 12 terminates the SDH format sent from the subscriber's terminal 1.

The cell synchronous portion 13 performs cell error control on the basis of header error control data written to a cell header and effects a cell synchronous detection.

The UPC portion 14 manages a band to be used by the subscriber by monitoring traffic density. The common INF 38 transfers the cell data to the common unit 32.

The common unit 32 transfers the cells from the plurality of individual units 31-1 through 31-N to the switch 4 as shown in FIG. 2. The common unit 32 includes a multiplex/demultiplex portion 81, an OAM portion 16, an MC portion 17, an accounting portion 15, a VPI/VCI converting portion 18 and a microprocessor 19.

The multiplex/demultiplex portion 81 multiplexes the cells sent from the individual units 31-1 to 31-N or demultiplexes the cells with respect to the individual units 31.

The accounting portion 15 collects pieces of accounting data by counting the number of the cells inputted. The OAM portion 16 manages an OAM cell (alarm cell). The MC portion 17 monitors a cell quality by measuring a cell error characteristic, a cell loss characteristic and a cell delay characteristic by use of MC cells.

The VPI/VCI converting portion 18 reads a VPI/VCI from the cells inputted, converts this VPI/VCI into a new output destination VPI/VCI corresponding to the former VPI/VCI.

The microprocessor 19 controls the multiplex/demultiplex portion 81, the accounting portion 15, the OAM portion 16, the MC portion 17 and the VPI/VCI converting portion 18.

A switching equipment processor 190 is connected to the microprocessor 19. The switching equipment processor 190 notifies the individual units 31-1 through 31-N of a control command for controlling the individual units 31-1 through 31-N and a trouble monitoring command for monitoring troubles in the individual units 31-1 through 31-N.

In the discussion given above, the cell is transferred from the subscriber's terminal 1 via the line interface 3 to the switch 4. In the reverse order to this, the cell may be transferred from the switch 4 via the line interface 3 to the subscriber's terminal 1.

According to such a construction, the OAM portion 16 the MC portion 17 and the VPI/VCI portion 18 incorporated into the common unit 32 are employed in common for the individual units 31-1 through 31-N, and, therefore, downsizing of the line interface 3 is attained.

Further, the operation of the switching equipment processor 190 is carried out in the procedures which follow. To start with, the switching equipment processor 190 transmits the control command and the trouble monitoring command to the microprocessor 19, which receives these commands. The microprocessor 19 analyzes which individual unit is to receive the command and transmits the control command or the trouble monitoring command to the corresponding individual unit.

Next, when the individual unit receiving the command transmits a reply (status) to the command to the microprocessor 19, the microprocessor 19 sends this replay back to the switching equipment processor 190.

That is, the switching equipment processor 190 is capable of controlling the individual units 31-1 through 31-N through the microprocessor 19.

Figure 4:
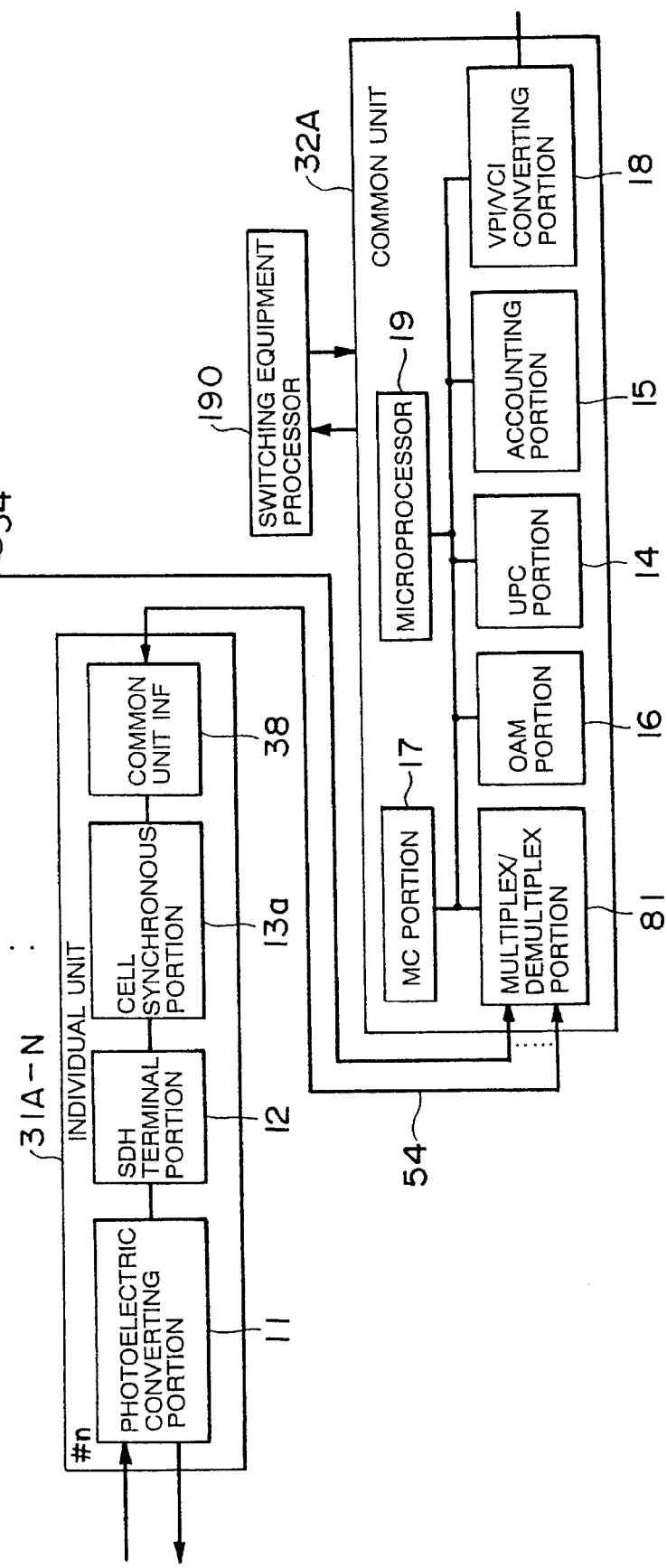
FIG. 4 is a block diagram showing a separate configurational embodiment of the line interface.

FIG. 4 is a block diagram illustrating a separate configuration example 2 of the line interface. In contrast with the separate configuration example 1 shown in FIG. 3, the separate configuration example 2 provides the common unit with the UPC portion 14 but removes the UPC portion 14 from each of the individual units 31-1 through 31-N.

More specifically, each of the individual units 31A-1 through 31A-N is constructed of the photoelectric converting portion 11, the SDH terminal portion 12 connected to the photoelectric converting portion 11, a cell synchronous portion 13a connected to the SDH terminal portion 12 and a common INF 38 connected to cell synchronous portion 13a. The common unit 32A is constructed of the multiplex/demultiplex portion 81, the accounting portion 15, the UPC portion 14, the OAM portion 16, the MC portion 17, the VPI/VCI converting portion 18 and the microprocessor 19 for controlling these portions. The switching system processor 190 is connected to the common unit 32A.

The cell in each of the individual units 31A-1 to 31A-N consists of a data cell in which the data is decomposed to a fixed length, a clock pulse synchronizing with the data cell, a cell enable signal indicating whether the data cell is valid or not and a cell frame signal having a bit indicating a heading of the data cell.

Further, three signal lines 54 are connected between each of the individual units 31A-1 through 31A-N and the common unit 32A per the individual unit. Referring to FIG. 4, the single signal line 54 is shown for simplicity. As illustrated in FIG. 5B, the data cell is transferred in the form of a serial signal (serial data) to the common unit via one of these three signal lines 54.

The remaining two signal lines serve to transfer a cell frame signal FRM defined as an identifier indicating a heading of the cell and a clock pulse CLK synchronizing with the data cell to the common unit 32A. The cell frame signal FRM outputs "H" by only one bit in synchronism with the cell heading but keeps an "L" status during a period other than the above-mentioned.

The cell synchronous portion 13a performs the processing shown in the separate configuration example 1 and at the same time writes, to within the header, the cell enable signal ENB defined as an identifier indicating whether the cell is valid or not. The cell enable signal ENB, if the cell is valid, outputs "H" and "L" if the cell is invalid.

Note that other constructions are the same as those in the separate configuration example 1, and hence their details will be omitted.

According to this construction, there is attained more down-sizing of the individual units 31A-1 through 31A-N than in the separate configuration example 1 since the UPC portions 14 have been removed from the individual units.

Figure 52A:
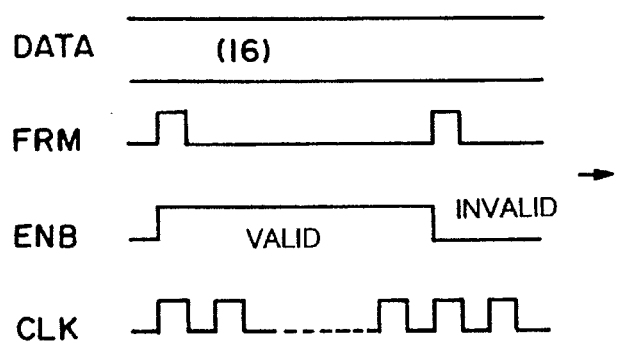
FIGS. 52A and 52B is a signal diagram illustrating a cell structure.

Further, the data cell is transferred via the single signal line 54, and, therefore, the number of the signal lines is less by fifteen than the number of the signal lines in the conventional parallel transfer shown in FIG. 5A, i.e., in FIG. 52A. Further, as the cell enable signal is written to the header, the signal lines 54 for the cell enable signals are eliminated.

That is, the data cell, the clock pulse and the cell frame signal are transferred through the three signal lines 54, and hence the number of the signals lines is less by sixteen than the nineteen signal lines 54 employed in the conventional parallel transfer.

Accordingly, when a plurality of lines are accommodated, the number of the signal lines is greatly reduced having a large effect on the size of the line.

Note that the cell enable signal written to the header works to distinguish whether the data cell is valid or invalid in the example given above. For instance, as illustrated in FIG. 6, whether the data cell is valid or not may be distinguished depending on the existence or non-existence of the frame signal indicating the heading of the data cell. In this case, the frame signal consists of "H" indicating the validness of the frame or "L" indicating the invalidness of the frame.

As mentioned previously, the cell enable signal (ENB) outputs "H" (high) status until the next frame pulse (FRM) but keeps "L" (low) status during other periods. It is possible to multiplex the enable signal into the frame signal. In this way the cell top can be discriminated by the resulting pulse outputting "H" for two bits when the cell is valid and outputting "H" for only one bit when the cell is invalid. Since the frame pulse would now be outputted periodically, it is possible to discriminate the taking out and putting in of the package based on the frame pulse.

Furthermore, if line speed increases, the data cell can not be serially transferred via the single signal line. In this case, a plurality of signal lines are prepared corresponding to the line speed, and the data cells may be transferred in parallel through the respective signal lines. For instance, if the line speed is 156 Mbps, the data cell is serially transferred via the single signal line. When line speed increases up to 600 Mbps, as illustrated in FIG. 7, the data cells are transferred in parallel via four signal lines.

Figure 8:
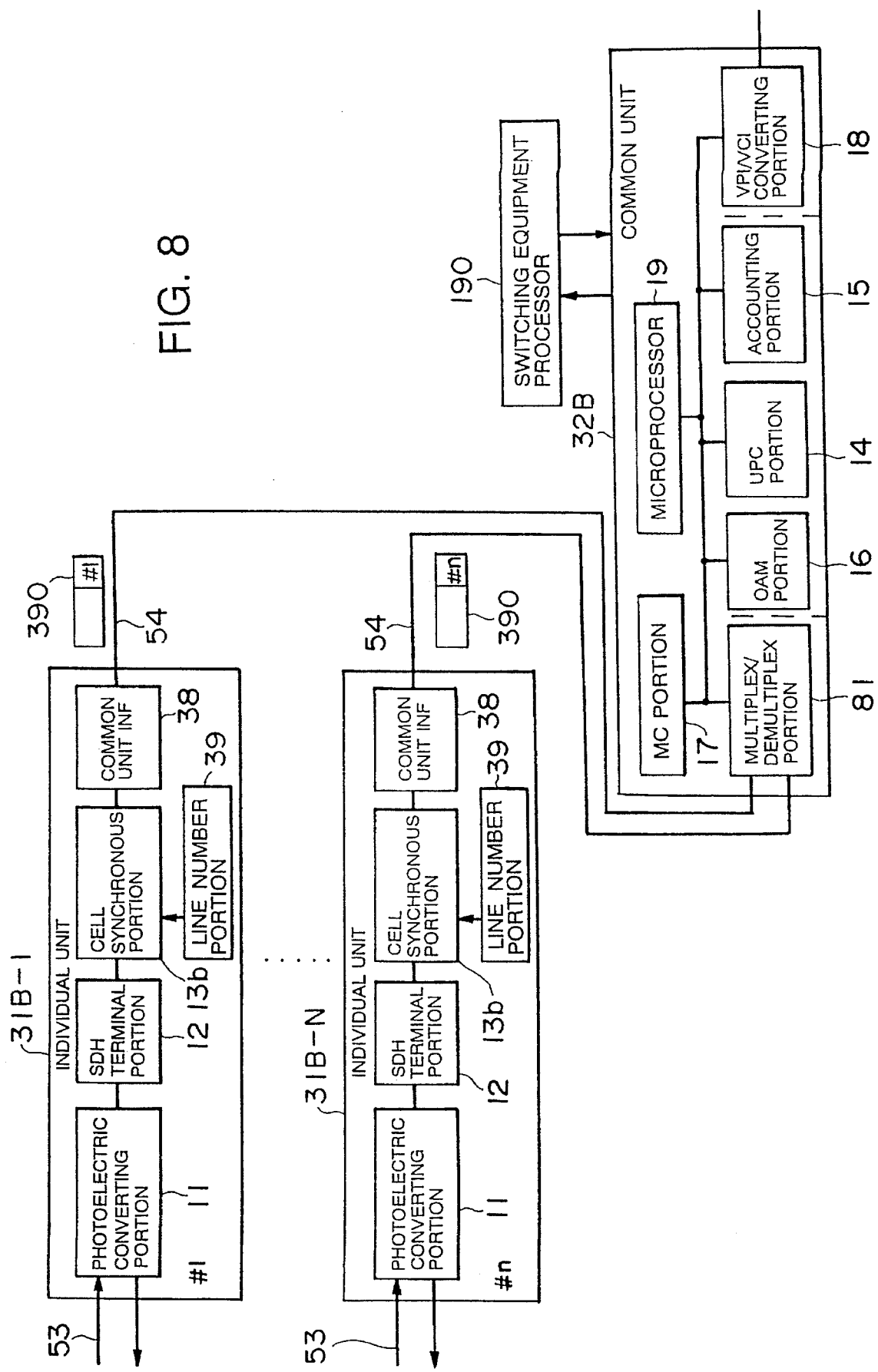
FIG. 8 is a block diagram illustrating a further configurational embodiment of the line interface.

FIG. 8 is a block diagram illustrating a separate configuration example 3 of the line interface. In the separate configuration example 3, each of the individual units 31B-1 through 31B-N is constructed of the photoelectric converting portion 11, the SDH terminal portion 12 connected to the photoelectric converting portion 11, a cell synchronous portion 13b connected to the SDH terminal portion 12, a line number portion 39 for generating line numbers of the subscriber's line 53 connected to the self individual units and the common INF 38 connected to cell synchronous portion 13b.

The common unit 32B is constructed of the multiplex/demultiplex portion 81, the accounting portion 15, the UPC portion 14, the OAM portion 16, the MC portion 17, the VPI/VCI converting portion 18 and the microprocessor 19 for controlling these portions. The switching system processor 190 is connected to the common unit 32B.

The line number portion 39 is connected to the cell synchronous portion 13b which, in turn, adds a line number 390 generated by the line number portion 39 to the cell header in the form of an identification flag.

The common unit 32B performs the cell processing per line on the basis of the line number 390 added to the cell header within the cell sent from each of the individual units 31B-1 through 31B-N.

According to such a construction, the line number portion 39 provided in each individual unit adds the line number 390 to the cell header and transfers it to the common unit 32B. The common unit 32B is capable of, while referring to the respective line numbers, distinguishing which line to transfer each of the data cells inputted.

Figure 9:
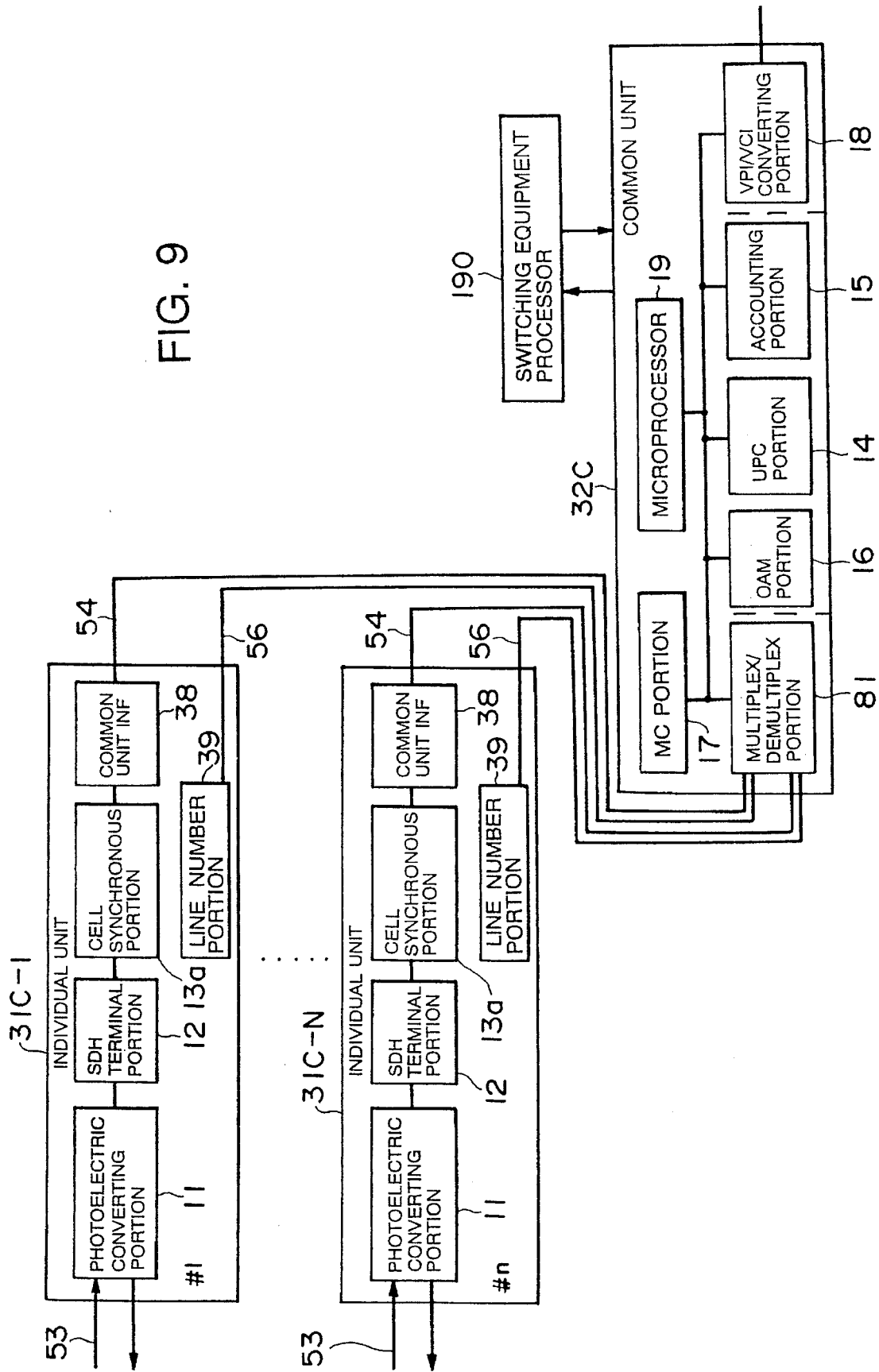
FIG. 9 is a block diagram showing another configurational embodiment of the line interface.

FIG. 9 is a block diagram illustrating a separate configuration example 4 of the line interface. In the separate configuration example 4, each of the individual units 31C-1 through 31C-N is constructed of the photoelectric converting portion 11, the SDH terminal portion 12, the cell synchronous portion 13a, the line number portion 39 for generating line numbers of the subscriber's line 53 connected to the self individual units and the common INF 38.

The common unit 32C is constructed of the multiplex/demultiplex portion 81, the accounting portion 15, the UPC portion 14, the OAM portion 16, the MC portion 17, the VPI/VCI converting portion 18 and the microprocessor 19 for controlling these portions. The switching system processor 190 is connected to the common unit 32C.

The line number portion 39 provided in each individual unit is connected via a signal line 56 to the multiplex/demultiplex portion 81. The common unit 32C effects the cell processing per line on the basis of the line numbers 390 sent from the line number portions 39 provided in the individual units 31C-1 through 31C-N.

That is, the line number 390 generated in the line number portion 39 is transferred as an identification flag directly to the common unit 32C, and hence the same effect as the above-discussed separate configuration example 3 is obtained.

The embodiment discussed above has presented the example where the line interface in the ATM switching equipment is separated into a common unit and individual units. Given next is an explanation of an example where the line interfaces are provided corresponding to the subscriber's line.

Figure 10:
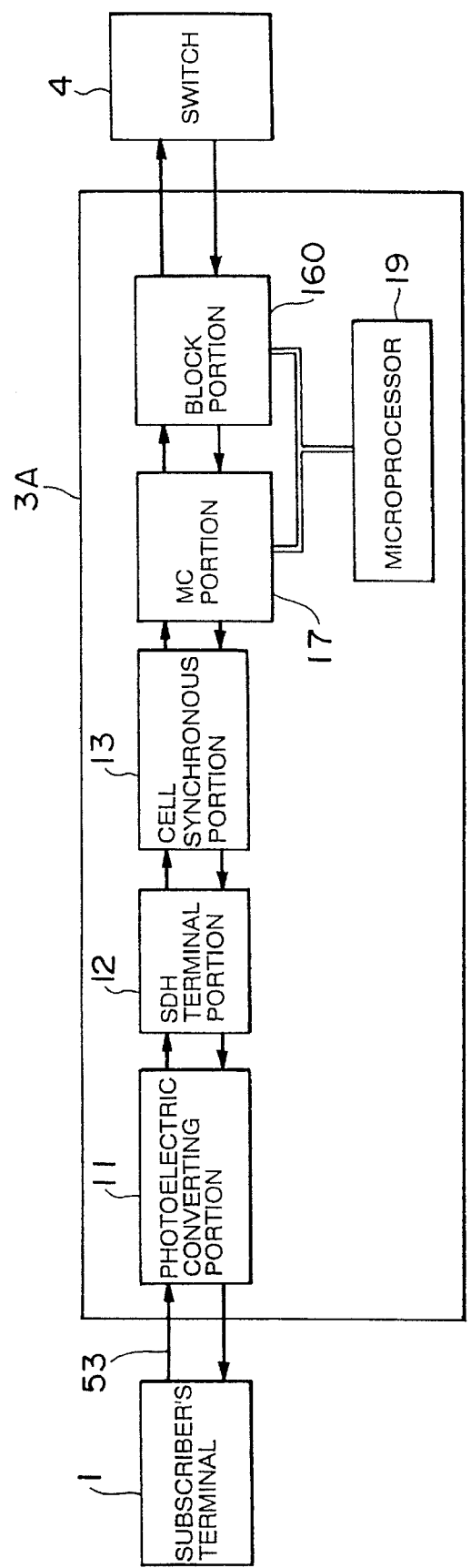
FIG. 10 is a block diagram showing still another configurational embodiment of the line interface.

FIG. 10 illustrates another configuration example of the line interface. One subscriber's terminal 1 is connected via the subscriber's line 53 to this line interface 3A. The switch 4 is connected to an output of the line interface 3A. That is, this line interface 3A is provided corresponding to one subscriber's terminal 1.

Herein, the line interface 3A is characterized by a separation into a processing unit for processing the cells in real time and a processing unit for processing the cells while permitting a time delay.

The line interface 3A includes the photoelectric converting portion 11, the SDH terminal portion 12, the cell synchronous portion 13, the MC portion 17 connected to the cell synchronous portion 13, a block portion 160 connected to the MC portion 17 and the microprocessor 19. The microprocessor 19 controls the MC portion 17 and the block portion 160 as well.

The MC portion 17 monitors the cell quality by measuring the cell error characteristic, the cell loss characteristic and the cell delay characteristic by use of the MC cells. For this purpose, the MC portion 17 is required to make an extraction timing and an insertion timing of the MC cell coincident with each other. That is, the MC portion 17 processes the MC cells in real time.

The block portion 160 provides blocked processes permissible even when there is a deviation between the extraction and insertion timings of an item of header data and an OAM cell.

The block portion 160 blocks, e.g., the UPC portion 14, the accounting portion 15, the OAM portion 16 and a header conversion portion 18.

Figure 11:
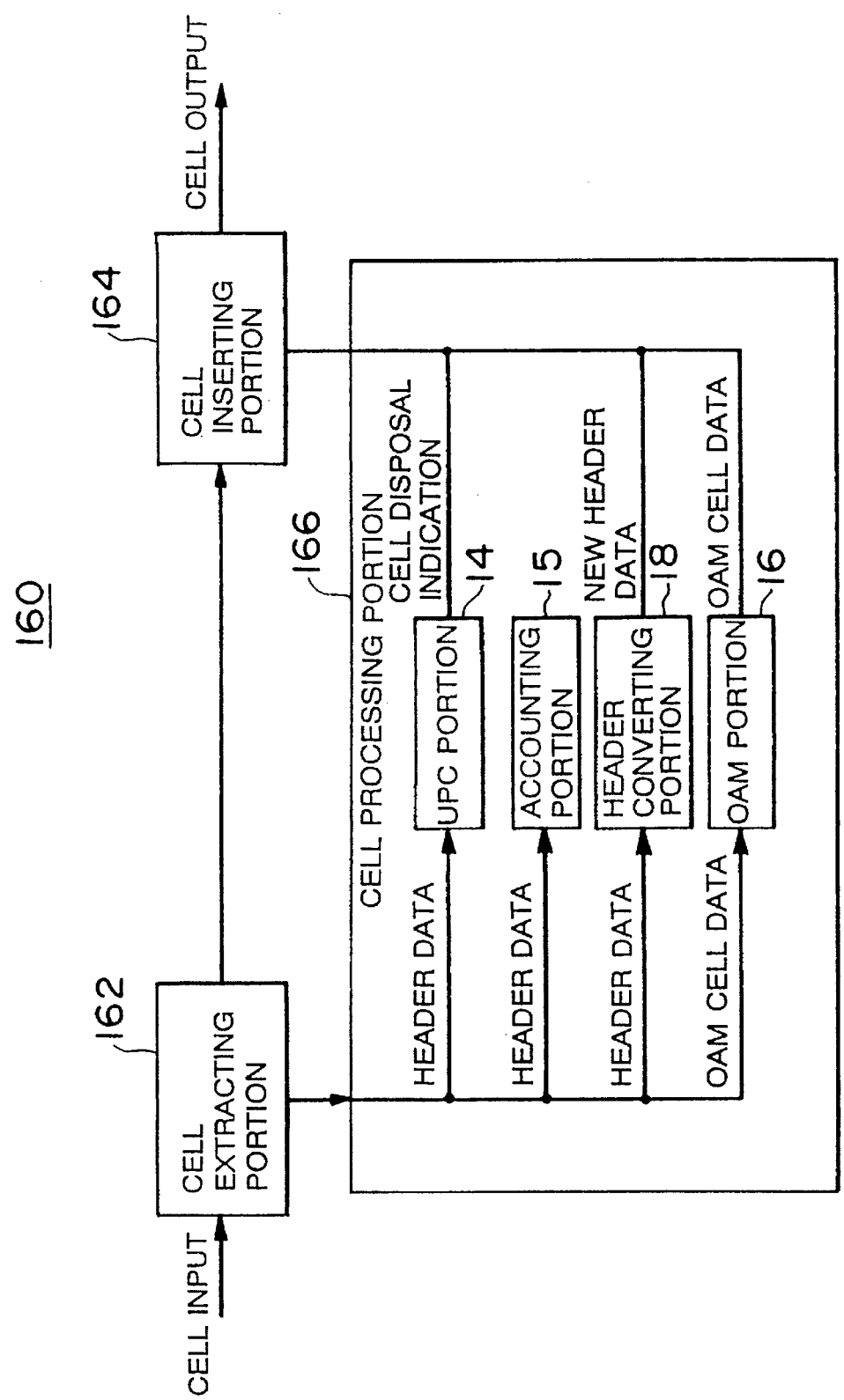
FIG. 11 is a block diagram illustrating a configuration of a block portion within the line interface illustrated in FIG. 10.

FIG. 11 illustrates a specific configuration of the block portion. The block portion 160 includes a cell extracting portion 162, a cell inserting portion 164 connected to the cell extracting portion 162 and a cell processing portion 166 connected to the cell extracting portion 162 and the cell inserting portion 164. The cell extracting portion 162 extracts the header data and a preset item of specific OAM cell data from the cells inputted and outputs these items of data to the cell processing portion 166.

The cell processing portion 166 is constructed of the UPC portion 14, the accounting portion 15, the header conversion portion 18 and the OAM portion 16. The cell processing portion 166 is constructed so that each element of the cell processing portion 166 uses the cell extracting portion 162 and the cell inserting portion 164 in common.

The UPC portion 14 inputs the header data extracted by the cell extracting portion 162 and determines whether or not an inflow of the cells is permitted on the basis of this item of header data. The UPC portion 14, if the cell inflow should not be permitted, indicates to the cell inserting portion 164 to dispose of the cells.

The accounting portion 15 inputs the header data extracted by the cell extracting portion 162 and counts the number of cells on the basis of this item of header data, thereby collecting pieces of accounting data.

The header conversion portion 18 inputs the header data extracted by the cell extracting portion 162, converts this item of header data into a new item of header data and output the thus converted header data to the cell inserting portion 164.

The OAM portion 16 inputs the OAM cell data extracted by the cell extracting portion 162 and performs both cell receive processing and a creation of the OAM cells with respect to this item of OAM cell data.

The cell inserting portion 164 disposes of the cells in conformity with the cell loss indication sent from the UPC portion 14 within the cell processing portion 166. The cell inserting portion 164 re-adds the new item of header data to the cell header in accordance with the new header data sent from the header conversion portion 18 within the cell processing portion 166. The cell inserting portion 164 inserts the OAM cell in accordance with the OAM cell data sent from the OAM portion 16 within the cell processing portion 166.

The operations given above are those on the upstream side from the subscriber's terminal 1 to the switch 4.

Figure 12:
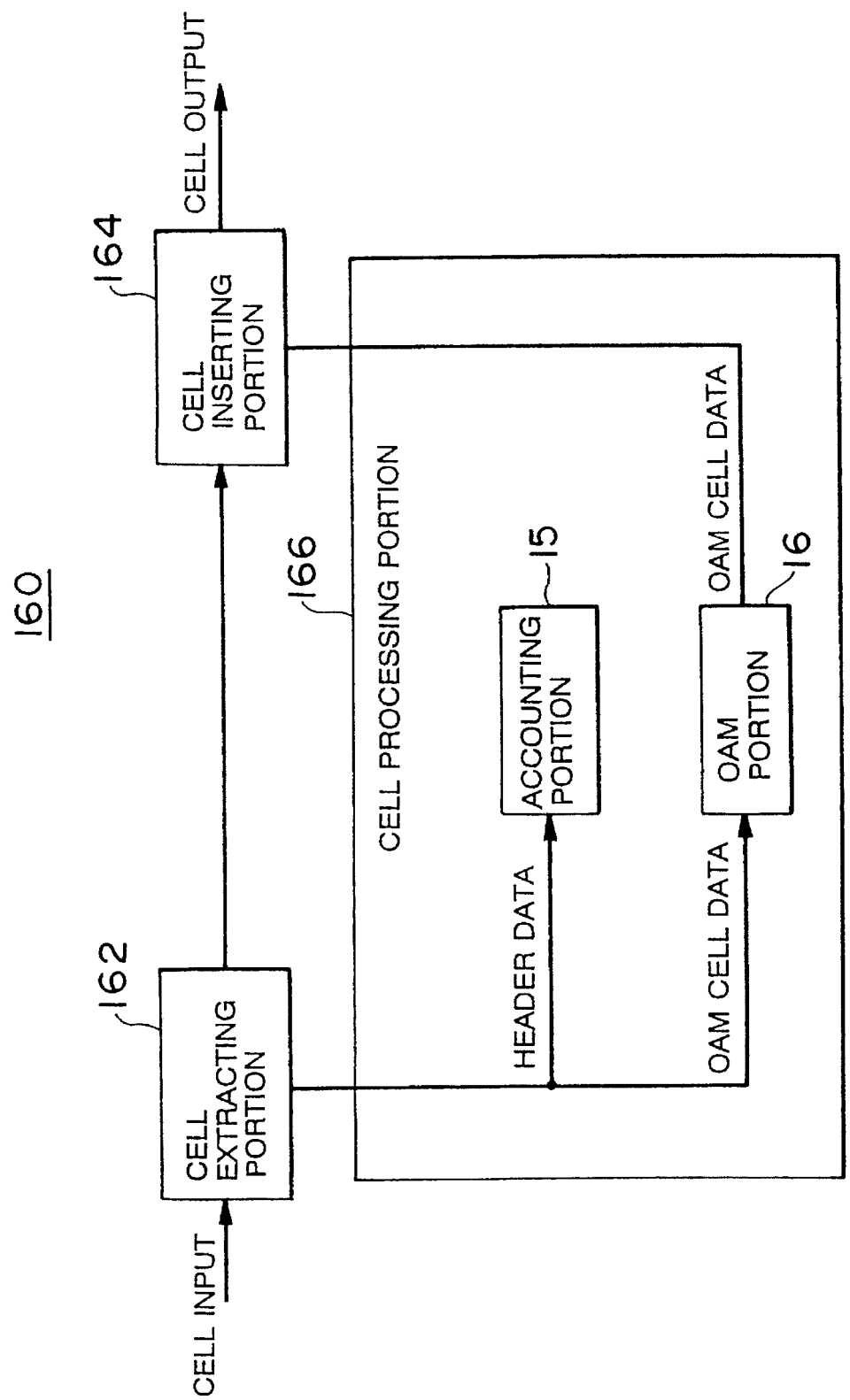
FIG. 12 is a block diagram illustrating another configuration of the block portion.

Note that only the accounting portion 15 and the OAM portion 16 operate on the downstream side from the switch 4 to the subscriber's terminal 1 as shown in FIG. 12. In this case, the UPC portion 14 and the header conversion portion 18 do not operate.

In accordance with the embodiment illustrated in FIG. 10, the line interface 3A is separated into the MC portion 17 for demanding a coincidence of the extraction and insertion timings of the MC cells and the block portion 160 in which there is permitted some deviation between the extraction timing and the insertion timing of the header data and the OAM cell data. Then, the UPC portion 14, the accounting portion 15, the header conversion portion 18 and the OAM portion 16 that are provided in the block portion 160 employ the single cell extracting portion 162 and the single cell inserting portion 164 in common, thereby attaining the desired down-sizing of the line interface 3A.

Figure 13:
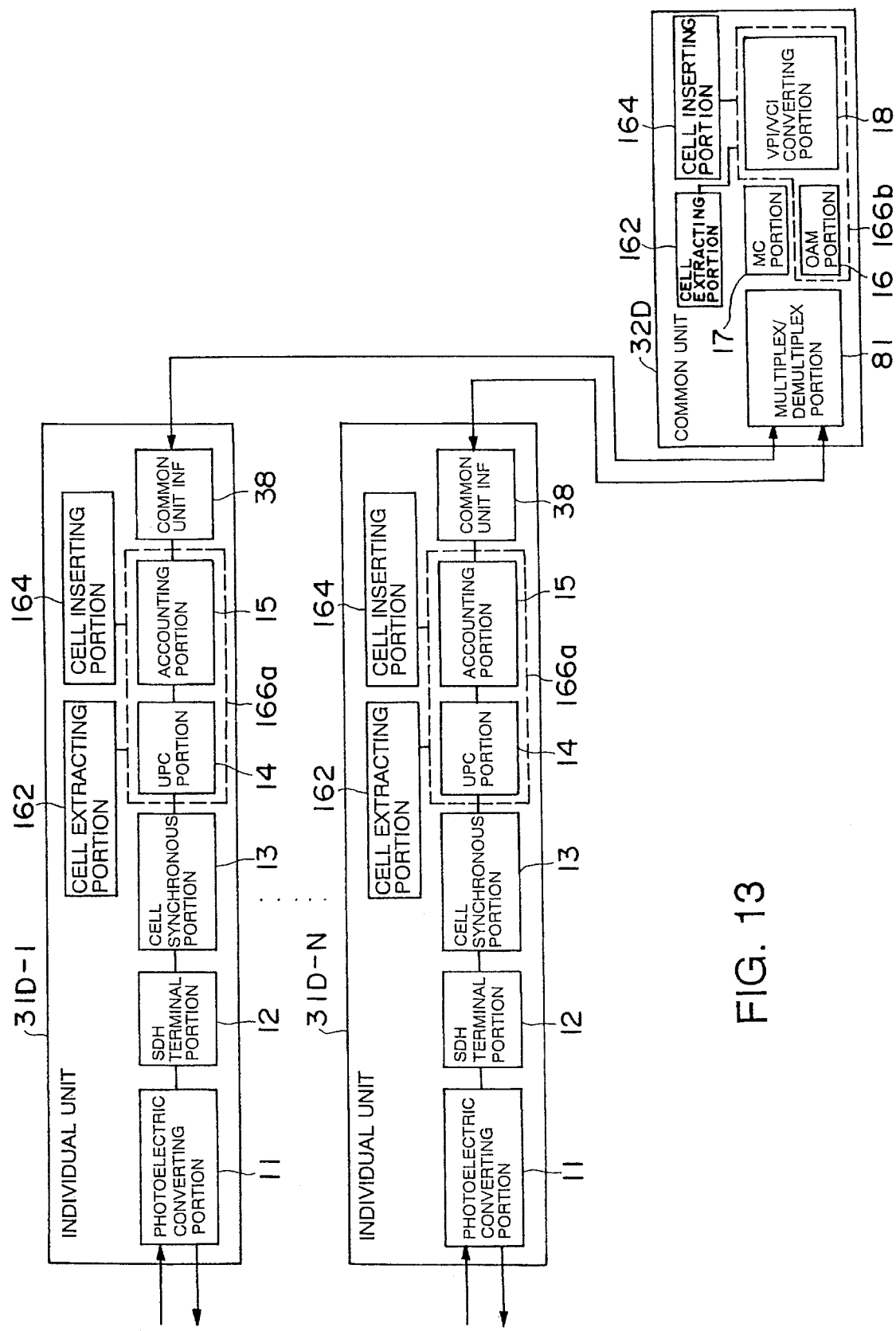
FIG. 13 is a block diagram illustrating a further configurational embodiment of the line interface.

FIG. 13 illustrates a separate configuration example 5 of the line interface. In the separate configuration example 5, the cell processing by the block portion shown in FIG. 10 is applied to each of the individual units and the common unit.

Each of the plurality of individual units 31D-1 through 31D-N is constructed of the photoelectric converting portion 11, the SDH terminal portion 12, the cell synchronous portion 13, a cell processing portion 166a, the common INF 38, the cell extracting portion 162 connected to the cell processing portion 166a and the cell inserting portion 164 connected to the cell processing portion 166a.

The cell processing portion 166a is constructed of the UPC portion 14 and the accounting portion 15. The UPC portion 14 and the accounting portion 15 use the cell extracting portion 162 and the cell inserting portion 164 in common.

The common unit 32D includes the multiplex/demultiplex portion 81, the cell processing portion 166b, the header conversion portion 18, the cell extracting portion 162 connected to the cell processing portion 166b and the cell inserting portion 164 connected to the cell processing portion 166b. The cell processing portion 166b is composed of the OAM portion 16 and the header conversion portion 18. The OAM portion 16 and the header conversion portion 18 use the cell extracting portion 162 and the cell inserting portion 164 in common.

Such a construction attains more down-sizing of the individual units and the common unit than in the construction to provide the cell extracting portion 162 and the cell inserting portion 164 for every unit.

Figure 14:
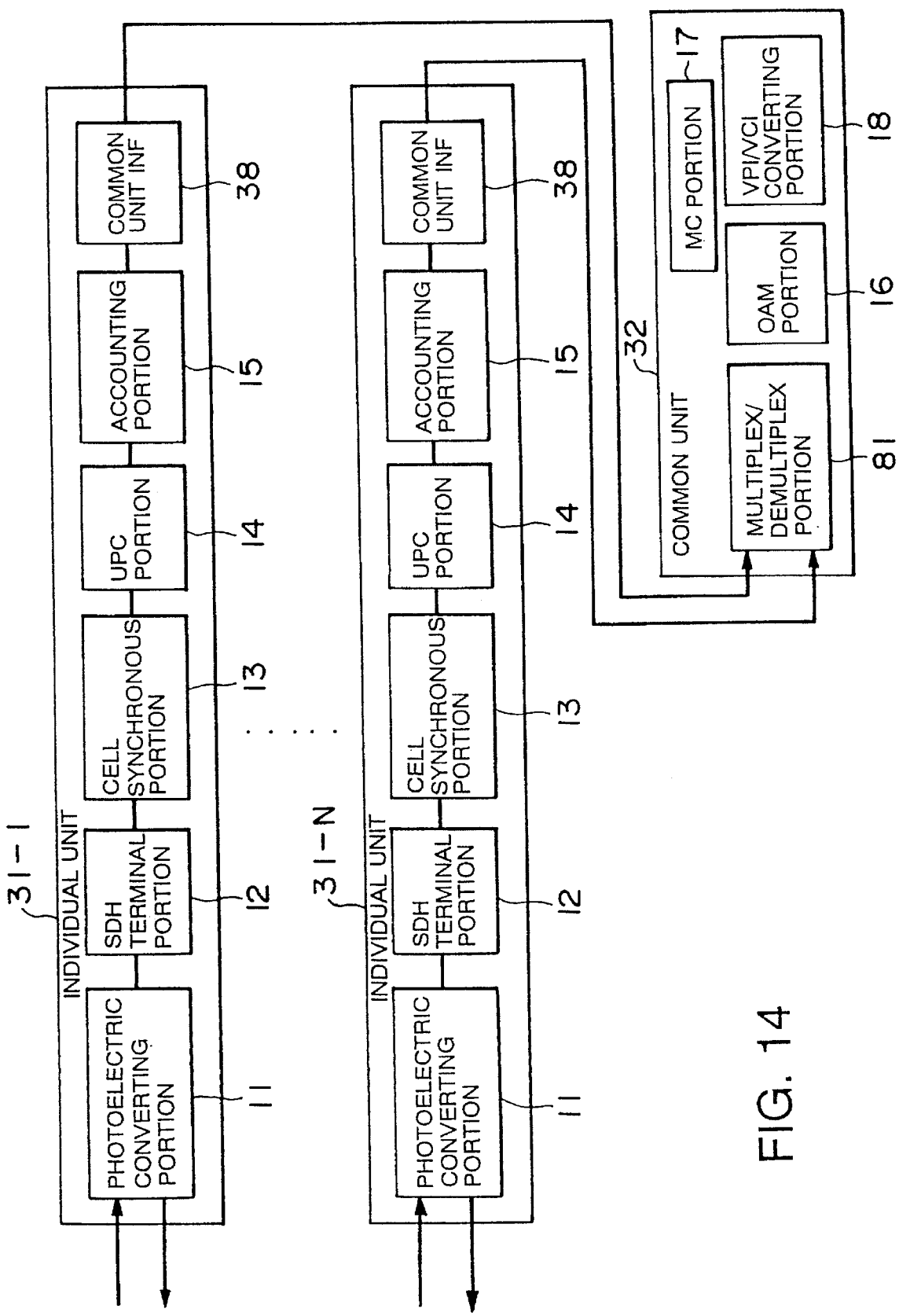
FIG. 14 is a block diagram showing a separate configurational embodiment of the line interface.

FIG. 14 is a block diagram showing a separate configuration example 6 of the line interface. The ATM switching equipment 10 incorporates one or a plurality of line interfaces 3. Each line interface 3 is provided corresponding to a plurality of subscriber's terminals 1.

The line interface 3 shown in FIG. 14 includes a plurality of individual units 31-1 through 31-N, provided corresponding to the plurality of subscriber's terminals 1, for individually processing the cells and one common unit 32, connected to the plurality of individual units 31, for batch-processing the cells processed in the plurality of individual units 31, respectively.

Each of the individual units 31-1 to 31-N is constructed of the photoelectric converting portion 11, the SDH terminal portion 12, the cell synchronous portion 13, the UPC portion 14, the accounting portion 15 and the common interface INF 38 connected to the common unit 32.

The common unit 32 is constructed of the multiplex/demultiplex portion 81 for multiplexing or demultiplexing the cells, the OAM portion 16, the MC portion 17 and the VPI/VCI converting portion 18. Note that the same elements as those shown in FIG. 3 are marked with the like symbols, and their explanations will be omitted. The multiplex/demultiplex portion 81, when effecting the multiplexing, transfers the cell data from the plurality of lines in the form of serial data.

According to such construction, the OAM portion 16, the VPI/VCI converting portion 18 which are provided in the common unit 32 are employed in common to each individual unit, and, therefore, the configuration of the line interface 3 can be simplified.

Next, there will be explained an example of the line interface for directly accommodating the subscriber's line. That is, one line interface is provided corresponding to one subscriber's line.

Figure 15:
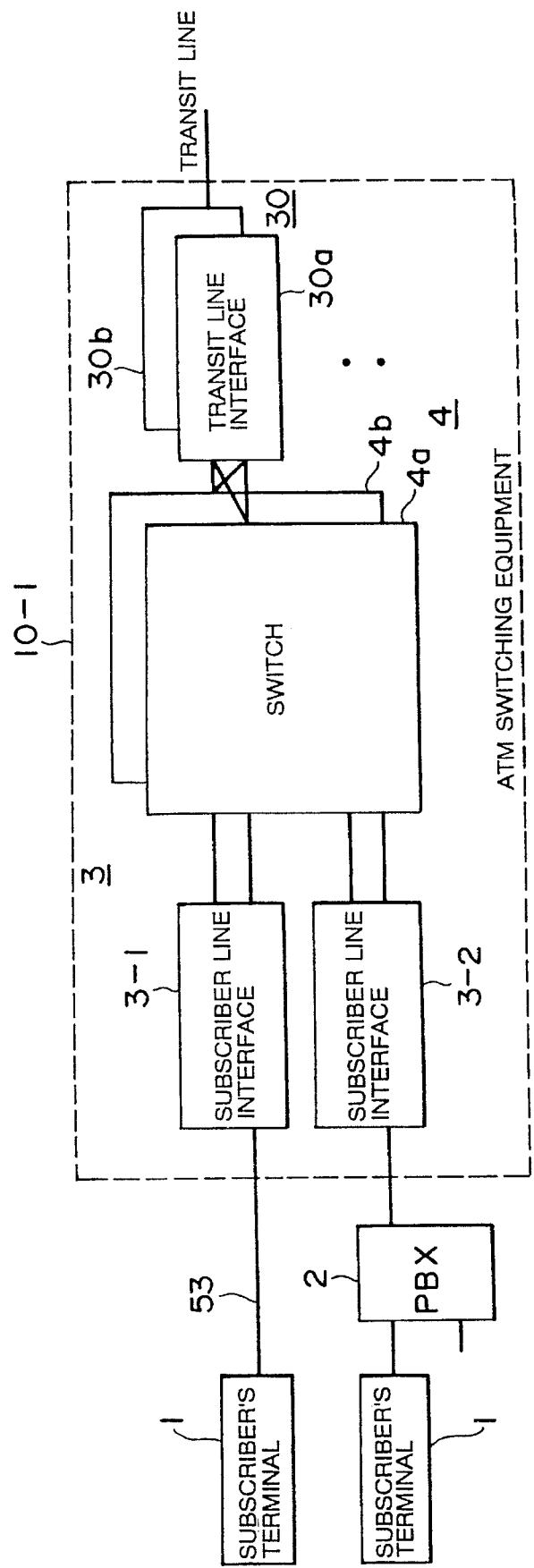
FIG. 15 is a block diagram showing the construction of an embodiment of the ATM switching equipment including the line interfaces directly accommodating the subscriber's lines.

FIG. 15 is a diagram illustrating a construction of the ATM switching equipment including the line interface for directly accommodating the subscriber's line in accordance with an embodiment 2. As illustrated in FIG. 15, an ATM switching equipment 10-1 comprises a line interface 3 (3-1, 3-2) constituting a subscriber line interface, a switch 4 (4a, 4b) for switching the cell and a transit line interface 30 (30a, 30b).

The line interface 3 is conceived as an interface for converting signals sent with a synchronous digital hierarchy (SDH) from the subscriber's terminals 1 in an ATM format and transmitting the signals to the switch 4. The switch 4 switches an internal signal path to transmit a generated cell based on the ATM format to one of trunk lines.

The subscriber's terminal 1 is connected directly to a line interface 3-1 via the subscriber's line 53 composed of an optical cable having optical fibers. The subscriber's terminal 1 is connected via the subscriber's line 53 and a private branch exchange (PBX) 2 to a line interface 3-2.

That is, in this embodiment the single line interface 3 directly accommodates one subscriber's terminal 1. Herein, the optical fiber contains a core and a clad, whereby a transmission loss is small.

Figure 53:
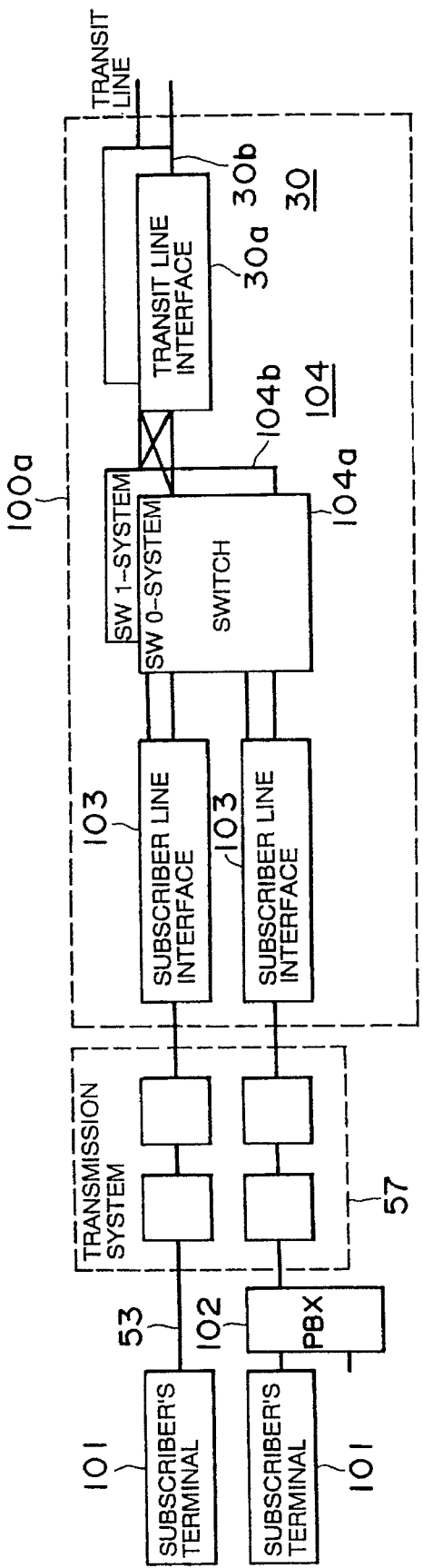
FIG. 53 is a diagram showing one example of a conventional ATM switching equipment.
Figure 54:
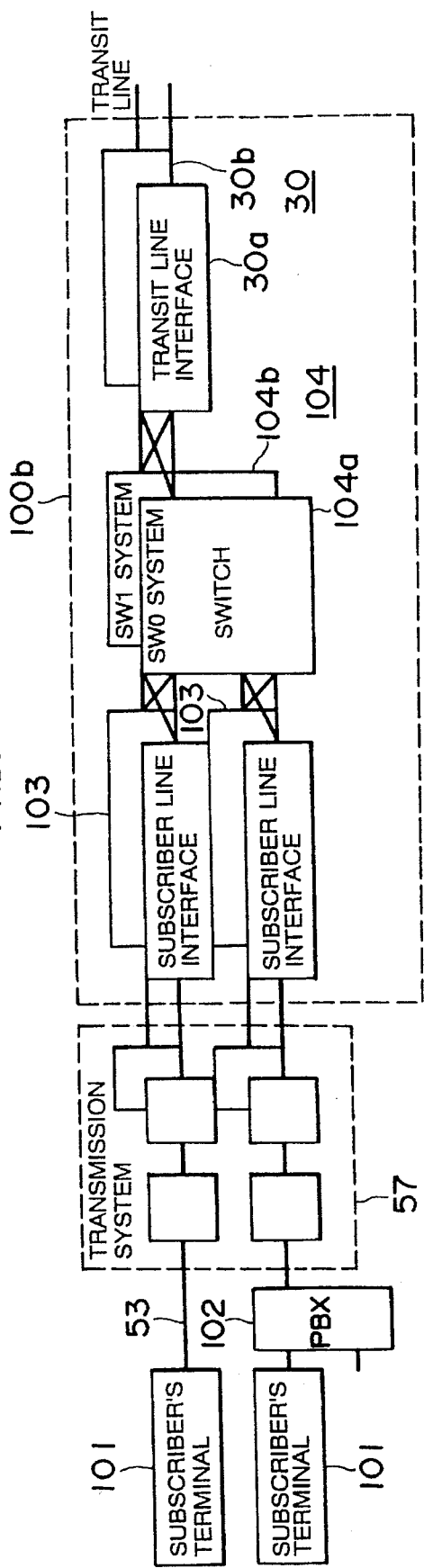
FIG. 54 is a diagram showing one example of a conventional duplicate ATM switching equipment.
Figure 55:
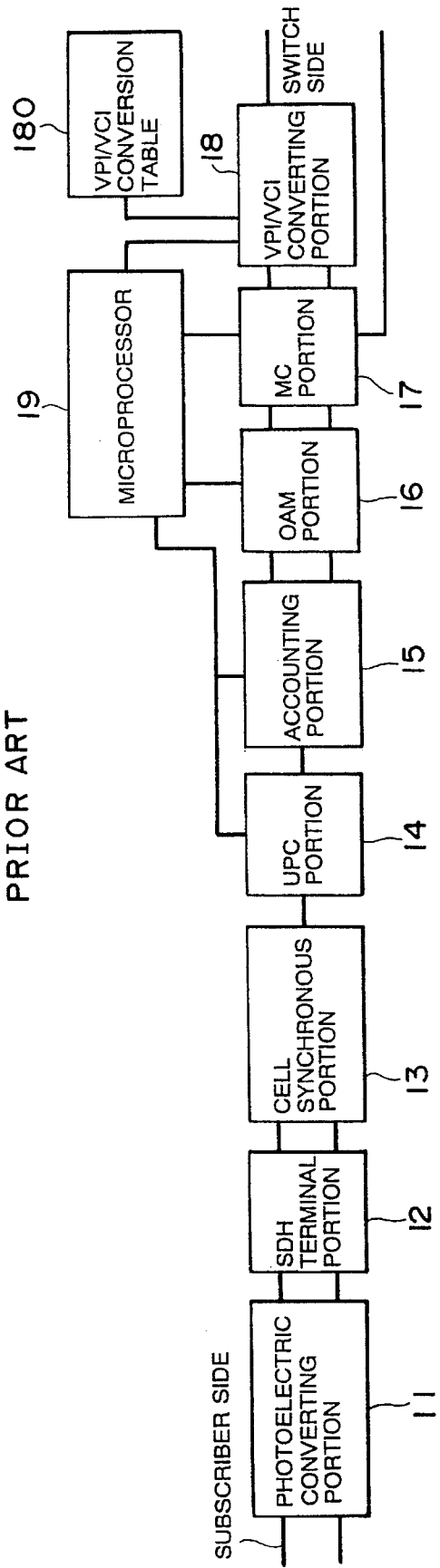
FIG. 55 is a diagram illustrating a configuration of a conventional line interface.

In the configuration example 1 shown in FIG. 15, since the conventional transmission system 57 illustrated in FIG. 53 is not employed, the configuration can be simplified. Further, the line interface 3 is provided corresponding to the subscriber's line 53, and, hence, even if a fault occurs in a certain line interface, only the subscriber's line corresponding thereto is blocked. Accordingly, this results in an arrangement in which the line is usable without exerting any influence on other subscribers.

Note that the line interface in this embodiment may be separated into the above individual units and the common unit.

Figure 16:
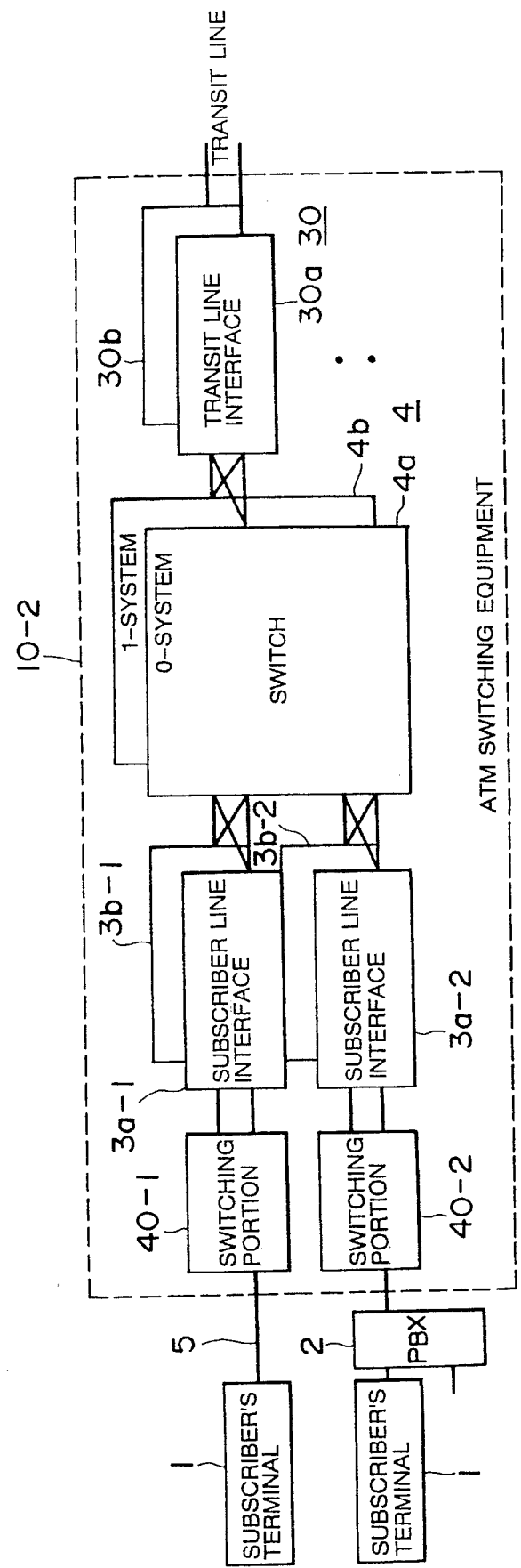
FIG. 16 is a block diagram illustrating another embodiment of the ATM switching equipment including the line interfaces directly accommodating the subscriber's lines.

FIG. 16 is a diagram illustrating a construction of the ATM switching system including the line interface for directly accommodating the subscriber's line in accordance with an embodiment 3. In the configuration example 2 shown in FIG. 16, the line interface in the ATM switching system is based on a dual construction.

More specifically, an ATM switching system 10-2 includes line interfaces 3a-1, 3a-2 as a 0-system (active system). The ATM switching equipment 10-2 also includes line interfaces 3b-1, 3b-2 as a 1-system (standby system).

Further, the ATM switching equipment 10-2 is equipped with a switching unit 40-1 for switching the 0-system line interface 3a-1, the 1-system line interface 3b-1 and a switching unit 40-2 for switching the 0-system line interface 3a-2 and the 1-system line interface 3b-2. Note that the switch 4 (4a, 4b), the transit line interface 30 (30a, 30b) are constructed the same as those in the configuration example 1 illustrated in FIG. 15.

According to such a construction, for instance, if a fault occurs in the 0-system line interface 3a-1, the switching unit 40-1 performs switching from the 0-system line interface 3a-1 to the 1-system line interface 3b-1. A disconnection of the line can be thereby prevented, and this leads to an improvement in terms of reliability of the equipment.

Note that the line interface in this configuration example 2 may be separated into the above individual units and the common unit.

Figure 17:
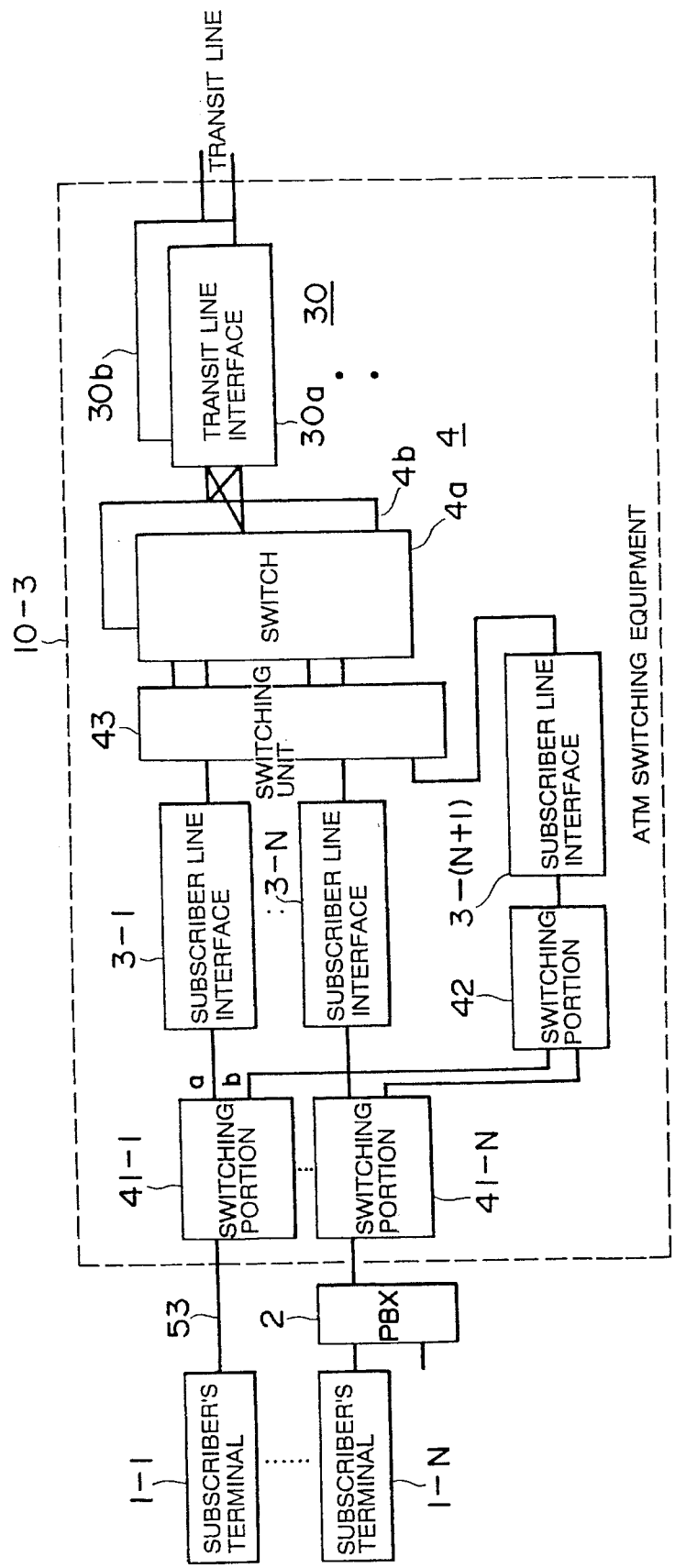
FIG. 17 is a diagram showing a further embodiment of the ATM switching equipment including the line interfaces directly accommodating the subscriber's lines.

FIG. 17 is a diagram illustrating a construction of the ATM switching system including the line interface for directly accommodating the subscriber's line in accordance with an embodiment 4. In the configuration example 3 shown in FIG. 17, N-sets of the 0-system line interfaces 3-1 through 3-N use one set of 1-system line interface 3-(N+1).

That is, an ATM switching system 10-3 includes 0-system N-sets of the line interfaces 3-1 to 3-N, N-sets of the switching units 41-1 to 41-N corresponding thereto and a switching unit 42 connected to the switching units 41-1 through 41-N and the 1-system line interface 3-(N+1). The ATM switching system 10-3 also includes a switching unit 43 connected to the 1-system line interface 3-(N+1) and N-sets of the 0-system line interfaces 3-1 through 3-N.

Note that switching units 41-1 through 41-N are provided corresponding to N-sets of subscriber's terminals 1—1 through 1-N. Other constructions are the same as those in the configuration example 1.

According to such a construction, if a fault occurs in, e.g., the line interface 3-1 among N-sets of the 0-system line interfaces 3-1 through 3-N, the switching unit 41-1 effects switching from terminal a to terminal b. Then, the switching unit 41-1 is connected via the switching unit 42 to the 1-system line interface 3-(N+1).

Namely, the switching unit 41-1 effects switching from the 0-system line interface 3-1 undergoing the fault to the 1-system line interface 3-(N+1). The line disconnection can be thereby prevented, and this brings about the improvement in reliability of the equipment.

Further, a plurality of 1-system line interfaces may be provided. In this case, if a fault occurs in the 0-system line interface, the fault line interface may be switched over to one of the plurality of 1-system line interfaces.

Incidentally, if all of the plurality of 1-system line interfaces are employed, the switch-over from the 0-system to the 1-system can not be carried out, and therefore the relevant line is blocked.

Note that the line interface in this configuration example 3 may be separated into the above individual units and the common unit.

Figure 18:
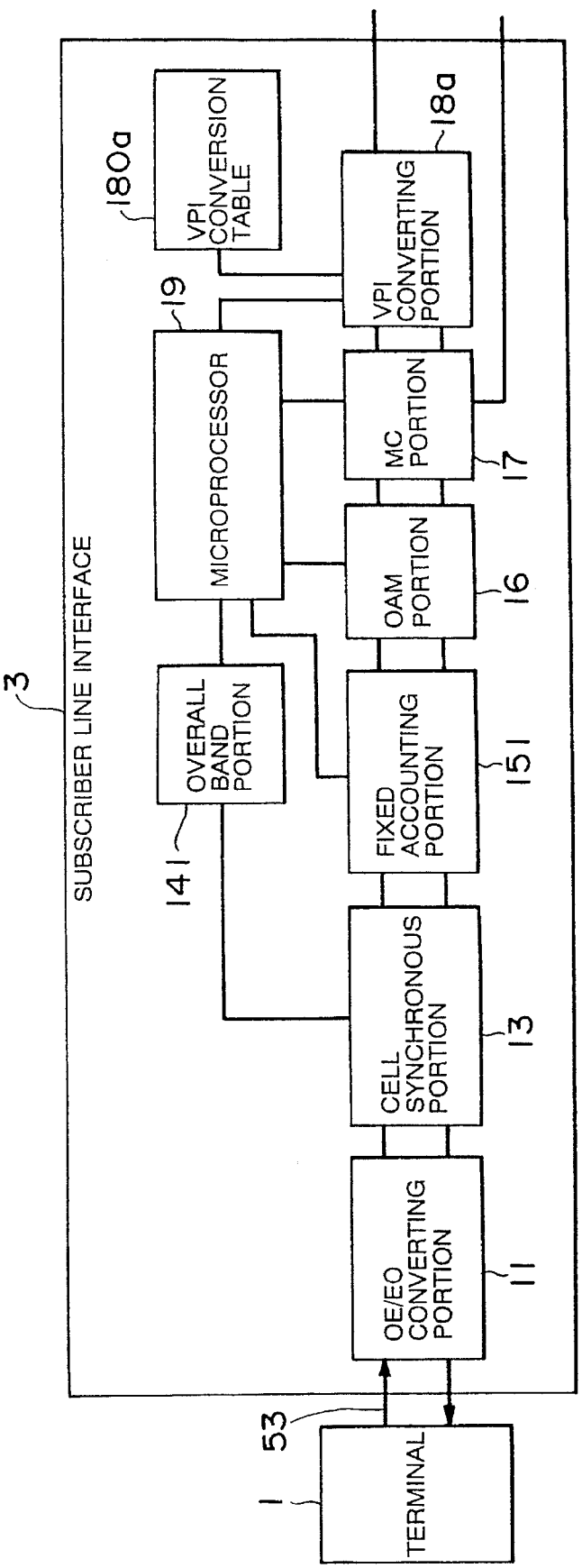
FIG. 18 is a block diagram showing a configuration of an example of the line interface illustrated in FIG. 15.

FIG. 18 is a block diagram illustrating a configuration in an example 1 of the line interface shown in FIGS. 15 to 17. The line interface 3 illustrated in FIG. 18 is down sized from the conventional line interface.

Referring to FIG. 18, the photoelectric converting portion (OE/EO converting portion) 11 converts an optical signal from the subscriber's line 53 composed of an optical cable into an electric signal or inversely converts the electric signal into the optical signal.

The cell synchronous portion 13 is connected to this photoelectric converting portion 11.

The cell synchronous portion 13 performs the cell error control on the basis of the header error control data written to the cell header and effects the cell synchronous detection. This cell consists of a 5-byte header (cell header) and a 48-byte data field.

Figure 19:
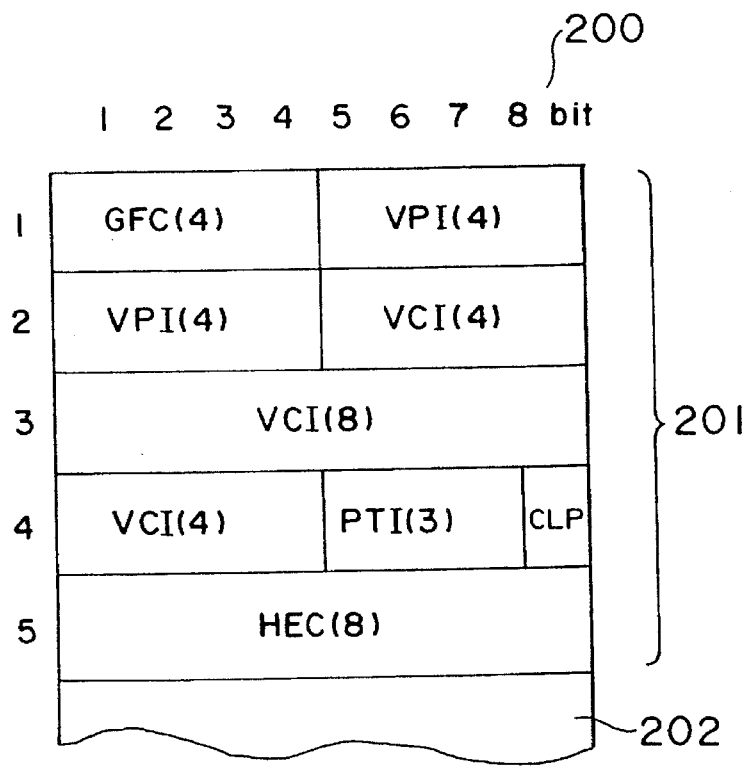
FIG. 19 is a diagram showing a cell format in the ATM.

FIG. 19 shows a cell format in the ATM. A cell 200 shown in FIG. 19 consists of a header 201 and a data field 202.

The header 201 comprises 4-bit flow control data (GFC; Generic Flow Control), an 8-bit VPI, a 12-bit VCI, 3-bit cell format data (PTI; Payload Type Identifier), cell loss priority data (CLP; Cell Loss Priority) and 8-bit control data (HEC; Header Error Control) of the header 201.

The ATM switching equipment operates to allocate pieces of routing data defined as call identification labels when setting a call and to release the routing data when releasing the call. An intrinsic value is allocated to the routing data for every node-to-node link. It is required that the routing data be transformed when passing though every node each time. For this purpose, the header converting portion 18 is provided.

The OAM portion 16 is connected via a fixed accounting portion 151 to the cell synchronous portion 13. The OAM portion 16 manages an OAM CELL (alarm cell). The MC portion 17 is connected to this OAM portion 16.

The MC portion 17 monitors the cell quality by measuring the cell error characteristic, the cell loss characteristic and the cell delay characteristic by use of the MC cells.

A VPI converting portion 18a reads a VPI inputted, fetches a new output destination VPI corresponding thereto from a VPI conversion table 180a and rewrites the header.

Figure 20:
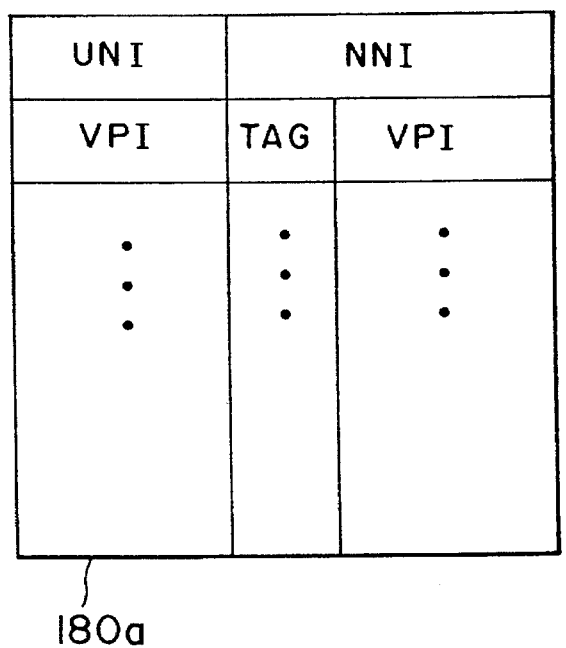
FIG. 20 is a diagram illustrating a conversion table.

The VPI conversion table 180a is composed of a memory accessible from the VPI converting portion 18a. The VPI conversion table 180a, as illustrated in FIG. 20, allocates tag data (TAG) and an output destination VPI (Network Node Interface; NNI) to the VPI (User Node Interface; UNI) inputted. An output destination path is determined per cell by this output destination VPI.

The microprocessor 19 controls the fixed accounting portion 151, the OAM portion 16, the MC portion 17 and the VPI converting portion 18a.

(a) According to the thus constructed line interface, to start with, the VPI converting portion 18a converts only the VPI by referring to the conversion table 180a shown in FIG. 20 but does not effect a VCI conversion. It is therefore possible to reduce the memory capacity of the conversion table by the number of bits of the VCI in the VCI conversion.

In this case, even when performing no VCI conversion, it is feasible to actualize a user virtual path (UVP) service in which the subscriber uses a virtual path (VP) as if it is a dedicated line.

(b) Next, the UPC portion 14 is provided in the conventional line interface but eliminated in the line interface 3 illustrated in FIG. 18. Instead, the line interface 3 is equipped with an overall band portion 141 for notifying the microprocessor 19 not to exceed a usage quantity of the band.

This overall band portion 141 is capable of actualizing a service in which overall line bands given are freely used.

Further, the overall band portion 141 is not required to monitor a flow rate of the cells as in the case of the UPC portion 14 by its being connected to the cell synchronous portion 13 and can therefore have a simple construction than the UPC portion 14.

(c) Also, in the line interface 3 shown in FIG. 18, the configuration of the accounting portion 15 is made simpler than in the conventional line interface.

Figure 1:
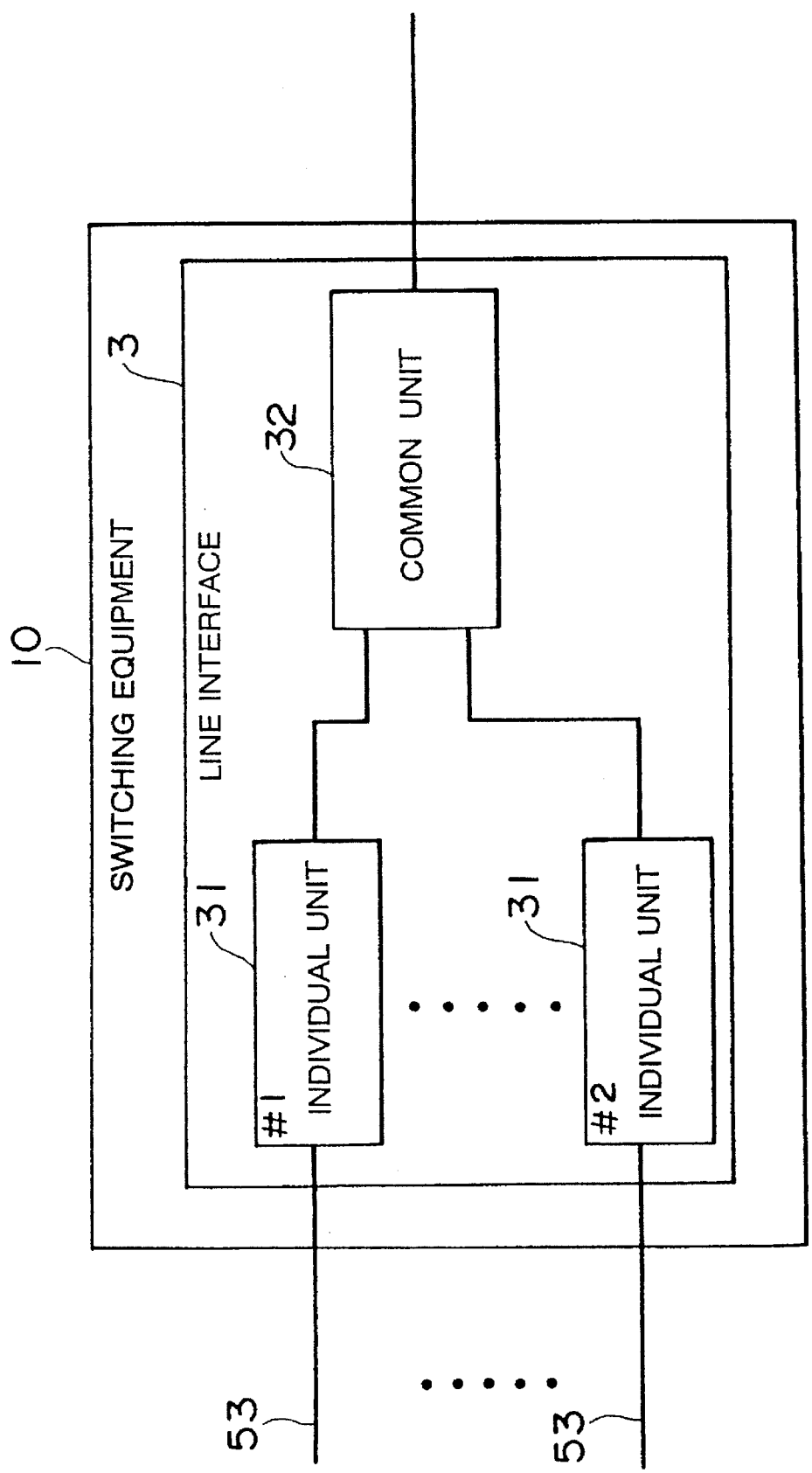
FIG. 1 is a block diagram of an embodiment incorporating the principles of the present invention.

The conventional accounting portion 15 collects pieces of accounting data by counting the number of cells. The fixed accounting portion 151 of FIG. 1B is connected to the cell synchronous portion 13 and notifies the microprocessor 19 of being a subscriber for a fixed charge. That is, since the cells are not counted, the configuration can be simplified, and, at the same time, it is possible to actualize the service of setting the fixed charge without depending on the amount of line usage.

In this case, if a different line interface is provided for every service, the efficiency decreases. For example, there may be employed a service combined with the above-mentioned, i.e., a dedicated line service in which the line bands are freely used, and, besides, the charge is fixed irrespective of the amount of usage. If use of this dedicated line increases, the hardware quantity can be further reduced by use of a line interface dedicated to the service.

Figure 56:
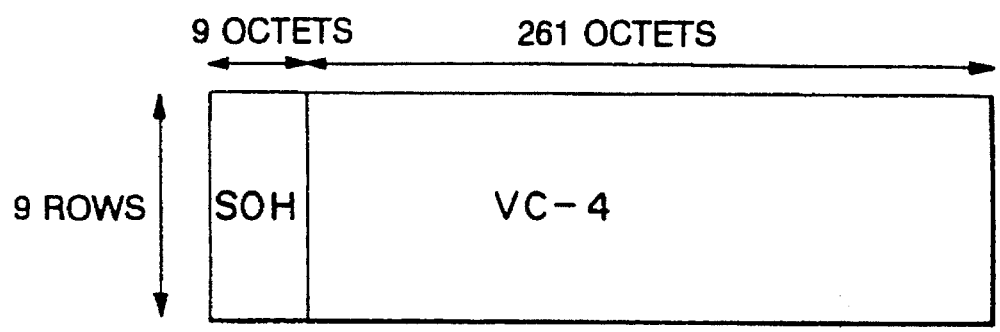
FIG. 56 is a diagram showing an SDH format.
Figure 57:
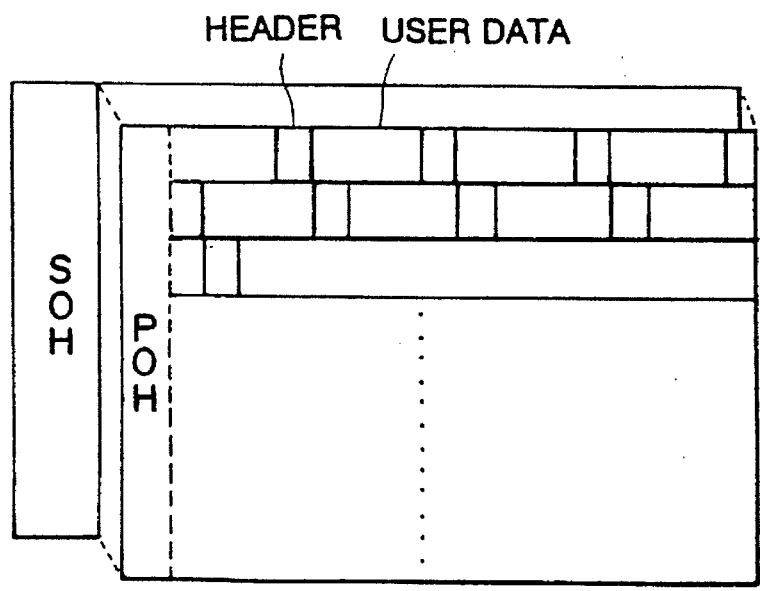
FIG. 57 is a diagram showing cell mapping to the SDH frame.

(d) Further, the SDH terminal portion 12 is provided in the conventional line interface but eliminated in the line interface 3 illustrated in FIG. 18. In the prior art, a physical layer between the subscriber's terminal 1 of the user and the network is an SDH format. The SDH terminal portion 12, as illustrated in FIG. 56, terminates the SDH format. An SDH frame is thereby mapped on the ATM cell. Thereafter, the cell mapped by the cell synchronous portion is decomposed.

In the example shown in FIG. 18, full-ATMing is attained by removing the SDH terminal portion 12.

Thus, the down-sizing of the line interface is attainable by removing some elements within the line interface 3 shown in FIG. 18 or simplifying the configuration thereof. Note that any one or more configurations explained in the above items (a) through (d) may be combined.

It should be also noted that the line interface 3 in this example may be separated into the above individual units and the common unit.

Figure 21:
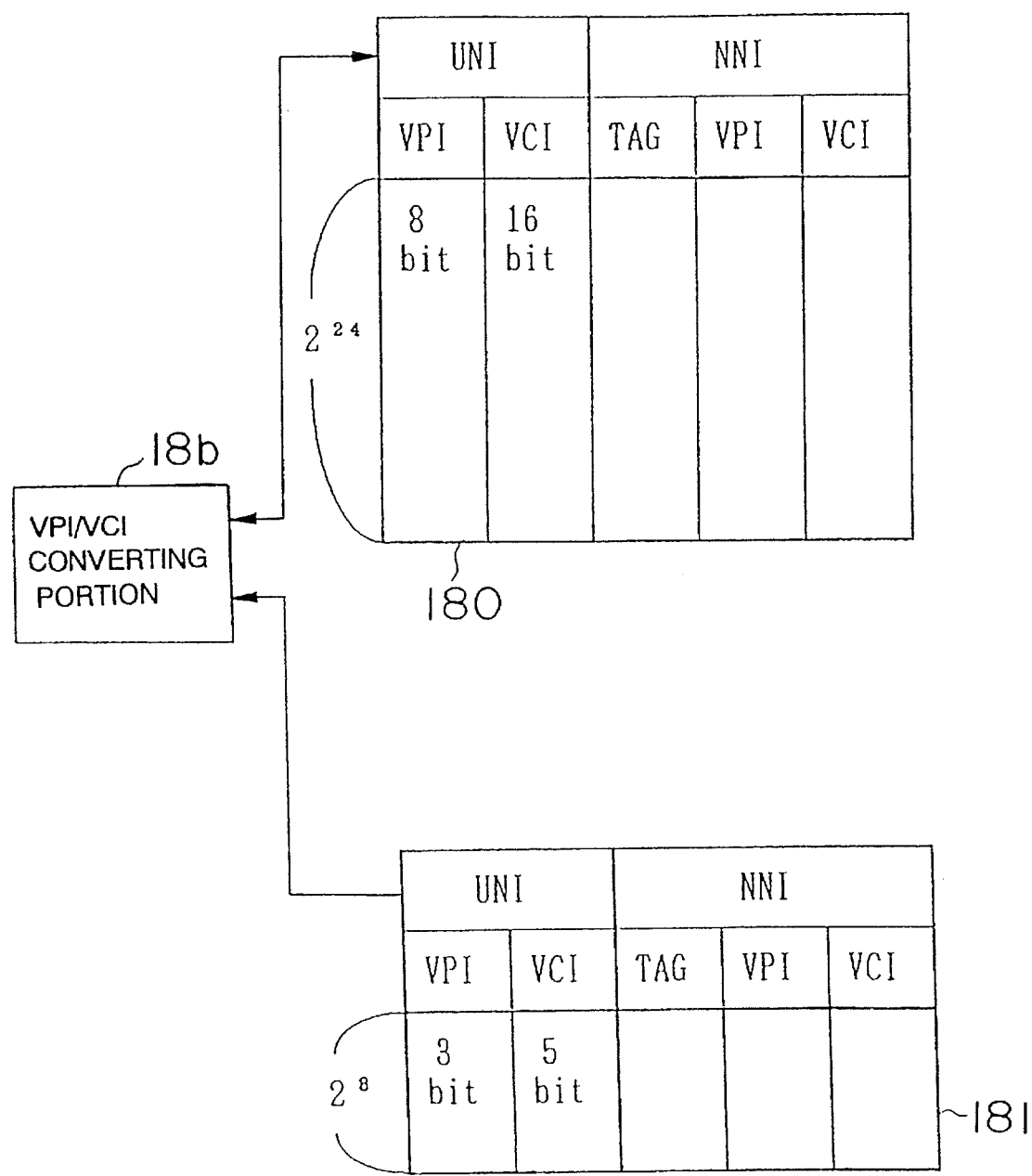
FIG. 21 is a diagram illustrating a configuration of the principal elements in the example of the line interface shown in FIG. 15.

FIG. 21 is a block diagram showing the principal elements in an example 2 of the line interface shown in FIG. 15. Referring to FIG. 21, there are shown a VPI/VCI converting portion 18b and VPI/VCI conversion tables 180, 181 accessible therefrom. Other configurations are the same as those shown in FIG. 18. The example 2 is characterized by reducing a configuration of the VPI/VCI conversion table 181 for ordinary subscribers.

In the example shown in FIGS. 15 to 17, the line interface 3 directly accommodates the subscriber line 53. With this arrangement, the subscriber's terminal 1 of the ordinary subscriber or the private branch exchange (PBX) 2 is connected to the subscriber's line 53, and, therefore, the subscriber's terminal 1 of the ordinary subscriber and the PBX 2 are separated from each other per subscriber's line 53.

The VPI/VCI conversion table 180 is provided for the subscribers who use the PBX 2, while the VPI/VCI conversion table 181 is provided for the ordinary subscribers.

The subscribers who employ the PBX 2 have a greater possibility of using the virtual path (VP) and the virtual channel (VC).

Accordingly, the VPI/VCI conversion table 180 shown in FIG. 21 stores the VPI and the VCI in the UNI as well as storing the TAG, the VPI and the VCI in the NNI. Note that the TAG (tag) is used for the in-system control (switch routing data).

In the UNI, the VPI consists of 8 bits (256 lines), while the VCI consists of 16 bits (65536 lines). The numbers of the VPIs and of the VCIs that are actually employed are determined between the subscribers and the network.

In contrast with this, there is almost no possibility in which the ordinary subscribers of the subscriber's terminals 1 use all the 8-bit VPIs and the 16-bit VCIs. For this reason, as illustrated in FIG. 21, the VPI consists of 3 bits (8 lines), while the VCI consists of 5 bits (32 lines) in the UNI of the VPI/VCI conversion table 181.

In this case, the memory capacity needed for the VPI/VCI conversion table 181 can be reduced down to 8/224, i.e., 1/65536 of the memory capacity for the VPI/VCI conversion table 180. This results in a large saving.

As described above, the conversion table of FIG. 21 is divided into the table for the ordinary subscribers and the table for the PBX subscribers. Restricted are the numbers of the VPIs and of the VCIs of the VPI/VCI conversion table 181 which could be used for the ordinary subscribers. Thus, the memory capacity for use is reduced, thereby making it possible to decrease the amount of hardware. Note that the line interface may be separated into the above individual units and the common unit.

Figure 22:
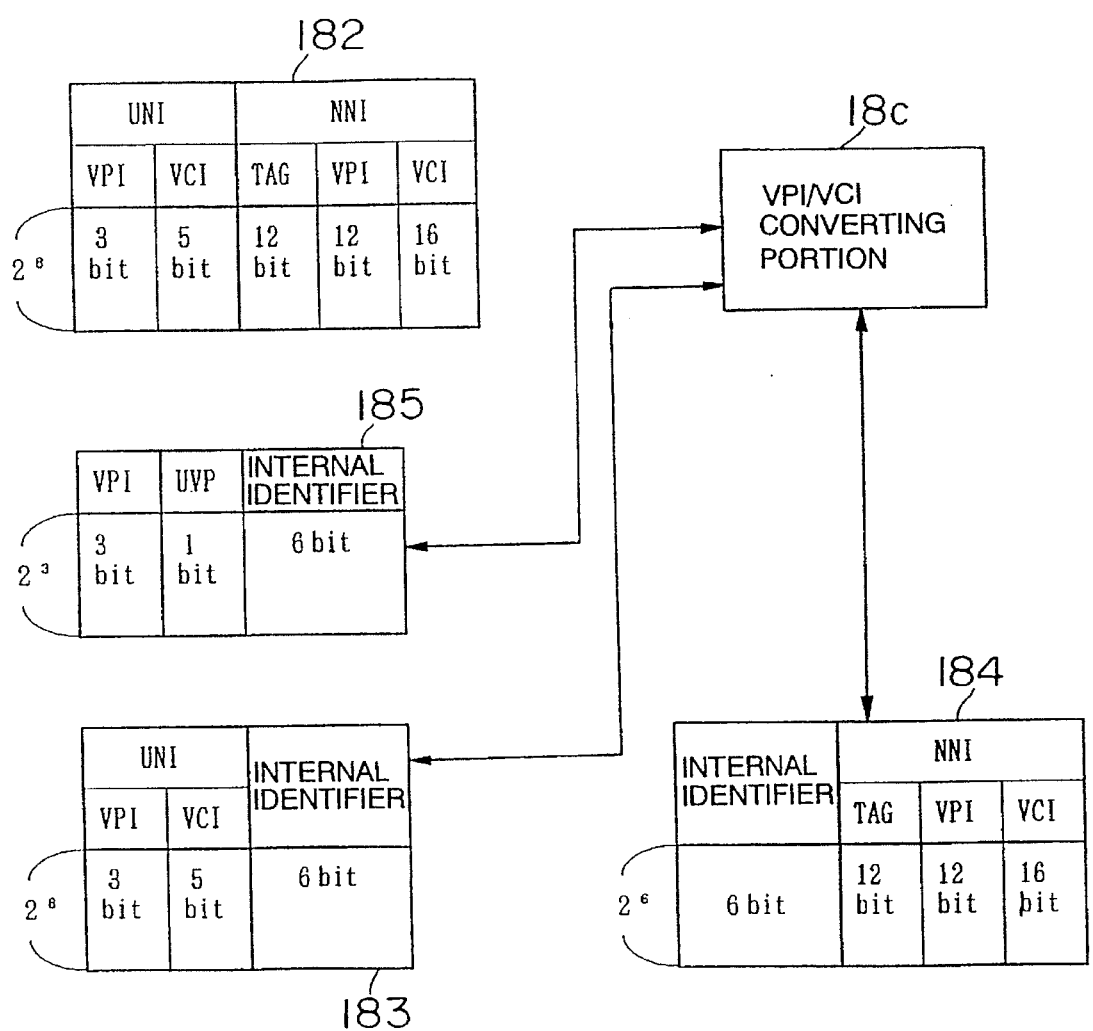
FIG. 22 is a diagram illustrating a configuration of the principal elements in a further example of the line interface shown in FIG. 15.

Next, FIG. 22 is a block diagram showing the principal elements in an example 3 of the line interface shown in FIG. 15. Referring to FIG. 22, there are shown a VPI/VCI converting portion 18c, a VPI/VCI conversion table 182 before being reduced, first and second conversion tables 183, 184 and a VP switch table 185. The example 3 is characterized by reducing the configuration of the VPI/VCI conversion table 182.

At first, the VPI is used for a service classification, a ground identification of the dedicated line and a carrier identification. For instance, as illustrated in FIG. 23, the VPI is employed for eight types of services such as telephones, FAX, data communications and dedicated lines. Shown also are the numbers of VCIs accessing to the respective VPIs with respect to a case 1 and a case 2.

Herein, as can be understood from the case 1 shown in FIG. 23, the number of users per line is limited. For this reason, when effecting a plurality of accesses to one VP, a multiplicity of VCs are needed for identifying each call. On the other hand, as can be understood from the case 2 shown in FIG. 23, when performing the access to the plurality of VPs, the number of VCs required per VP is small.

Then, the VPI/VCI of the VPI/VCI conversion table 182 is reduced by use of the first and second conversion tables 183, 184 shown in FIG. 22. In the UNI of the VPI/VCI conversion table 182, the VPI is set to 3 bits, while the VCI is set to 5 bits. In the NNI, the VPI is set to 12 bits, while the VCI is set to 16 bits. The TAG is set to 12 bits.

In the first conversion table 183, the usable VPI is set to 3 bits; the VCI is set to 5 bits; and an internal identifier indicating the number of all the simultaneously usable VCIs is set to 6 bits.

In this case, there are provided the internal identifiers, the number of which corresponds to the number of all the VCIs. Further, an active status of the internal identifier is managed so as not to employ the same internal identifier in a different VPI/VCI.

In the second header conversion table 184, the internal identifier is set to 6 bits; the VPI in the NNI is set to 12 bits; and the VCI is set to 16 bits. The TAG is set to 12 bits.

According to such conversion tables 183, 184, the VPI/VCI converting portion 18c temporarily converts the VPI/VCI of the transmitted cell into an internal identifier by use of the first conversion table 183. Further, the VPI/VCI converting portion 18c converts the converted internal identifier into a header for transmission by use of the second conversion table 184.

For example, the conversion table 183 can employ 8 pieces (3 bits) of VPIs and 32 pieces (5 bits) of VCIs. If the plurality of VPs are used simultaneously, 64 (6 bits) combinations are available.

In this instance, a reduction rate of the first conversion table 183 with respect to the VPI/VCI conversion table 182 is in the order of 1/7 as can be seen from the following formula:

$$28 \times 6/(28 \times 40) \quad (1)$$

where the numeral 40 indicates a sum of the VCIs used.

Further, a reduction rate of the third conversion table 184 with respect to the VPI/VCI conversion table 182 is in the order of 1/4 as can be seen from the following formula:

$$26 \times 40/(28 \times 40) \quad (2)$$

Thus, there is restricted the number of all the VCIs using the plurality of VPs at the same time with the 6-bit internal identifier by use of the first and second conversion tables 183, 184. The memory capacity can be thereby decreased.

Also, a VP switch table 185 shown in FIG. 22 stores a 3-bit VPI, a 1-bit UVP indicating whether or not only a UVP service is offered without effecting a VC conversion and a 6-bit internal identifier.

When using the VP switch table 185, no VCI conversion is carried out. Hence, only one internal identifier is employed in one VP. In this case, a reduction rate of the VP switch table 185 with respect to the VPI/VCI conversion table 182 is approximately 1/200 as can be seen from the following formula:

$$23 \times 7/(28 \times 40) \quad (3)$$

Thus, the memory capacity can be remarkably reduced. Note that the line interface 3 in this example may be separated into the above individual units and the common unit.

(Example 1 of Switching System of Individual Unit)

Figure 24:
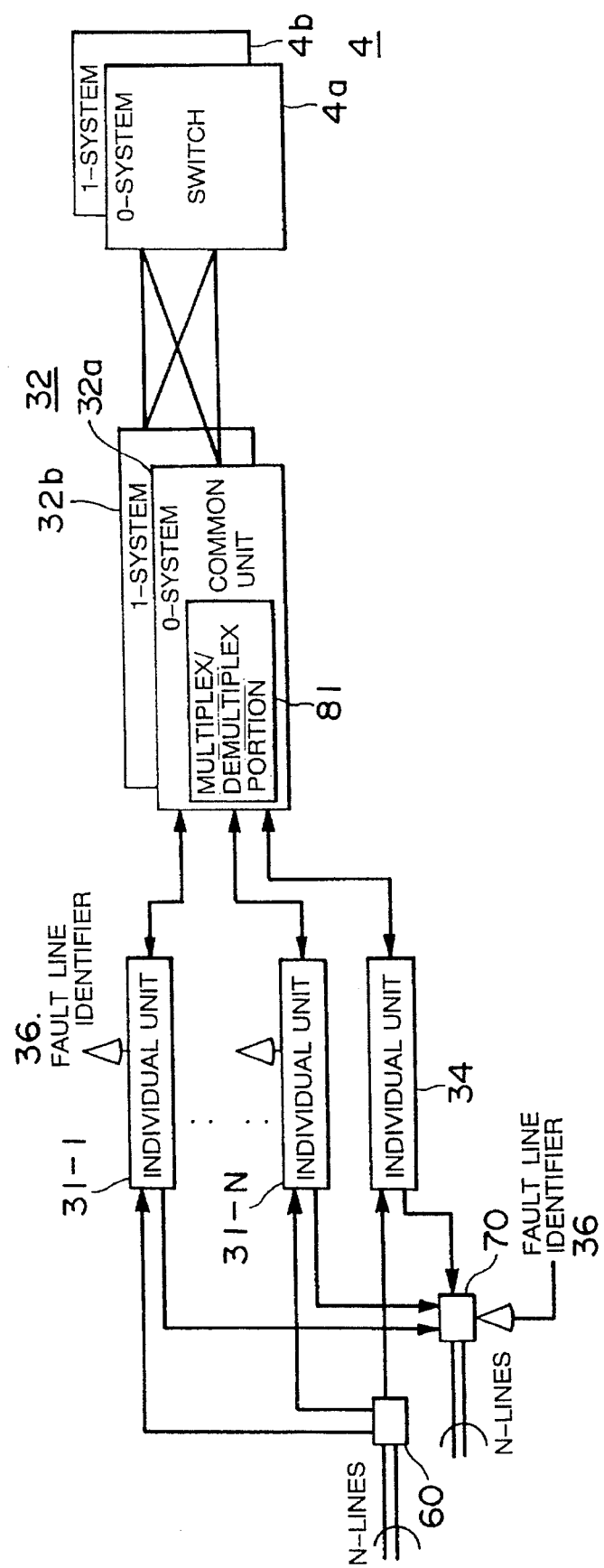
FIG. 24 is a block diagram showing a configuration of an embodiment of a switching system of an individual unit.

FIG. 24 is a block diagram showing an example 1 of a system switching system if a fault occurs in the individual unit.

A system switching system illustrated in FIG. 24 is a more concrete version of the configurations shown in FIG. 2 and 3. The line interface includes N-sets of individual units 31-1 through 31-N of the active system i.e., the 0-system, one individual unit 34 of the standby system, viz., the 1-system and 0- and 1-system common units 32a, 32b corresponding thereto. Corresponding 0- and 1-system switches 4a, 4b are connected to these common units 32a, 32b irrespectively.

Each of N-sets of the 0-system individual units 31-1 to 31-N outputs, if the fault occurs in the individual unit itself, a fault line identifier 36 to the common unit 32 and an optical selector 60 which will be discussed later. The optical selector 60 connects N-lines of lines on the input side to N-sets of the 0-system individual units 31-1 through 31-N and, upon receiving the fault line identifier 36 from the fault individual unit, switches over the fault individual unit to the 1-system individual unit 34. An optical decoder 70 has its input side connected to N-sets of the 0-system individual units 31-1 through 31-N and the 1-system individual unit 34 and also its output side connected to N-lines of the lines.

According to such a construction, to start with, if a certain 0-system individual unit, e.g., the individual unit 31-1 breaks down, the fault line identifier (termed also a fault flag) 36 is set from the individual unit 31-1 concerned. Then, the fault line identifier 36 is sent to the common unit 32 and the optical selector 60. The optical selector 60 sets the fault line identifier 36 as an optical selector switching signal and switches over the fault individual unit 31-1 to the standby system individual unit 34.

On the other hand, the fault line identifier 36 sent to the common unit 32 turns out a select signal when the multiplex/demultiplex portion 81 of the common unit 32 selects N-sets of the individual units from (N+1) sets of the individual units. The multiplex/demultiplex portion 81, after removing the 0-system fault individual unit 31-1 out of N-sets of the individual units, selects the 1-system individual unit 34 and performs multiplexing of N:1.

The discussion given above deals with the operations on the upstream side (from the subscriber to the switch). Note that the downstream side is switched over simultaneously when switching over the upstream side. The optical decoder 70 effects switching to the 1-system individual unit 34 to transmit the data from the downstream side (from the switch to the subscriber), i.e., from a data transmission side to the fault side.

Note that only one 1-system individual unit 34 is provided according to the above construction, however, there may be provided a plurality of the individual units 34 of, e.g., the 1-system.

Figure 25:
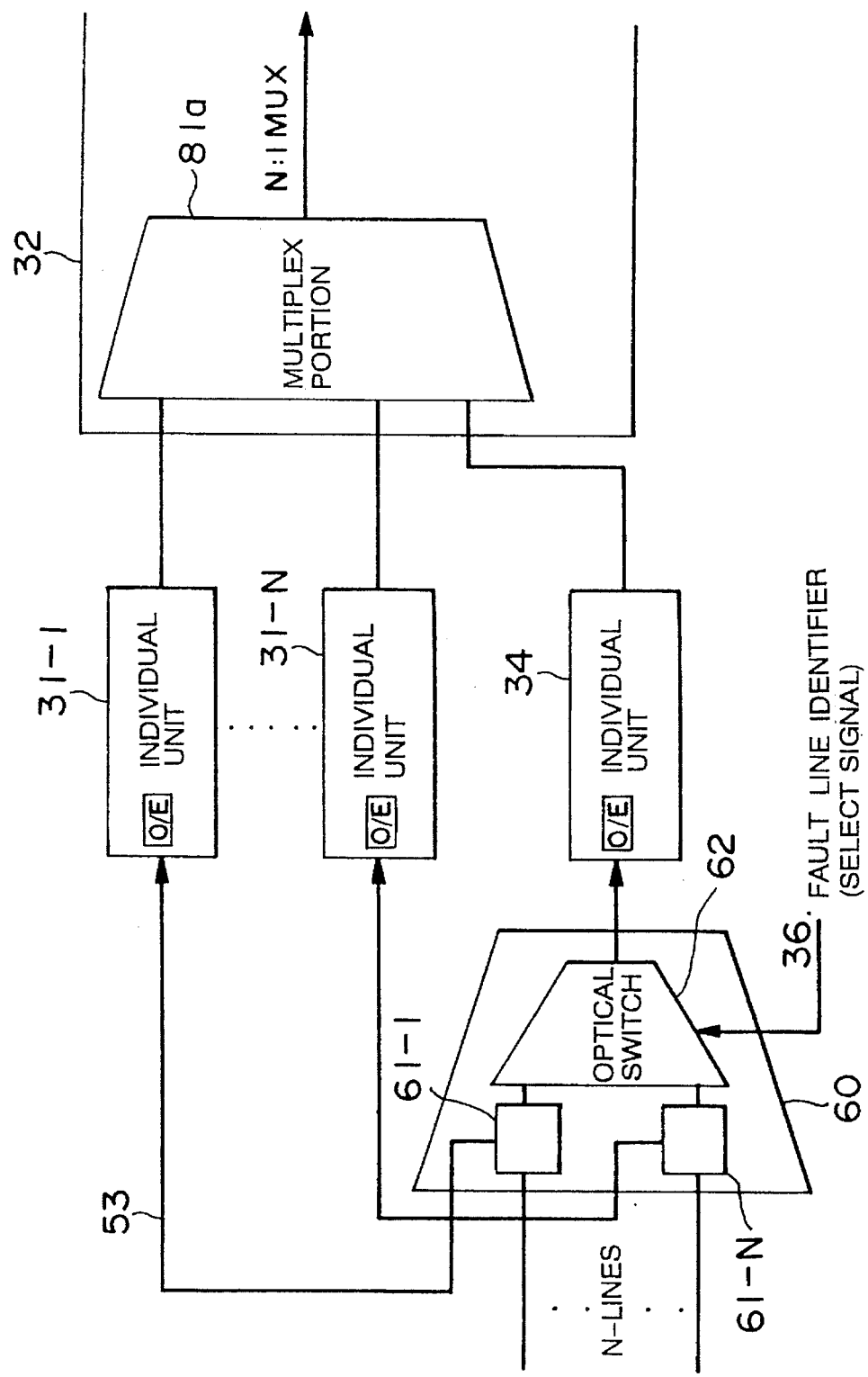
FIG. 25 is a block diagram illustrating a detailed configuration of an optical selector for effecting system switching.

FIG. 25 is a diagram illustrating details of the optical selector 60 for performing the system switching shown in FIG. 24. Referring to FIG. 25, the optical selector 60 is constructed of photo couplers 61-1 through 61-N provided corresponding to N-lines of the subscriber's line 53 and an optical switch 62 connected to the photo couplers 61-1 through 61-N. The respective photo couplers 61-1 through 61-N are connected via the optical fibers 53 to the corresponding 0-system individual units 31-1 through 31-N.

The optical switch 62, upon receiving the fault line identifier 36 from one of the 0-system individual units 31-1 through 31-N, connects the photo coupler corresponding to the 0-system fault individual unit to the 1-system individual unit 34 in order to switch over the 0-system fault individual unit to the 1-system individual unit 34.

According to this construction, at first, the optical signal from the optical fiber 53 serving as the subscriber line is inputted to the optical selector 60 packaged in the line interface.

The optical signals are transmitted to the 0-system individual units 31-1 through 31-N from the photo couplers 61-1 through 61-N within the optical selector 60. Herein, if an abnormality is caused in one of the 0-system individual units, the fault subscriber accommodated in the optical switch 62 is connected to the 1-system individual unit 34, wherein the fault line identifier 36 sent from the fault individual unit serves as a switching signal of the optical switch 62. Subsequently, a multiplex portion 81a multiplexes N-pieces of cells of the 1-system individual unit 34 and the 0-system individual unit.

That is, on the upstream side from the subscriber to the switch 4, the optical switch 62 performs switching by use of the fault line identifier 36 sent from the 0-system fault individual unit, and, therefore, a restoration can be quickly made. Also, since the photo couplers 61-1 through 61-N are accommodated in the optical selector 60, no influence is exerted on the optical switch 62 even when insert-removing the fault individual unit.

Figure 26:
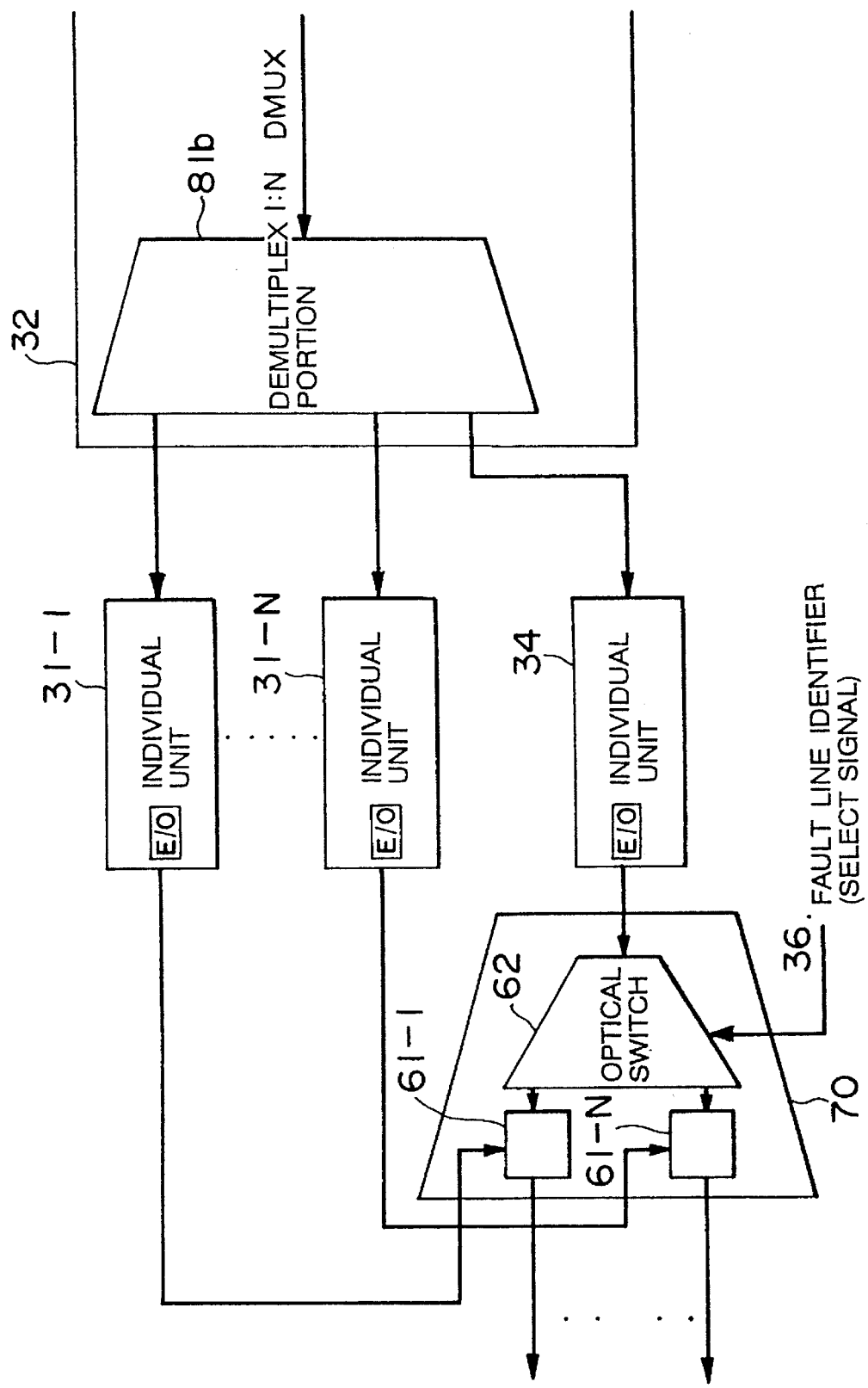
FIG. 26 is a block diagram illustrating a detailed configuration of an optical decoder for performing the system switching.

FIG. 26 is a block diagram illustrating details of the optical decoder for effecting the system switching shown in FIG. 24. Referring to FIG. 26, the optical decoder 70 is constructed of the photo couplers 61-1 through 61-N provided corresponding to N-lines of the subscriber's line 53 and the optical switch 62 connected to the photo couplers 61-1 through 61-N. The respective photo couplers 61-1 through 61-N are connected via the optical fibers 53 to the corresponding individual units. The optical switch 62, upon receiving the fault line identifier 36 from the individual unit, connects the photo coupler corresponding to the fault individual unit to the 1-system individual unit 34 in order to switch over the 0-system fault individual unit to the 1-system individual unit 34.

According to this construction, if an abnormality occurs in one of the 0-system individual units, the fault subscriber accommodated in the optical switch 62 is connected to the 1-system individual unit 34, wherein the fault line identifier 36 sent from the fault individual unit serves as a switching signal of the optical switch 62. That is, on the downstream side from the switch to the subscriber, the optical switch 62 performs switching by use of the fault line identifier, and, therefore, the restoration can be quickly made.

Figure 27:
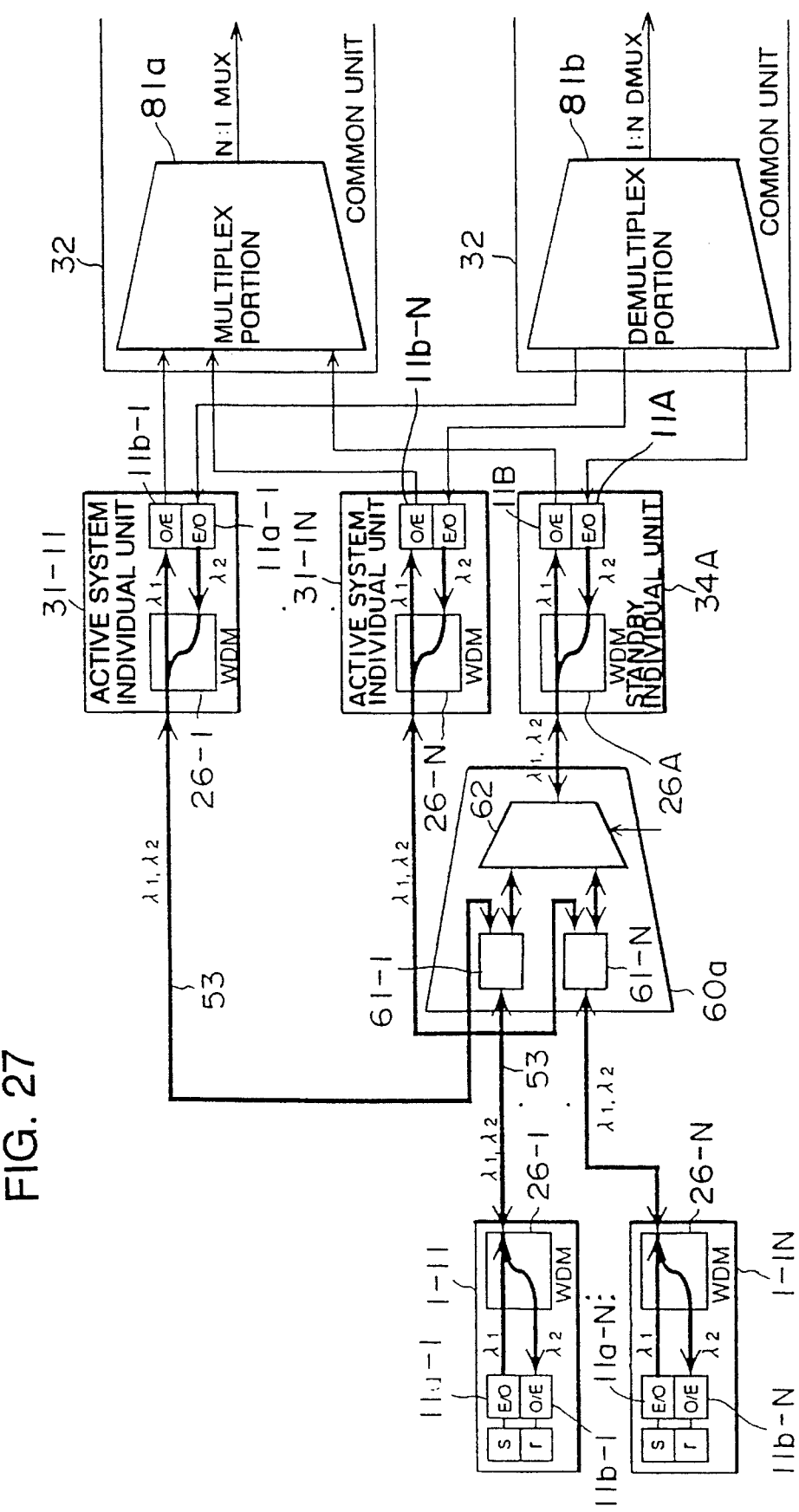
FIG. 27 is a block diagram illustrating a configuration of a further embodiment of a switching system of an individual unit.

FIG. 27 is a block diagram showing an example 2 of the switching system of the individual unit. In the switching system illustrated in FIG. 27, the upstream-side optical selector shown in FIG. 24 and the downstream-side optical decoder are formed into one united body.

The subscriber's terminals (TE) 1-11 through 1-1N include E/O portions 11a-1 through 11a-N, O/E portions 11b-1 through 11b-N and wavelength division multiplex (WDM) portions 26-1 through 26-N, connected thereto, for dividing and multiplexing different wavelengths. The WDM 26-1 through 26-N input two wavelength ∎1, ∎2 and allocate pieces of upstream-side and downstream-side data.

An optical selector 60a includes N-sets of photocouplers 61-1 through 61-N common to the upstream and downstream sides and one optical switch 62. The WDMs 26-1 through 26-N are connected via the optical fibers 53 to the photocouplers 61-1 through 61-N.

Each of the 0-system individual units 31-11 to 31-1N has the WDMs 26-1 to 26-N, the E/O portions 11a-1 to 11a-N and the O/E portions 11b-1 to 11b-N. A 1-system individual unit 34A includes a WDM 26A, an E/O portion 11A and an O/E portion 11B.

The common unit 32 includes a multiplex portion 81a and a demultiplex portion 81b. An output of each of the O/E portions 11b-1 through 11b-N is connected via the cell synchronous portion to the multiplex portion 81a. Respective outputs of the demultiplex portion 81b are connected via the cell synchronous portion to the E/O portions 11a-1 through 11a-N.

According to the thus constructed optical selector and a peripheral line, on the upstream side, the optical signals having the wavelength $\lambda1$ that are converted from the electric signals by the E/O portions 11a-1 to 11a-N through 11a-N within the subscriber's terminals (TE) 1-11 to 1-1N are transmitted through the optical fibers 53 via the WDMs 26-1 to 26-N and taken in the photocouplers 61-1 to 61-N. Then, the optical signals thereof are, after passing through the WDMs 26-1 to 26-N within each individual unit, converted into the electric signals by the O/E portions 11b-1 to 11b-N and applied to the multiplex portion 81a. Further, the multiplex portion 81a multiplexes the electric signals coming from the individual units.

While on the downstream side, the electric signals corresponding to the wavelength $\lambda2$ demultiplexed by the demultiplex portion 81b are converted into the optical signals having the wavelength $\lambda2$ by the E/O portions 11a-1 to 11a-N within each individual unit. The thus converted optical signals are taken in the photocouplers 61-1 to 61-N via the WDMs 26-1 to 26-N and the optical fibers 53. Thereafter, the optical signals having the wavelength $\lambda2$ are, after passing through the WDMs in the TE via the optical fibers 53, converted into the electric signals by the O/E portions 11b-1 to 11b-N.

Note that if the trouble occurs in one of the N-sets of the 0-system individual units, the relevant individual unit is switched over to the 1-system individual unit 34A.

That is, bidirectional communications via the single optical fiber 53 are attainable by effecting communications using the different wavelengths on the upstream and downstream sides. Further, the equipment can be constructed on one surface without changing the size of the optical selector 60a, and the number of the optical fibers 53 extending between the equipments can be reduced down to ½ of the number in the example shown in FIG. 25.

Figure 28:
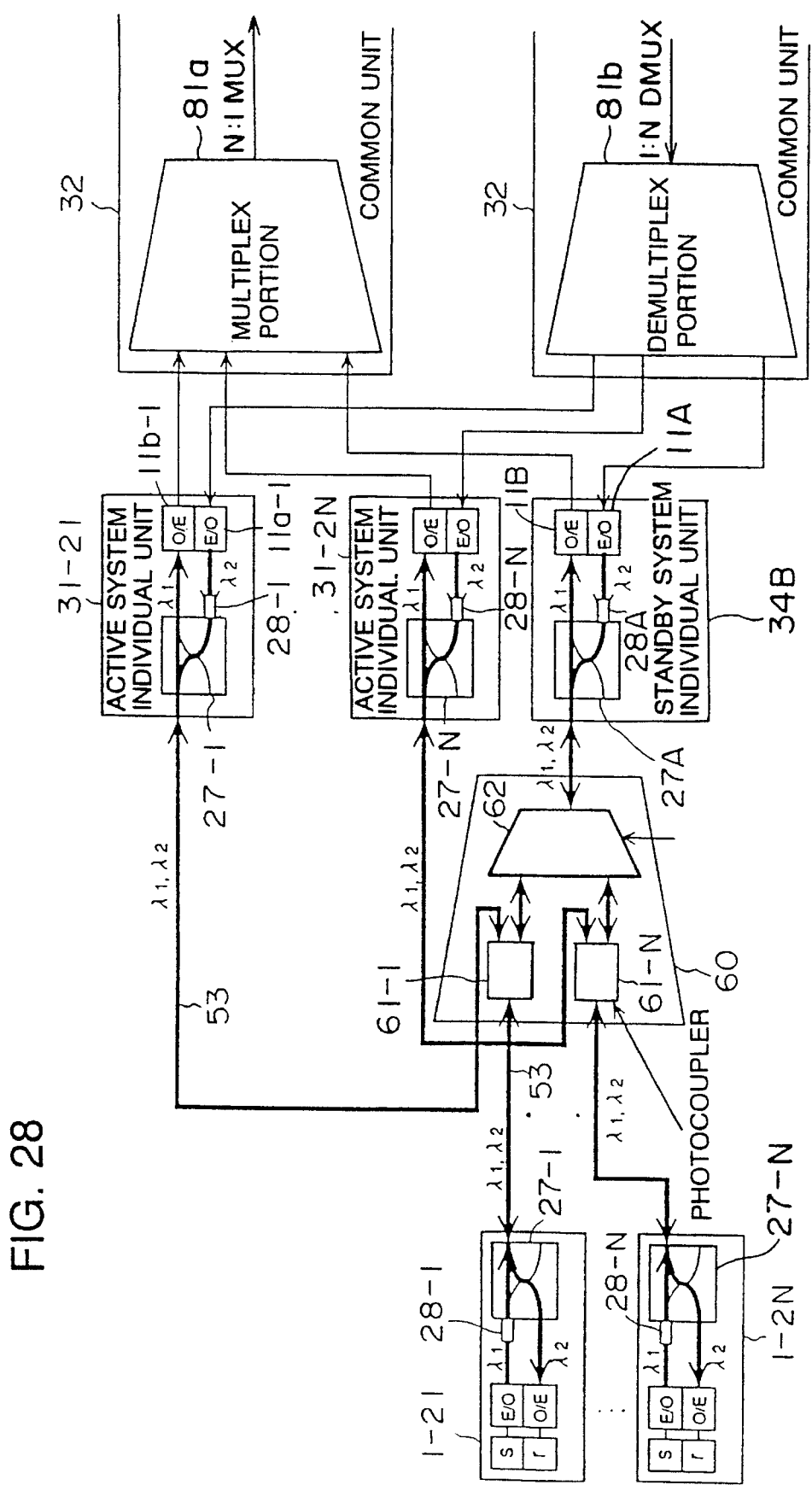
FIG. 28 is a block diagram illustrating a configuration of another embodiment of a switching system of an individual unit.

FIG. 28 is a block diagram illustrating an example 3 of the switching system of the individual unit. In the switching system shown in FIG. 28, TEs 1-21 to 1-2N and individual units 31-21 to 31-2N have 2×2 couplers 27-1 to 27-N and photo isolators 28-1 to 28-N. The photo isolators 28-1 to 28-N permit a unidirectional transmission of the signals. The 2×2 couplers 27-1 to 27-N are connected to the photo isolators 28-1 to 28-N. Each of these 2×2 couplers 27-1 to 27-N has two input terminals and two output terminals and permits a bidirectional transmission of the signals.

Note that the 2×2 couplers 27-1 to 27-N and the photo isolators 28-1 to 28-N have been added, and the WDMs 26-1 to 26-N shown in FIG. 27 have been eliminated. Other configurations are the same as those shown in FIG. 27, and their explanations are omitted.

According to such a construction, on the upstream side, the optical signals having the wavelength λ1 are transmitted through the optical fibers 53 via the photo isolators 28-1 to 28-N and the 2×2 couplers 27-1 to 27-N and taken in the photocouplers 61-1 to 61-N. The optical signals thereof are converted into the electric signals by the O/E portions through the 2×2 couplers 27-1 to 27-N within each individual unit as well as through the optical fibers.

While on the downstream side, the electric signals are converted into the optical signals having the wavelength λ2 by the E/O portions within each individual unit and taken in the photocouplers 61-1 to 61-N via the photo isolators 28-1 to 28-N and the 2×2 couplers 27-1 to 27-N. The optical signals having the wavelength λ2 are, after passing through the 2×2 couplers 27-1 to 27-N within the TEs 1-21 to 1-2N via the optical fibers 53, converted into the electric signals by the O/E portions thereof.

The same effects as those by the optical selector as shown in FIG. 27 are obtained even by use of the photo isolators 28-1 to 28-N and the 2×2 couplers 27-1 to 27-N. Further, in this case, any influence exerted on the signals coming from the opposite direction is substantially decreased because of using the photo isolators.

Figure 29:
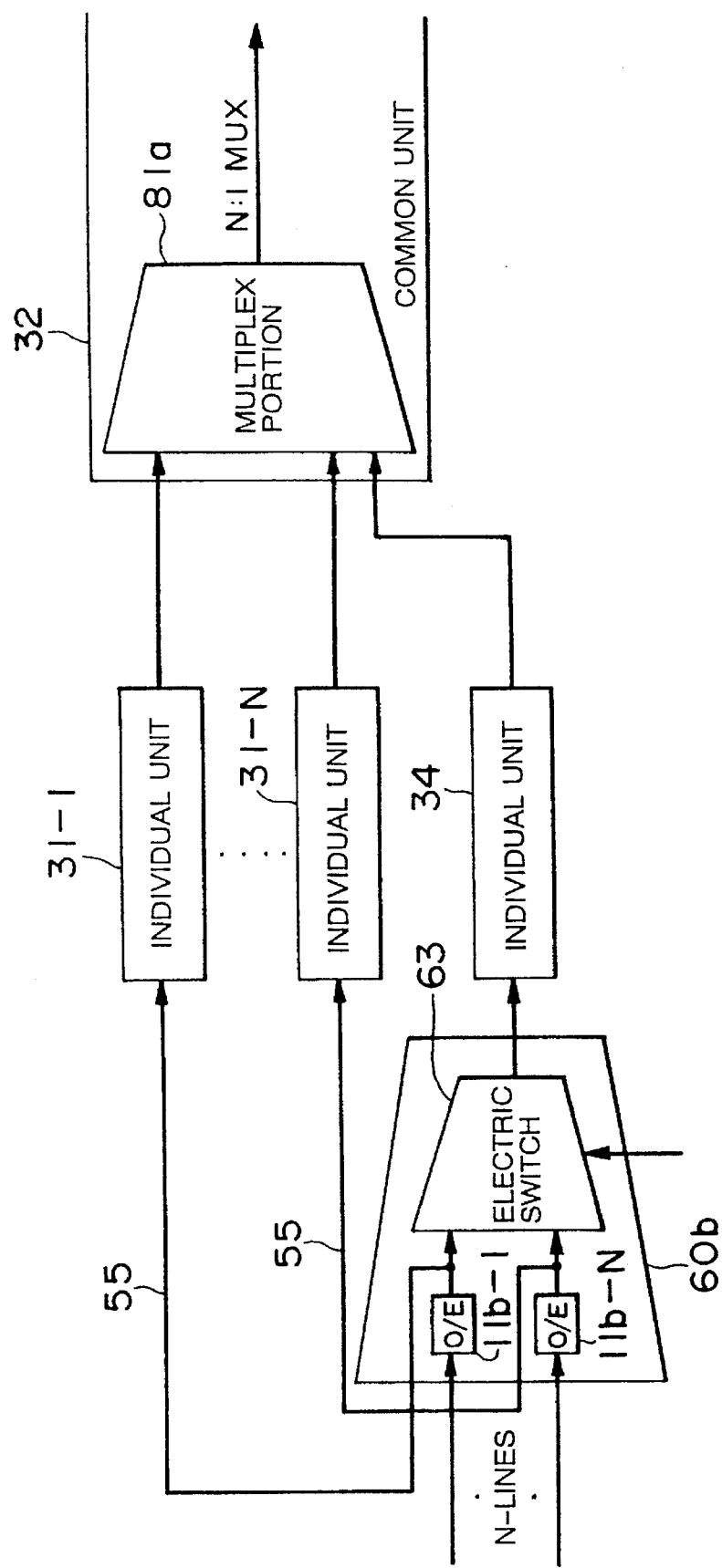
FIG. 29 is a block diagram showing a configuration of the switching system of the individual unit on an upstream side.
Figure 30:
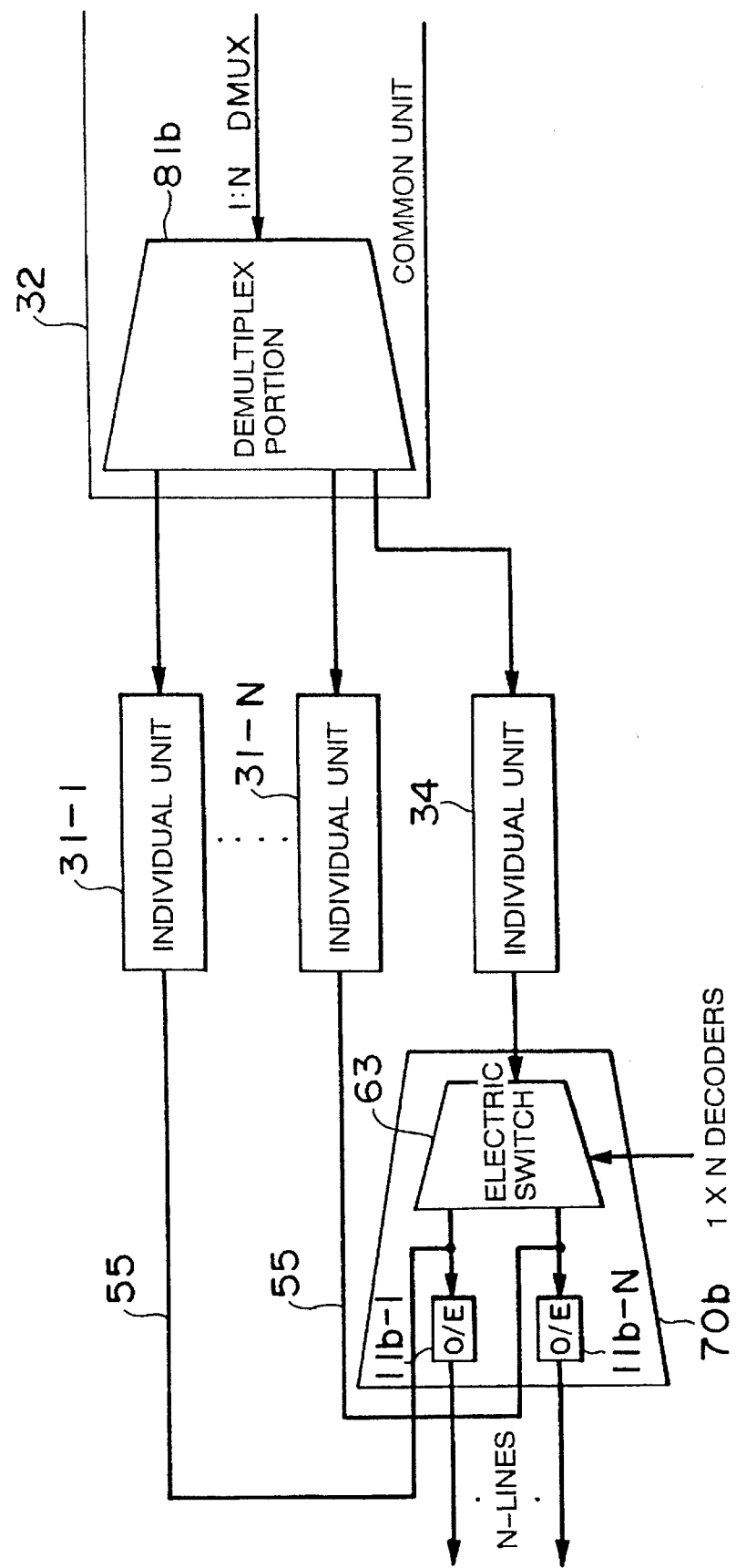
FIG. 30 is a block diagram illustrating a configuration of the switching system of the individual unit on a downstream side.

FIGS. 29 and 30 illustrate an example 4 of the switching system of the individual unit. FIG. 29 is a block diagram illustrating the switching system of the individual unit on the upstream side. FIG. 30 is a block diagram illustrating the switching system of the individual unit on the downstream side.

The selector 60b shown in FIG. 29 includes the O/E portions 11b-1 to 11b-N and an electric switch 63 connected thereto. A decoder 70b illustrated in FIG. 30 also includes the O/E portions 11b-1 to 11b-N and the electric switch 63 connected thereto, Further, the O/E portions 11b-1 through 11b-N are connected via electric signal lines 55 to the 0-system individual units 31-1 through 31-N. A 1-system individual unit 34B is connected to the electric switch 63.

Based on such a construction, the optical signals coming from the TEs 1-21 to 1-2N are converted into electric signals by the O/E portions 11b-1 to 11b-N and transmitted via the electric signal lines 55 to the individual units. If constructed in this way, the O/E portions and the E/O portions do not have to be provided in the individual units 31-1 through 31-N, thereby making it possible to reduce the physical size thereof.

(Example of Switching System of Common Unit)

Figure 31:
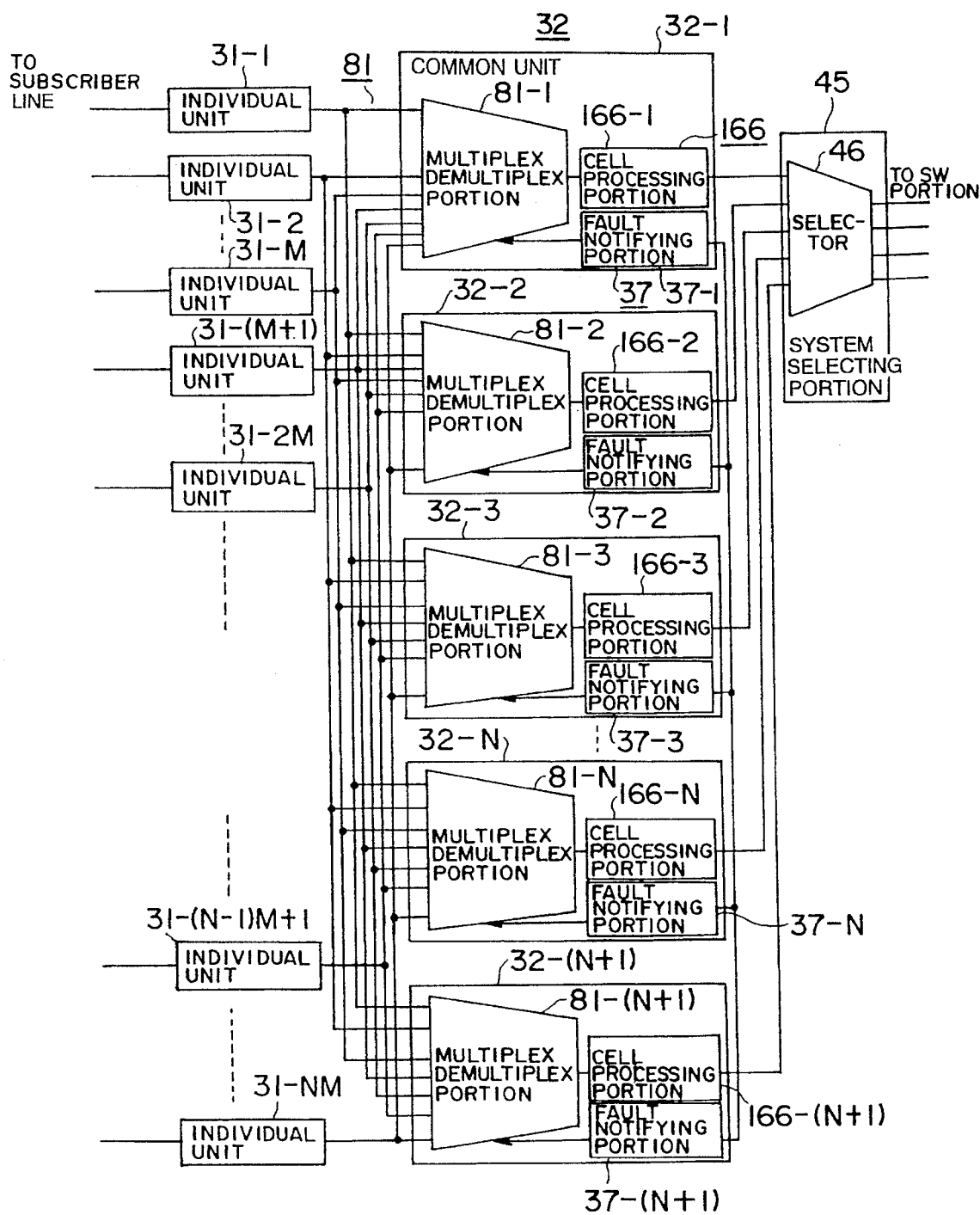
FIG. 31 is a block diagram showing a configuration of (N+1) sets of common units with respect to N-lines of lines.

Given next is an explanation of one example of the switching system of the common unit when the line interface is separated into the individual units and the common unit. FIG. 31 is a diagram illustrating a configuration of (N+1) sets of common units for N-lines of lines. The line interface depicted in FIG. 31 has (N+1) sets of common units 32-1 to 32-(N+1) for N-lines of lines.

The line interface includes N×M sets of individual units 31-1 to 31-NM corresponding to N×M lines of subscriber's line, (N+1) sets of common units 32-1 to 32-(N+1) connected respectively to the individual units and a system selection unit 45 connected to (N+1) sets of the common units 32-1 to 32-(N+1) and a switch (SW) unit.

Any one (N+1) sets of the common units 32-1 to 32-(N+1) is employed if one of N-sets of the common unit breaks down. That is, one standby common unit for switching if trouble occurs is provided for N-lines of the lines.

The individual units and the common units are connected to each other, whereby outputs from N×M sets of the individual units 31-1 to 31-NM are distributed to all of (N+1) sets of the common units 32-1 through 32-(N+1).

Each individual unit includes the photoelectric converting portion 11, the SDH terminal portion 12 and the cell synchronous portion 13a in, e.g., the separate configuration example 4 of the line interface shown in FIG. 9. The functions of these elements have already been explained, and hence their descriptions are omitted herein.

Each of the common units 32 (32-1 through 32-(N+1)) is equipped with multiple/demultiplex portion 81 (81-1 through 81-(N+1)), cell processing portions 166 (166-1 to 166-(N+1)) connected to the multiplex/demultiplex portions 81-1 through 81-(N+1) and fault notifying portions 37 (37-1 through 37-(N+1)) connected to the multiplex/demultiplex portions 81-1 through 81-(N+1).

Each of the multiplex/demultiplex portions 81-1 to 81-(N+1) selects M-sets of the individual units and outputs the cells from these individual units to the cell processing portions 166. For example, the multiplex/demultiplex portion 81-1 selects M-sets of the individual units 31-1 to 31-M, while the multiplex/demultiplex portion 81-N selects M-sets of the individual units 31-(N−1)M+1 to 31-NM.

Each of the cell processing portions 166-1 to 166-(N+1) includes the OAM portion 16, the UPC portion 14, the accounting portion 15, the VPI/VCI converting portion 18 in, e.g., the separate configuration example 4 of the line interface as depicted in FIG. 9. The functions of these elements have already been explained, and hence their descriptions are omitted herein.

Each of the fault notifying portions 37-1 to 37-(N+1), if a fault occurs in the self individual unit, notifies all other fault notifying portions of a fault identification number. Also, the fault notifying portion provided in the standby system common unit, when receiving the fault identification number, outputs the switching signal for switching from the fault common unit to the self common unit to the self multiplex/demultiplex portion on the basis of the fault identification number.

The system selection unit 45 includes the selector 46 for outputting the output data of N-lines of the lines by selecting N-pieces of outputs with respect to the (N+1) pieces of inputs from (N+1) sets of the common units.

Figure 32:
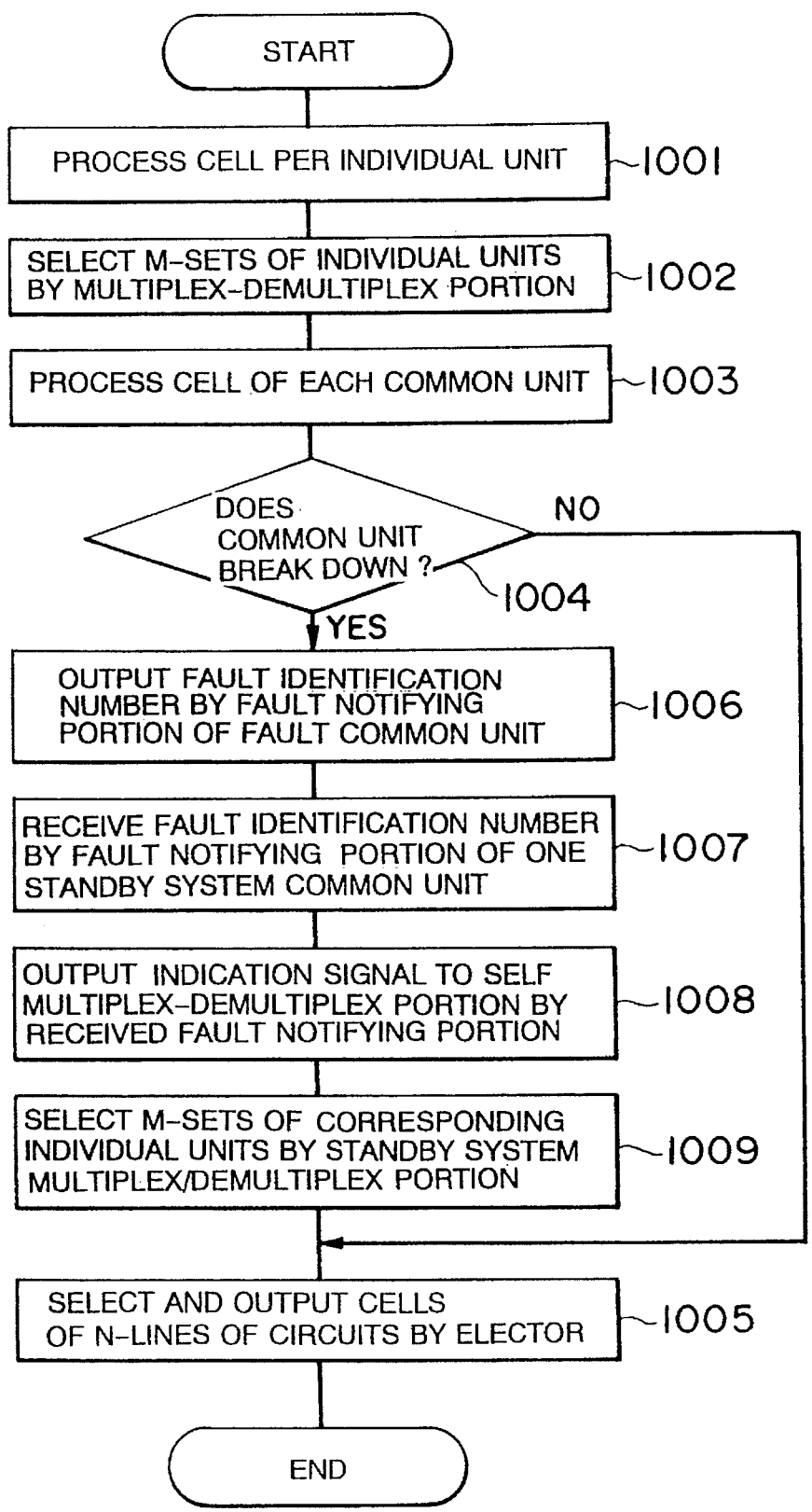
FIG. 32 is a flowchart showing an operation of the line interface shown in FIG. 31.

Next, the operations of the thus constructed line interface separated into the individual units and the common unit will be discussed with reference to a flowchart of FIG. 32.

At first, each individual unit performs the processing such as a cell synchronization (step 1001). Next, each of the multiplex/demultiplex portions 81-1 to 81-(N+1) selects M-sets of the individual units (step 1002). For instance, the multiplex/demultiplex portion 81-1 selects M-sets of the individual units 31-1 to 31-M, while the multiplex/demultiplex portion 81-2 selects M-sets of the individual units 31-(M+1) to 31-2M.

In this manner, each multiplex/demultiplex portion selects M-sets of the corresponding individual units, and the multiplex/demultiplex portion 81-N selects M-sets of the individual units 31-(N-1)M+1 to 31-NM. Note that the multiplex/demultiplex portion 81-(N+1) does not select M-sets of the individual units but lets these units in the standby system.

Next, the cell processing portions 166-1 to 166-N within each common unit perform processes such as an accounting process with respect to the cells from the corresponding multiplex/demultiplex portions (step 1003).

Further, each of the fault notifying portions 37-1 to 37-(N+1) determines whether or not any trouble occurs in the self common unit (step 1004). If no troubles occurs in the self common unit, the selector 46 transmits the cell data from the common units 32-1 through 32-N to the SW unit (step 1005).

On the other hand, each of the fault notifying portions 37-1 through 37-(N+1), if the fault is caused in the self common unit, notifies all other fault notifying portions of the fault identification number (step 1006). For example, if the trouble occurs in the common unit 32-1, the fault notifying portion 37-1 notifies all other fault notifying portions of the fault identification number.

At this time, the fault notifying portion 37-(N+1) provided in the standby system common unit, e.g., the common unit 32-(N+1) receives the fault identification number and recognizes the fault common unit from this fault identification number (step 1007).

The fault notifying portion 37-(N+1) outputs the switching signal for switching from the fault common unit 32-1 to the self common unit 32-(N+1) to the self multiplex/demultiplex portion 81-(N+1) on the basis of the fault identification number (step 1008).

Then, the standby system common unit 32-(N+1) selects M-sets of the corresponding individual units 31-1 through 31-M (step 1009), and the operation proceeds to step 1005.

Thus, in the line interface, (N+1) sets of the common units are provided for N-lines of lines, and the individual units and the common units are connected to each other. One of (N+1) sets of the common units is set for the standby system. With this arrangement, even if the trouble occurs in the common unit, the standby system common unit is usable, and, hence, the cell data of N-lines of the lines can be continuously processed.

Further, the single standby system common unit described above is not confined to a given common unit, e.g., the common unit 32-(N+1), but may be one of (N+1) sets of the common units. For instance, the common unit 32-1 may be employed for the standby system. In this case, the arrangement may be, for example, such that the multiplex/demultiplex portion 81-2 selects M-sets of the individual units 31-1 to 31-M, while the multiplex/demultiplex portion 81-(N+1) selects M-sets of the individual units 31-1(N−1)M+1 to 31-NM.

Figure 33:
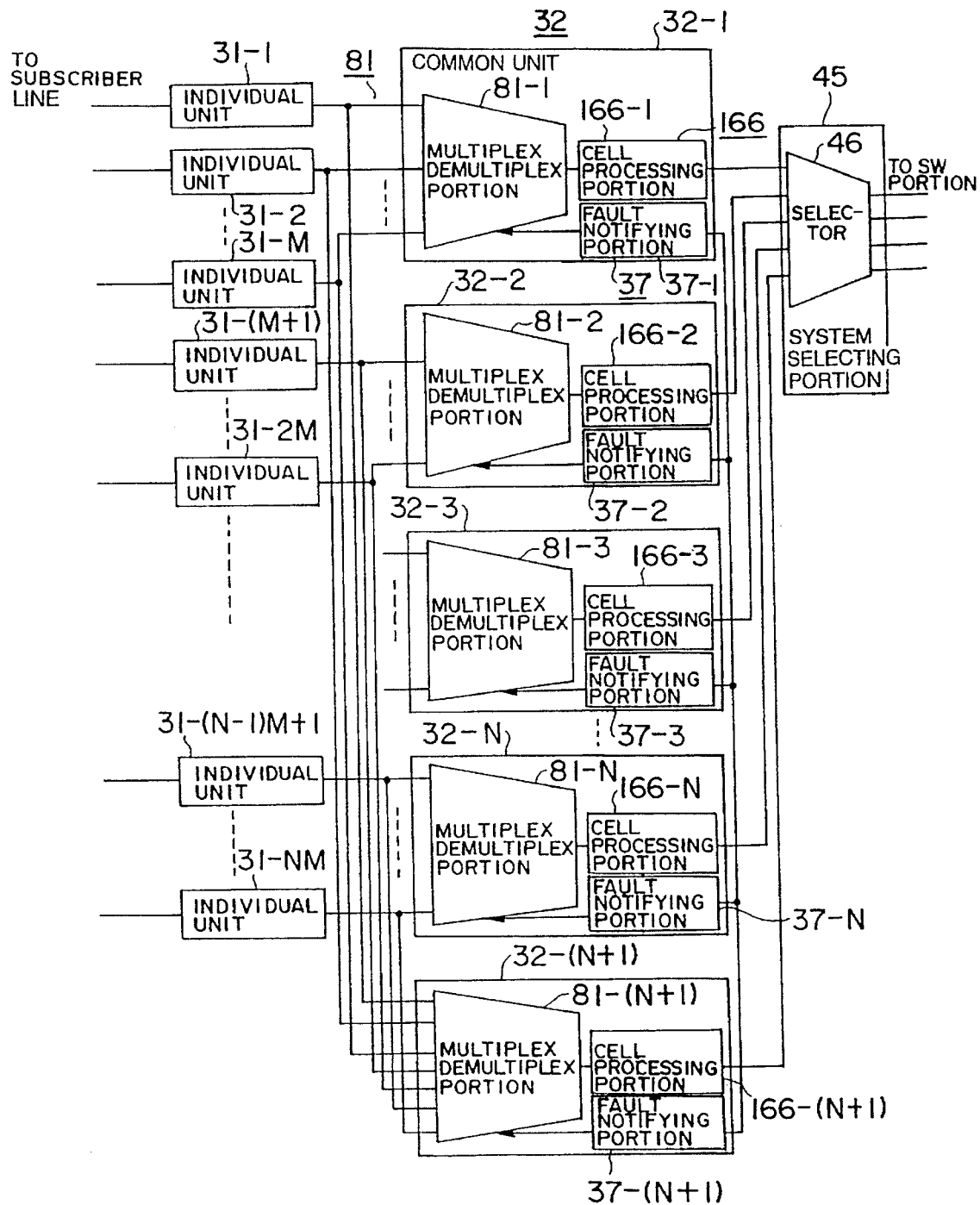
FIG. 33 is a block diagram illustrating a configuration in which a standby system common unit is fixed to one of (N+1) sets of common units.

Moreover, FIG. 33 illustrates a configuration in which the standby system common unit is fixed in one of (N+1) sets of the common units. Referring to FIG. 33, M-sets of the individual units 31-1 to 31-M are connected to the common unit 32-1. Connected also to the common unit 32-2 are M-sets of the individual units 31-(M+1) through 31-2M. Similarly, M-sets of the individual units 31-(N−1)M+1 to 31-NM are connected to the common unit 32-N. Further, N×M sets of the individual units 31-1 to 31-NM are connected to the common unit 32-(N+1).

In this case, one common unit 32-(N+1) is employed as a fixed standby system common unit. As explained above, the standby system common unit shown in FIG. 31 is arbitrarily selectable from (N+1) sets of the common units. This configuration yields the following effects as compared with the configuration in which the standby system common unit illustrated in FIG. 33 is fixed in one of (N+1) sets of the common units.

More specifically, if the standby system common unit is fixed, and if a certain active system common unit breaks down, the standby system common unit is employed as an active system common unit. Then, when the active system fault common unit is removed, repaired and again inserted in the same position, an operation is required to reset the common unit used for the active system to the standby system common unit.

However, if the standby system common unit is arbitrarily selectable, the above setting operation is not required, and, therefore, the operation can be eliminated.

(Configuration of Common unit for Accommodating A Plurality of Individual Units Having Interfaces Different from Each Other)

Figure 34:
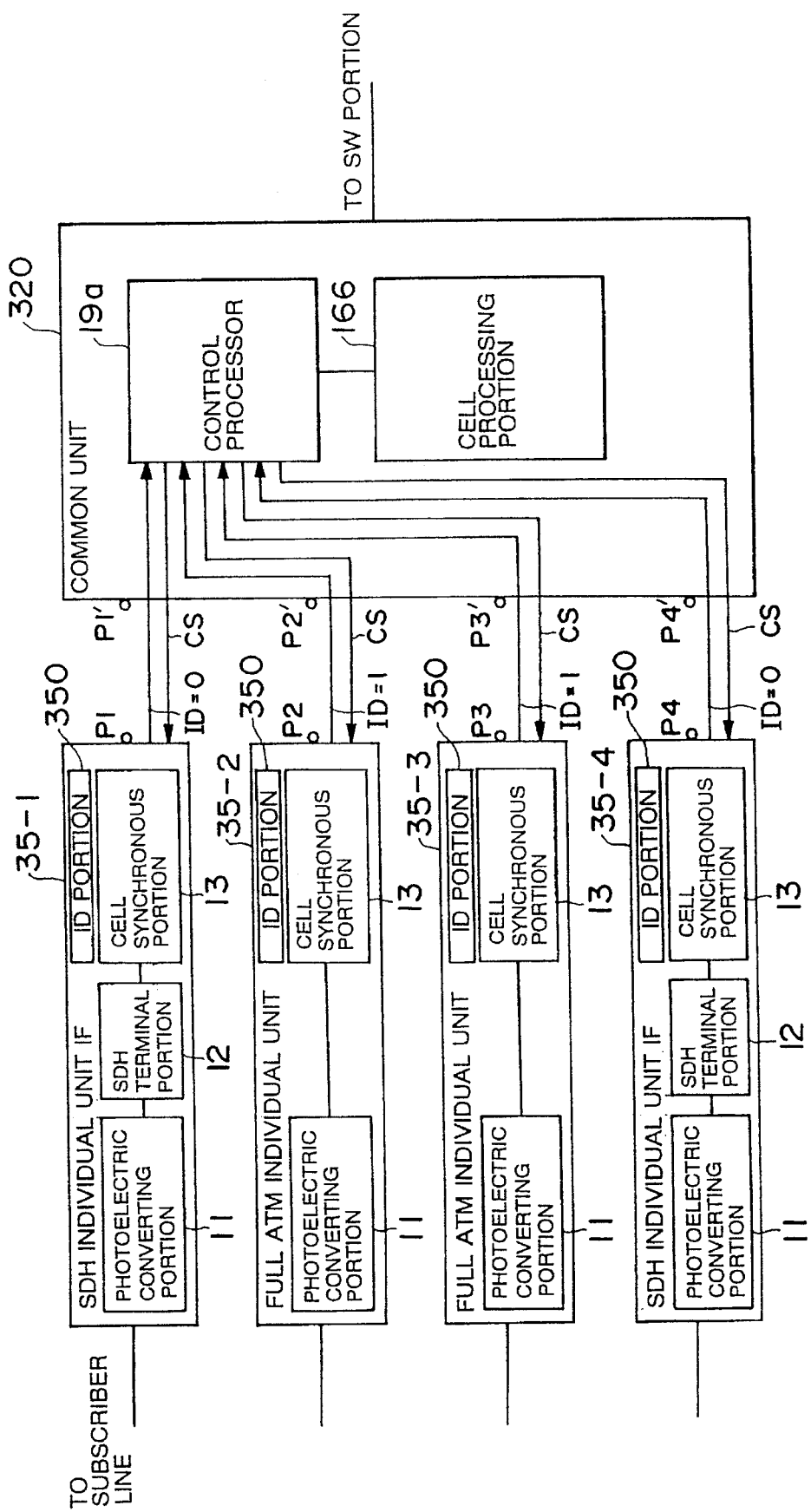
FIG. 34 is a block diagram illustrating a configuration of the common unit accommodating the plurality of individual units having interfaces different from each other.

Next, FIG. 34 illustrates a configuration of the common unit for accommodating a plurality of individual units having interfaces different from each other. Referring to FIG. 34, the line interface includes two SDH individual unit interfaces (IF) 35-1, 35-4, two full-ATM individual units 35-2, 35-3 and a common unit 320 to which the above individual unit IFs are connected.

A port P1 of the SDH individual unit IF 35-1 is connected to a port P1' of the common unit, whereby the SDH individual unit IF 35-1 is packaged in the common unit 320. A port P2 of the full ATM individual unit IF 35-2 is connected to a port P2' of the common unit, whereby the full ATM individual unit IF 35-2 is packaged in the common unit 320. This is the same with the SDH individual unit IF 35-4 and the full ATM individual unit IF 35-3.

Each of the SDH individual unit IFs 35-1, 35-4 has the photoelectric converting portion 11, the SDH terminal portion 12 connected to the photoelectric converting portion 11, the cell synchronous portion 13 connected to the SDH terminal portion 12 and an ID portion 350. The elements exclusive of the ID portion 350 have already been explained in the embodiments discussed above, and their details are omitted.

The ID portion 350 in the SDH individual unit IFs 35-1, 35-4 sends, to the common unit 320, an identification number (ID=0) indicating that the IF itself is an SDH individual unit IF when the IF itself is packaged in the common unit 320.

Each of the full ATM individual unit IFs 35-2, 35-3 includes the photoelectric converting portion 11 and the cell synchronous portion 13 connected to the photoelectric converting portion 11. These elements have already been explained in the embodiments discussed above, and their explanations will be omitted. That is, since the cell is transferred in the ATM format from the subscriber's line, the SDH terminal portion 12 is removed. This point is the same as the above-mentioned.

The ID portion 350 in the full ATM individual unit IFs 35-2, 35-3 sends, to the common unit 320, an identification number (ID=1) indicating that the IF itself is the full ATM individual unit IF when the IF itself is packaged in the common unit 320.

The common unit 320 is equipped with a control processor 19a and a cell processing portion 166 controlled by the control processor 19a.

The control processor 19a recognizes the identification numbers ID sent from the SDH individual unit IFs 35-1, 35-4 and the full ATM individual unit IFs 35-2, 35-3 and, if these identification numbers are 1, transmits ATM layer alarm data indication signal to the full ATM individual unit IFs 35-2, 35-3.

The control processor 19a, if the identification number is 0, transmits SDH physical layer alarm data indication signals to the SDH individual unit IFs 35-1, 35-4.

The cell processing portion 166 includes, although not illustrated, the OAM portion 16, the UPC portion 14, the accounting portion 15 and the VPI/VCI converting portion 18. The functions of these elements have already been explained, and their descriptions are omitted herein.

Figure 35:
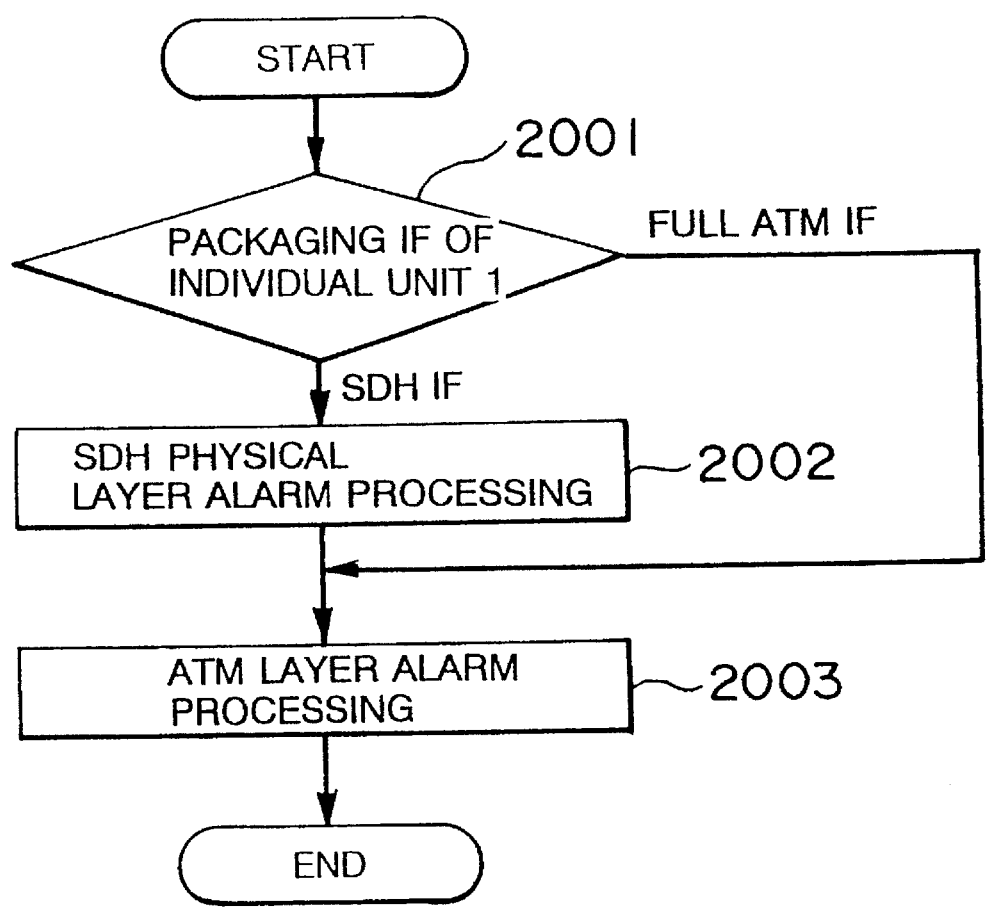
FIG. 35 is a flowchart showing the operation of the line interface illustrated in FIG. 34.

Next, the operation of the thus constructed line interface will be described with reference to FIG. 35. At the beginning, the control processor 19a determines whether or not the SDH individual IF or the full ATM individual unit IF is packaged in the common unit 320 (step 2001).

Herein, for instance, when the full ATM individual unit IF 35-2 is packaged in the common unit 320 through the port P2, ID portion 350 sends the identification number ID=1 to the control processor 19a.

Thereupon, the control processor 19a transmits the ATM layer alarm data indication signal to the full ATM individual unit IF 35-2.

The full ATM individual unit IF 35-2 transmits an item of ATM layer alarm data about a data error or the like to the control processor 19a on the basis of the above indication signal. That is, ATM layer alarm processing is executed (step 2003).

On the other hand, for example, when the SDH individual unit IF 35-1 is packaged in the common unit 320 through the port P1, ID portion 350 sends the identification number ID=0 to the control processor 19a. Thereupon, the control processor 19a transmits the SDH physical layer alarm data indication signal to the SDH individual unit IF 35-1.

The SDH individual unit IF 35-1 checks the SDH terminal portion 12 and transmits an item of SDH physical layer alarm data about the data error or the like to the control processor 19a on the basis of the above indication signal. That is, SDH physical layer alarm processing is executed (step 2002).

Further, the ATM layer alarm processing is carried out (step 2003), thus finishing the processing.

As described above, when the common unit accommodates the plurality of individual units having the IFs different from each other, the control processor 19a is capable of executing the control operations corresponding to the different individual unit IFs on the basis of the identification numbers received.

Next, an embodiment 5 of the ATM switching equipment will be discussed. This ATM switching equipment makes positive detection when a cell generating mechanism included in the line interface breaks down and is removed.

Figure 36:
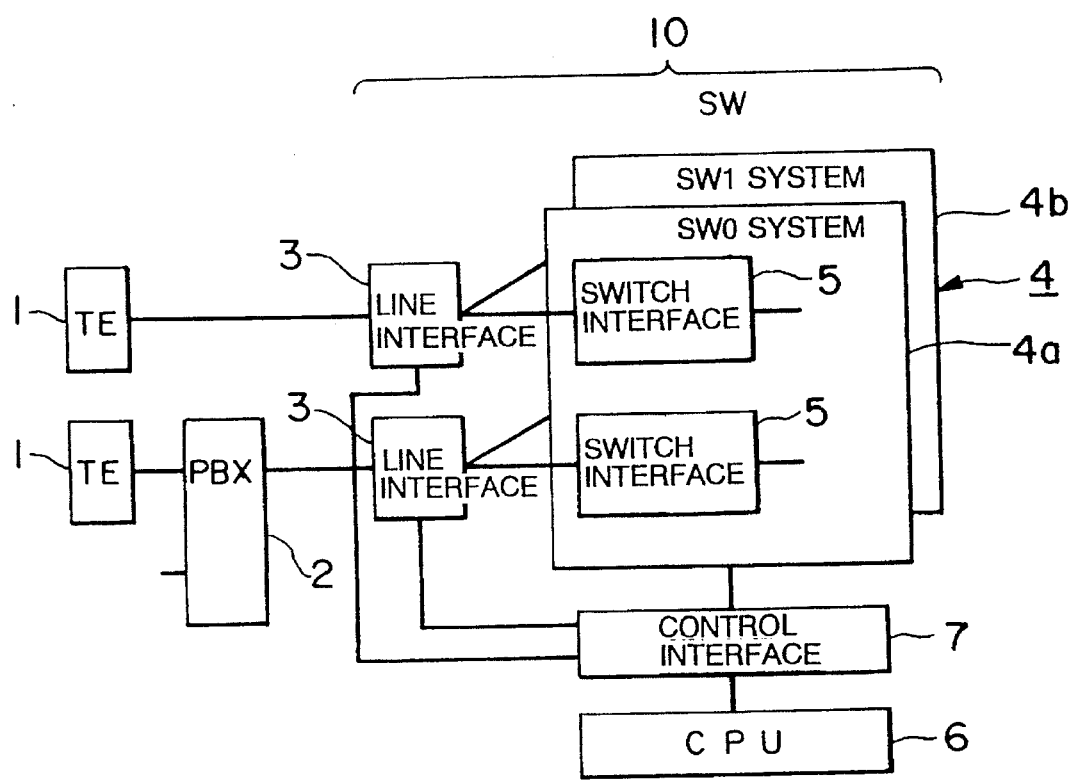
FIG. 36 is a block diagram illustrating a construction of an embodiment of the ATM switching equipment including a cell frame detection circuit.

FIG. 36 illustrates an ATM switching equipment 10 in accordance with the embodiment 5 of the present invention. This embodiment 5 is characterized such that all the constructive elements of the line interface 3 are provided per subscriber's terminal (TE) 1 or private branch exchange (PBX) 2, and, besides, each line interface 3 remains as an individual unit.

Referring to FIG. 36, the ATM switching equipment 10 is made up of the subscriber's terminals (TE) 1, the line interfaces 3 connected to the private branch exchange (PBX) 2 to which the subscriber's terminals 1 are connected, the switch (SW) 4 to which the line interfaces 3 are connected, a control interface 7 connected to the switch (SW) 4 and each line interface 3 and a CPU 6 connected to the control interface 7.

Note that there are shown only two sets of the line interfaces 3 in FIG. 36.

Figure 37:
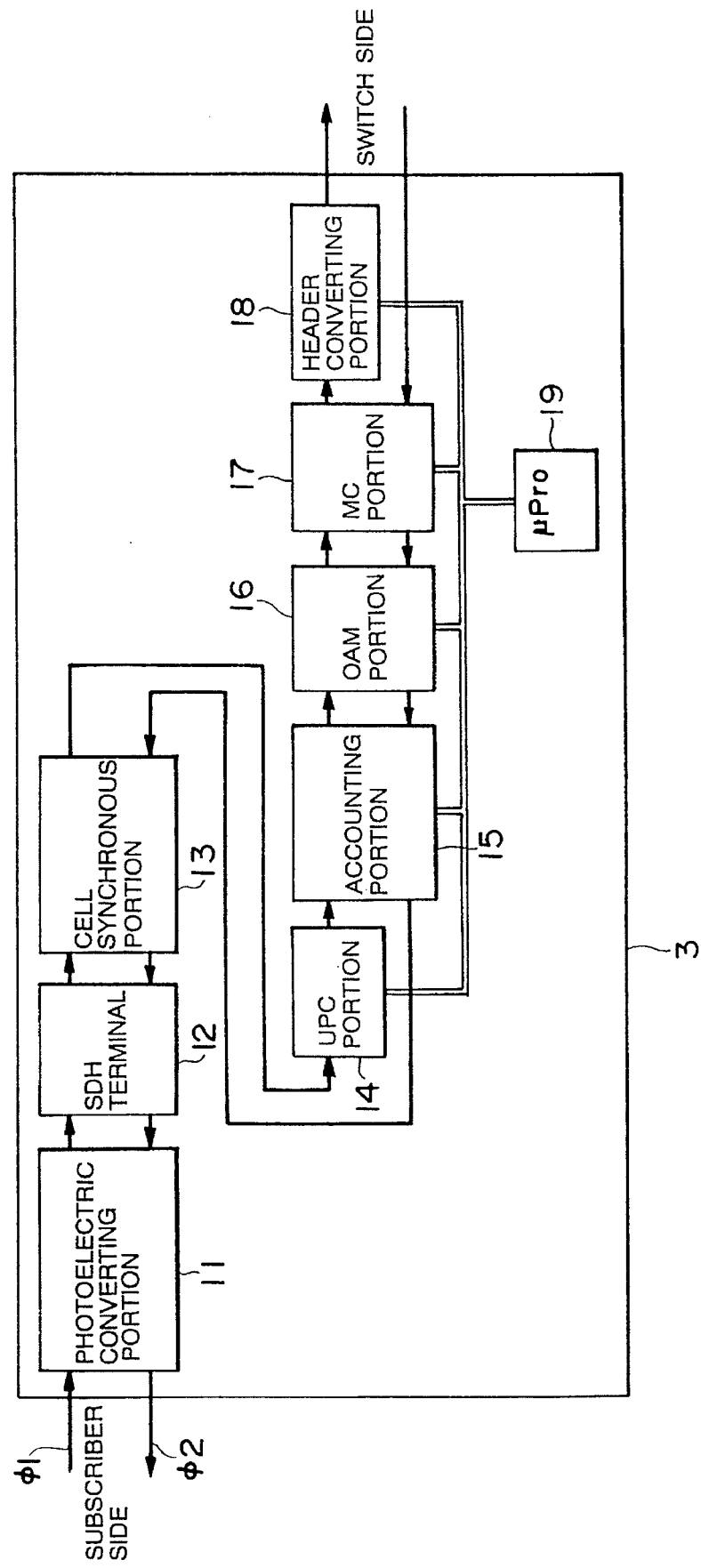
FIG. 37 is a block diagram illustrating a specific configuration of the line interface shown in FIG. 36.

The line interface 3 is an interface for converting a signal transmitted in a synchronous digital hierarchy (SDH) format from each subscriber's terminal (TE) 1 or the private branch exchange (PBX) 2 into an ATM format and transmitting the signal to the switch (SW) 4. FIG. 37 illustrates a specific configuration of this line interface 3.

Turning to FIG. 37, the photoelectric converting portion 11 converts an optical signal from the subscriber's terminal (TE) 1 composed of the optical cable via a subscriber's line $\phi 1$ into an electric signal or inversely converts the electric signal into an optical signal. The SDH terminal portion 12 terminates the SDH format transmitted from the subscriber's terminal (TE) 1.

The cell synchronous portion 13 performs a cell synchronous detection be effecting the cell error control on the basis of the header error control data written to the cell header. Added further, as illustrated in FIG. 52, in parallel to a data cell DATA are a cell enable signal ENB indicating whether the cell is valid or not, a cell frame signal FRM indicating a heading of the cell and a clock pulse CLK.

Note that the above cell enable signal ENB, the cell frame signal FRM and the clock pulse CLK are always outputted even when a specific item of data is not contained in the cell (DATA). In this case, the cell enable signal ENB keeps an invalid status "L".

The usage quantity parameter control UPC portion 14 monitors a traffic density, thereby managing a band which should be employed by the user. The accounting portion 15 collects pieces of accounting data by counting the number of cells transmitted in sequence. The OAM portion 16 manages the OAM cell. The MC portion 17 monitors the cell quality by measuring the cell error characteristic, the cell loss characteristic and the cell delay characteristic by use of MC cells.

The header converting portion 18 reads the VCI and the VPI written to the cell header, converts the VCI into an output destination VPI and converts the VCI into an output destination VCI. A path of the output destination is determined per cell by this output destination VCI and the output destination VPI. The microprocessor 19 controls the UPC portion 14, the accounting portion 15, the OAM portion, the MC portion 17 and the header converting portion 18.

Referring to FIG. 36, the switch (SW) 4 transmits the cell generated in the line interface 3 but based on the ATM format to one of (unillustrated) trunk lines. The switch (SW) 4 switches the signal path on that occasion. Note that the switch (SW) 4 has a plurality of buffers for temporarily storing the cells transmitted to the trunk lines. Further, the switch (SW) 4 is dualized to cope with any fault occurring and is therefore usable while being switched over to one of a "0" system switch 4a or a "1" system switch 4b.

A switch interface 5 is an interface between the line interface 3 and the switch (SW) 4. This switch interface 5 will be illustrated in greater detail in FIG. 38.

Figure 38:
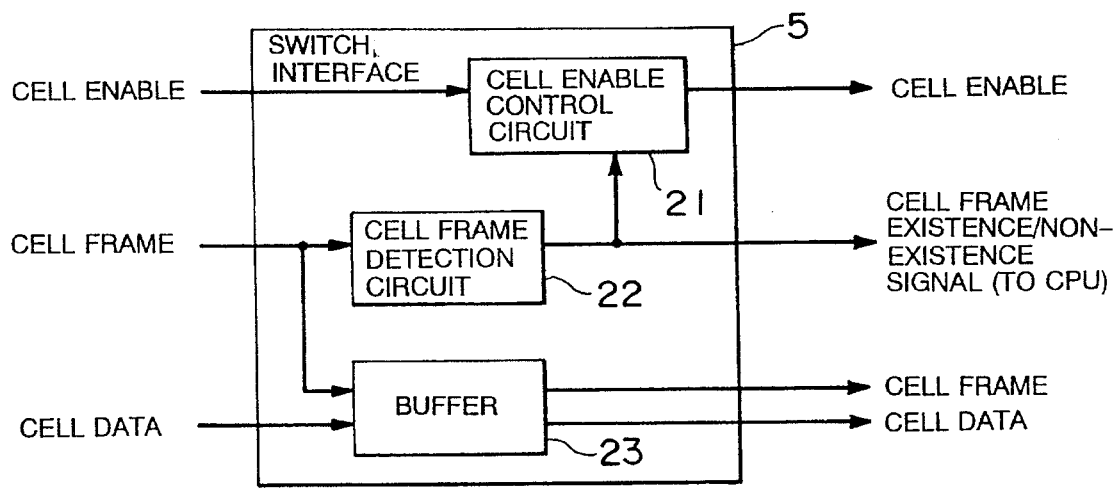
FIG. 38 is a block diagram illustrating a specific configuration of a switch interface shown in FIG. 36.

As illustrated in FIG. 38, the switch interface 5 has inputted thereto the cell enable signal, the cell frame signal and the cell data signal which constitute the cell. Further, this switch interface 5 comprises a cell frame detection circuit 22 to which the cell frame signal is inputted, a cell enable control circuit 21 to which the cell enable signal and an output signal of the cell frame detection circuit 22 are inputted and a buffer 23 to which the cell frame signal and the cell data are inputted.

Figure 39:
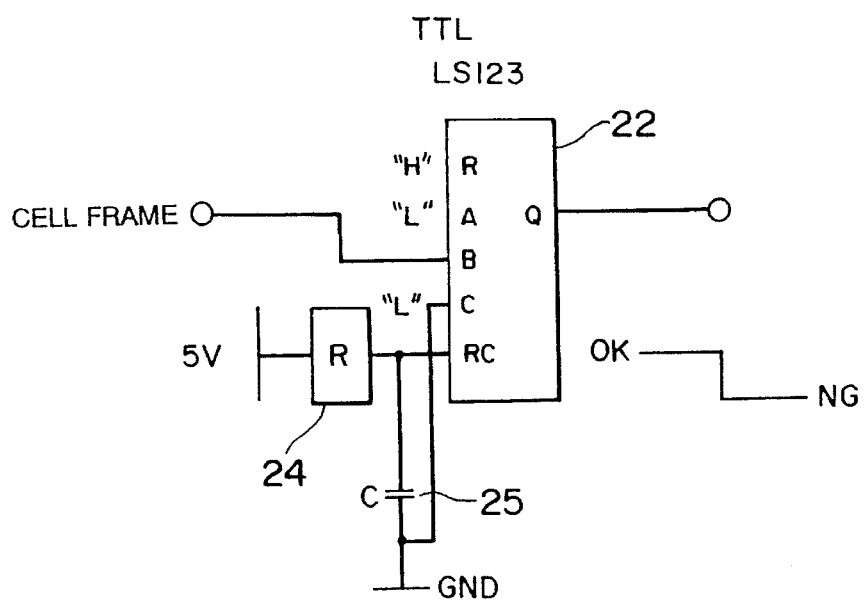
FIG. 39 is a line diagram illustrating a specific configuration of the cell frame detection circuit shown in FIG. 38.

The cell frame detection circuit 22 detects whether or not the cell is actually transmitted from the line interface 3 by monitoring the cell frame signal. As a result of this detection, when the cell frame detection circuit 22 determines that the cell is not actually transmitted from the line interface 3, there is a high probability that the line interface 3 has been removed. FIG. 39 shows a specific configuration of the cell frame detection circuit 22.

Referring to FIG. 39, the cell fame detection circuit 22 is constructed as an IC (Integrated Circuit) based on a TTL (Transistor-Transistor Logic). The cell frame detection circuit 22 is a kind of a sequential circuit. An output signal from output terminal Q is switched over to "H" or "L" depending on specific conditions of input signals from input terminals R, A, B, C ad RC.

The input terminal R is a terminal for inputting a reset signal. The input terminal C is connected to one terminal of a capacitor C25 and to the ground. Inputted to the input terminal RC is an output of an integrating circuit consisting of a resistor R24 and the capacitor C25.

Accordingly, an input signal to this input terminal RC is a function of a time constant determined by the value of the resistor R24 and the value of the capacitor C25. Also, a signal assuming "L" at all times is inputted to the input terminal A.

The sequential circuit within the cell frame detection circuit 22 sets the Q output signal at the "L" level when the input signal of the input terminal B is always at "H" or "L" during a fixed period determined by the input signal of the RC input terminal. The sequential circuit sets the Q output signal at "H" when there is seen a change in the input signal of the input terminal B.

From the above, the cell frame detection circuit 22 regulates the values of the resistor R24 and the capacitor C25, inputs a 1-cell-frame period and also inputs the cell frame signal to the input terminal B. Thereupon, if the cell frame signal changes during the 1-cell-frame period (during the period corresponding to one cell), i.e., if the bit indicating the cell heading is contained, the Q output signal becomes "H". On the other hand, if the cell frame signal does not change, viz., if the bit indicating the cell heading is not contained, the Q output signal becomes "L".

Hence, "H" of the Q output signal may be treated as normal, i.e., this implies that the cell is transmitted, while "L" is treated as abnormal, viz., this implies that the cell is not transmitted.

Referring to FIG. 38, the cell enable control circuit 21, when the output signal (Q output signal) of the cell frame detection circuit 22 assumes "H", outputs the cell enable signal unchanged but, when the same signal assumes "L", forcibly sets the inputted cell enable signal at "L".

In the cell frame detection circuit 22, however, there is a time delay since the output signal is outputted after the cell frame has been inputted. Accordingly, the cell enable control circuit 21 incorporates a function of a delay circuit to synchronize it with this time delay.

The buffer 23 absorbs a delay until the cell enable signal is transmitted from the cell enable control circuit 21.

Based on the above construction, the switch interface 5 outputs the cell enable signal, the cell frame signal, the cell data signal and a cell frame existence/non-existence signal conceived as an output signal of the cell frame detection circuit 22. These signals are synchronized with each other. Among these signals, the cell frame existence/non-existence signal is transmitted to the CPU 6, and other signals are batch-transferred within the switch (SW) 4.

Referring to FIG. 36, the CPU 6 is a processor for monitoring the status of the whole ATM switching equipment 10 and, at the same time, controlling the operation thereof. When detecting that the line interface 3 is removed in any switch interface 5, an item of detection data thereof is transmitted as the cell frame existence/non-existence signal to the CPU 6.

Accordingly, the CPU 6 is capable of recognizing whether or not the line interface 3 corresponding thereto is connected to all the subscriber's terminals (TE) 1. Further, the same items of data are transmitted to this CPU 6 from other ATM switching equipments within the network. Hence, if the line interface of any ATM switching equipment within the network is removed, the CPU 6 can recognizes this. The control interface 7 is an interface between the CPU 6, the switch (SW) 4 and the line interface 3.

Figure 40:
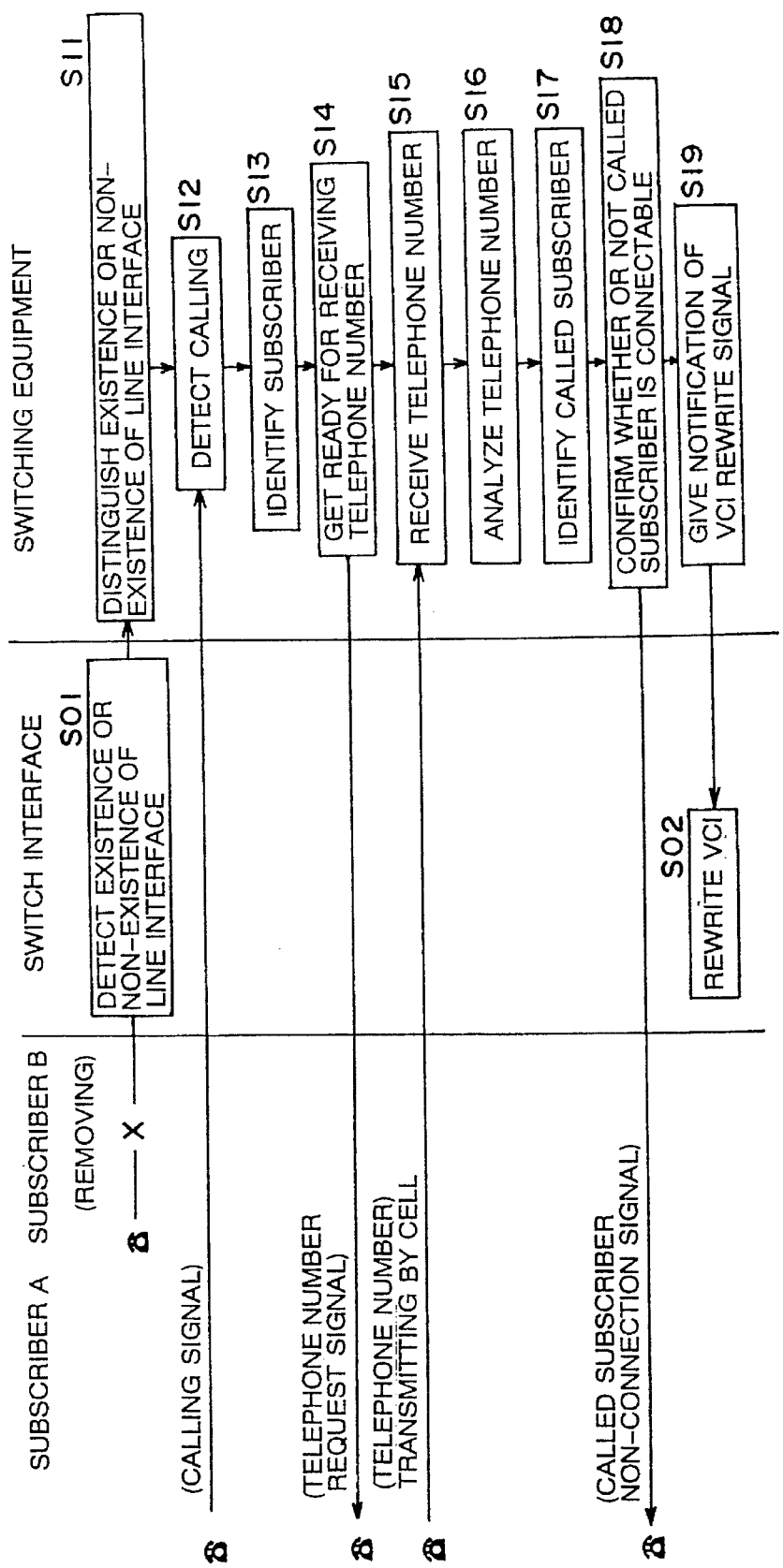
FIG. 40 is a flowchart showing processing executed for blocking the line in a CPU shown in FIG. 36.

Next, the operation of the thus constructed ATM switching equipment in the embodiment 5 will be explained with reference to an operating flow chart of FIG. 40.

Figure 52B:
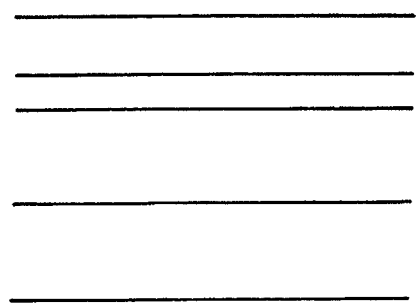
Figure 58:
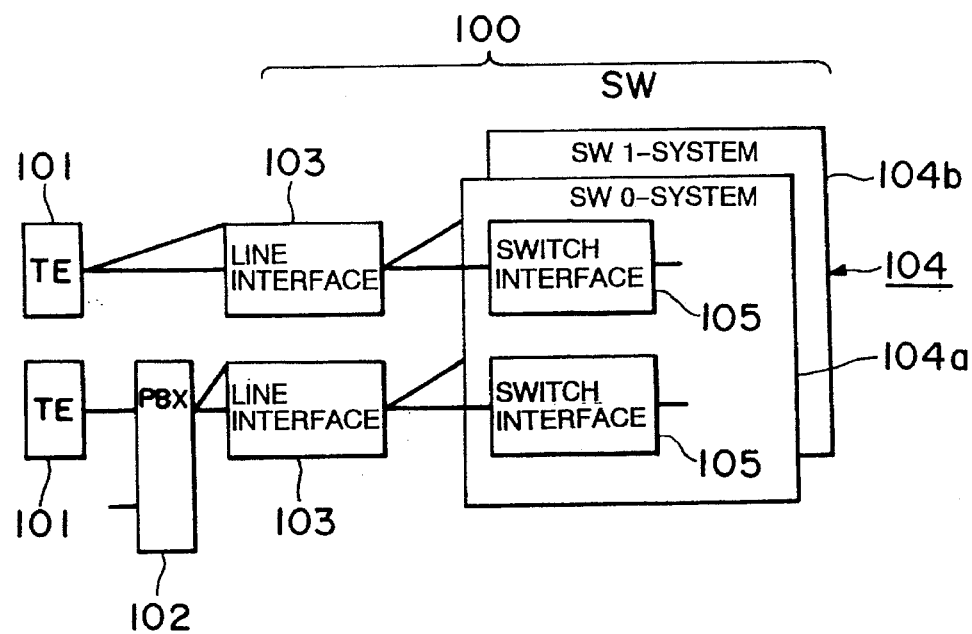
FIG. 58 is a block diagram of the conventional ATM switching equipment.

When the line interface 3 connected to the subscriber's terminal (TE) 1 of a subscriber B is removed for repairing or replacing, the input-side signals of the line interface 3 are, as illustrated in FIG. 52B, stacked at "H" with respect to all of the data cell (DATA), the cell enable signal (ENB), the cell frame signal (FRM) and the clock pulse (CLK).

Accordingly, it follows that the "H" signals are always inputted to the B input terminal of the cell frame detection circuit 22. If this status continues for more than a fixed time (a period in the normal status of the cell frame (FRM)) determined by the time constants of the resistor 24 and the capacitor 25, the cell frame detection circuit 22 recognizes that the normal cell frame (FRM) is not inputted. Therefore, the cell frame detection circuit 22 changes the Q output signal from "H" indicating the normal state to "L" indicating the abnormal state.

In accordance with the change of this Q output signal, the cell enable control circuit 21 forcibly sets the cell enable signal at "L".

Therefore, the signal outputted from this switch interface 5 is manifested invalid because of the cell enable signal (ENB) being at "L" at all times. Accordingly, no signal from this switch interface 5 is written to the unillustrated buffer within the switch (SW) 4. Further, the possibility is eliminated that this signal will be mixed in with the signals from other subscriber's terminals as if that signal is a cell.

In the manner described above, there is executed the detection of the existence or non-existence of the line interface in the switch interface 5 (step S01).

Next, the CPU 6 to which the cell frame existence/non-existence signal is transmitted distinguishes whether or not the line interface 3 corresponding to this switch interface 5 is removed (step S11).

Figure 41:
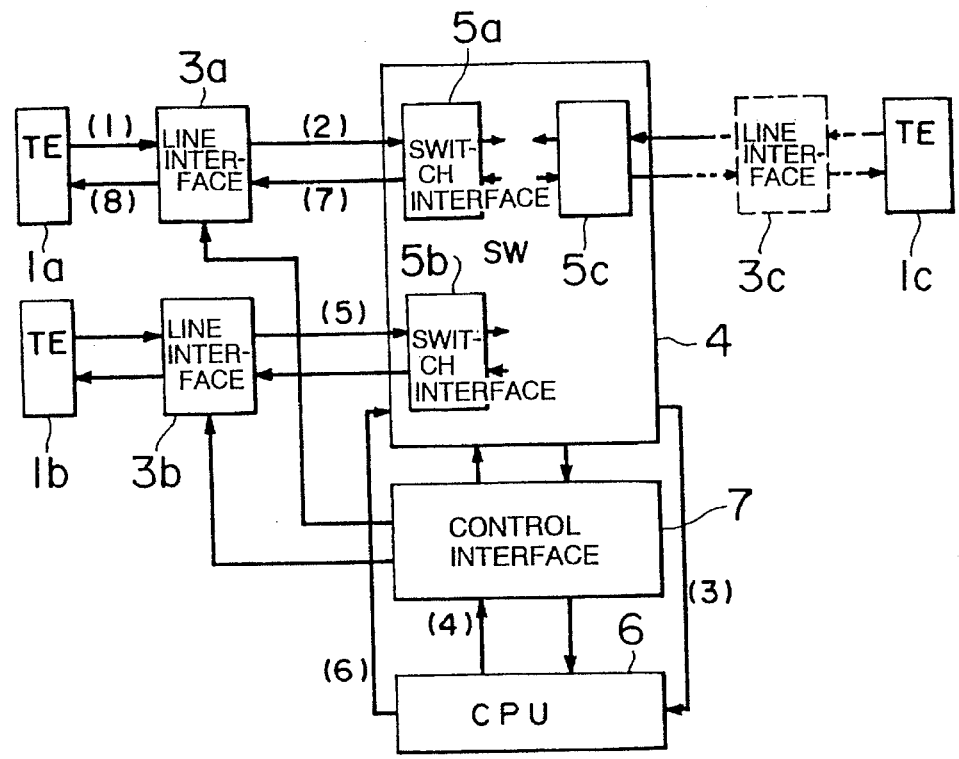
FIG. 41 is a block diagram into which FIG. 36 has been redrawn.

Given hereinbelow is an explanation of the processing executed by the CPU 6 receiving the transmission of a cell frame existence/non-existence identifying signal in order to block the line. FIG. 41, assisting this explanation, is a redrawn diagram in which the control flow of the CPU 6 is added to FIG. 36.

Referring to FIG. 41, a removed line interface 3c of the subscriber B is shown by a dotted line. Shown therein are a subscriber's terminal 1c corresponding to this line interface 3c and also a switch interface 5c. Illustrated further are unremoved line interfaces 3a, 3b. FIG. 41 illustrates subscriber's terminals 1a, 1b corresponding to these line interfaces 3a, 3b, respectively and also switch interfaces 5a, 5b.

To start with, when called from the subscriber's terminal (the subscriber's terminal 1a in FIG. 41) of a subscriber A (1)), a control signal of this calling is transmitted via the line interface 3a to the switch interface 5a ((2)). The switch interface 5a transfers the calling control signal transmitted to the CPU 6 via the switch 4 ((3)).

The CPU 6, upon receiving the calling, detects this calling (step S12). Then, the CPU 6 distinguishes which subscriber to send this calling (step S13). Next, the CPU 6 outputs a signal for requesting a telephone number of the destination to the subscriber's terminal 1a of the subscriber A and, at the same time, makes a preparation for receiving this telephone number (step S14).

When the telephone number is transmitted from the subscriber's terminal 1a of the subscriber A by the cell, the CPU 6 receives this number (step S15). Then, the CPU 6 analyzes the telephone number (step S16) and distinguishes a line of the called subscriber (step S17).

Next, the CPU 6 confirms whether or not the line of the called subscriber is in a connectable status (step S18). That is, the CPU 6, assuming that the line interface has been removed, checks whether or not the line of the called subscriber coincides with the line (herein, the line leading to the subscriber's terminal 1c of the subscriber B) recognized beforehand by the CPU 6.

As a result of this checking, if the line of the called subscriber is not coincident with the line of the subscriber B, and when determining that the connection is possible, the CPU 6 notifies ((5)) the line interface 3a of a signal for rewriting the VPI/VCI via the control interface 7 ((4)). In the line interface 3a notified of this signal, the microprocessor 19 indicates a header conversion to the header converting portion 18 (step S02).

The header converting portion 18 converts the VPI/VCI of the data sent from the call originating subscriber's terminal la into a VPI/VCI designated by signal from the CPU 6 and transmits, to the switch 4, a data cell having a header part to which the converted VPI/VCI is written. The switch 4 transfers the transmitted data cell to the destination subscriber's terminal 1b.

As a result of the above checking, if the line of the called subscriber is identical with the line of the subscriber B, and if when determining that the connection is impossible, the CPU 6 sends a signal indicating that the connection is impossible back to the switch 4. The switch 4 receiving this signal generates a signal (hereinafter referred to as an alarm sound signal) for making an alarm sound showing the impossible connection.

Subsequently, this alarm sound signal is outputted from the switch interface 5a and returned to the call originating subscriber's terminal 1a via the line interface 3a. The call originating subscriber's terminal 1a to which this alarm sound signal is transferred makes the alarm sound on the basis of the alarm sound signal.

Accordingly, since the line interface 3c of the line of the called subscriber is removed, the subscriber A can recognize that the subscriber's terminal 1c is in an impossible connection status. Hence, the calling is stopped, or alternatively, a restoration of line can be awaited.

Figure 42:
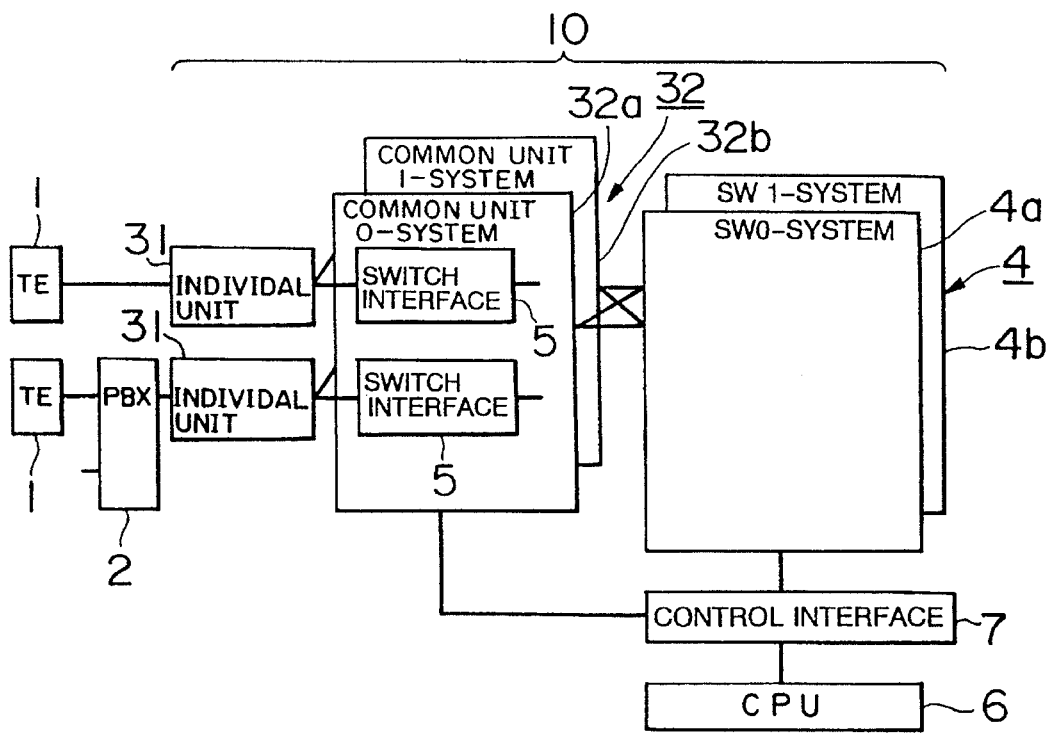
FIG. 42 is a block diagram illustrating a construction of another embodiment of the ATM switching equipment including a cell frame detecting line.

FIG. 42 illustrates the ATM switching equipment in accordance with an embodiment 6 of the present invention. In this embodiment 6, a part of the constructive elements of the line interface are provided per individual subscriber's terminal (TE) 1 or per private branch exchange (PBX) 2. Further, the remaining constructive elements of the line interface are provided in common to the respective subscriber's terminals (TE) 1, 2. Moreover, individual constructive elements of the line interface are provided for every subscriber's terminals (TE) 1, 2.

In the following description, some constructive elements of the line interface provided for every subscriber's terminals (TE) 1, 2 are termed an individual unit 31. The remaining constructive elements of the line interface provided for every subscriber's terminals (TE) 1, 2 are termed an common unit 32. Note that the repetitive explanations of the components common to the embodiment 5 will be omitted in some case.

Referring to FIG. 42, the ATM switching equipment 10 is constructed of a plurality of individual units 31 individually connected to the subscriber's terminals (TE) 1 or the private branch exchange (PBX) 2 to which the subscriber's terminal 1 is connected, an common unit 32 connected to these individual units 31, the switch (SW) 4 connected to one or a plurality of common units 32, the control interface 7 connected to the switch (SW) 4 and the common unit 32 and the CPU 6 connected to the control interface 7.

There are shown only two sets of the individual units 31 in FIG. 42. Only one common unit 32 is illustrated in FIG. 42.

Figure 43:
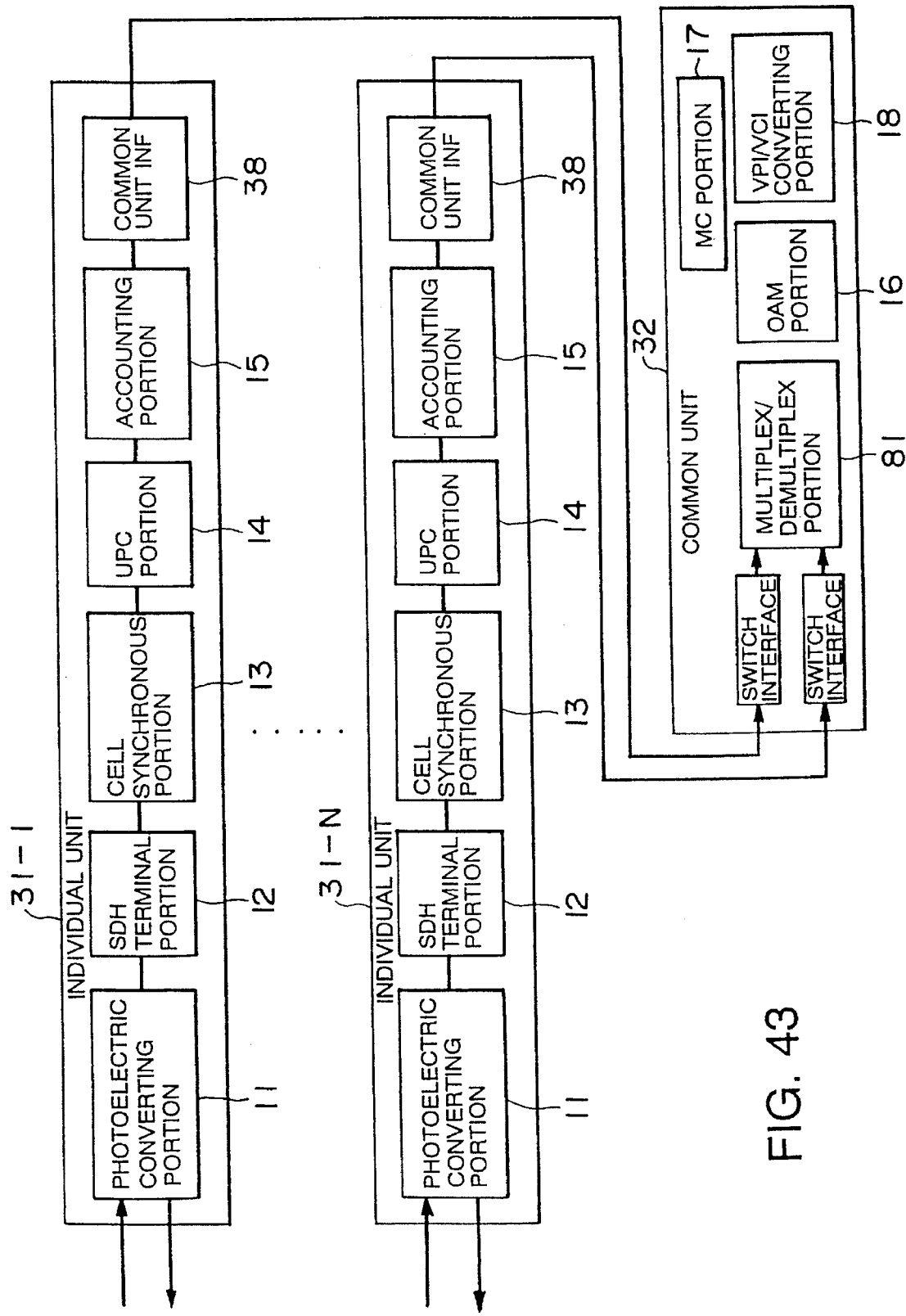
FIG. 43 is a block diagram illustrating specific configurations of an individual unit and a common unit of FIG. 42.

FIG. 43 illustrates a configurational example of a specific combination of the individual units 31 and the common unit 32. In the configurational example of FIG. 43, the constructive elements of the individual unit 31 are comparable to those in each constructive block of the line interface 3 shown in FIG. 37. They are the photoelectric converting portion 11, the SDH terminal portion 12, the cell synchronous portion 13, the UPC portion 14 and the accounting portion 15. The remaining elements, i.e., the OAM portion 16, the MC portion 17 and the header converting portion 18 are the constructive elements of the common unit 32.

Note that the individual unit 31 in FIG. 43 includes a common unit interface (INF) 38 for communications with the common unit 32.

The common unit 32 is provided with a plurality of switch interfaces 5 corresponding to the respective individual units 31 at I/O terminals on the side of the individual units 31. A configuration of this switch interface 5 is the same in the embodiment 5 (see FIG. 38). Further, the multiplex/demultiplex portion 81 is disposed between each switch interface 5 and the OAM portion 16. The multiplex/demultiplex portion 81 multiplexes the signals from the respective individual units 31 and demultiplexes the multiplexed signals, thus transmitting the signals to the individual units 31.

The thus constructed individual units 31 are individually prepared and connected to the subscriber's terminal (TE) 1 or the private branch exchanges (PBX) 2. Note that a suffix put on the quote numeral "31" of the individual unit represents a serial number of the individual unit 31 in FIG. 43. Hence, it is presumed that there are N-sets of the individual units 31.

As obvious from FIG. 42, the common unit 32 is dualized to cope with any fault occurring and usable with a switch-over to either a "0"-system" individual unit 32a or a "1"-system" individual unit 32b. Similarly, the switch (SW) 4 is also dualized to cope with the fault and is usable with a switch-over to either a "0-system" switch 4a or a "1"-system" switch 4b.

Figure 44:
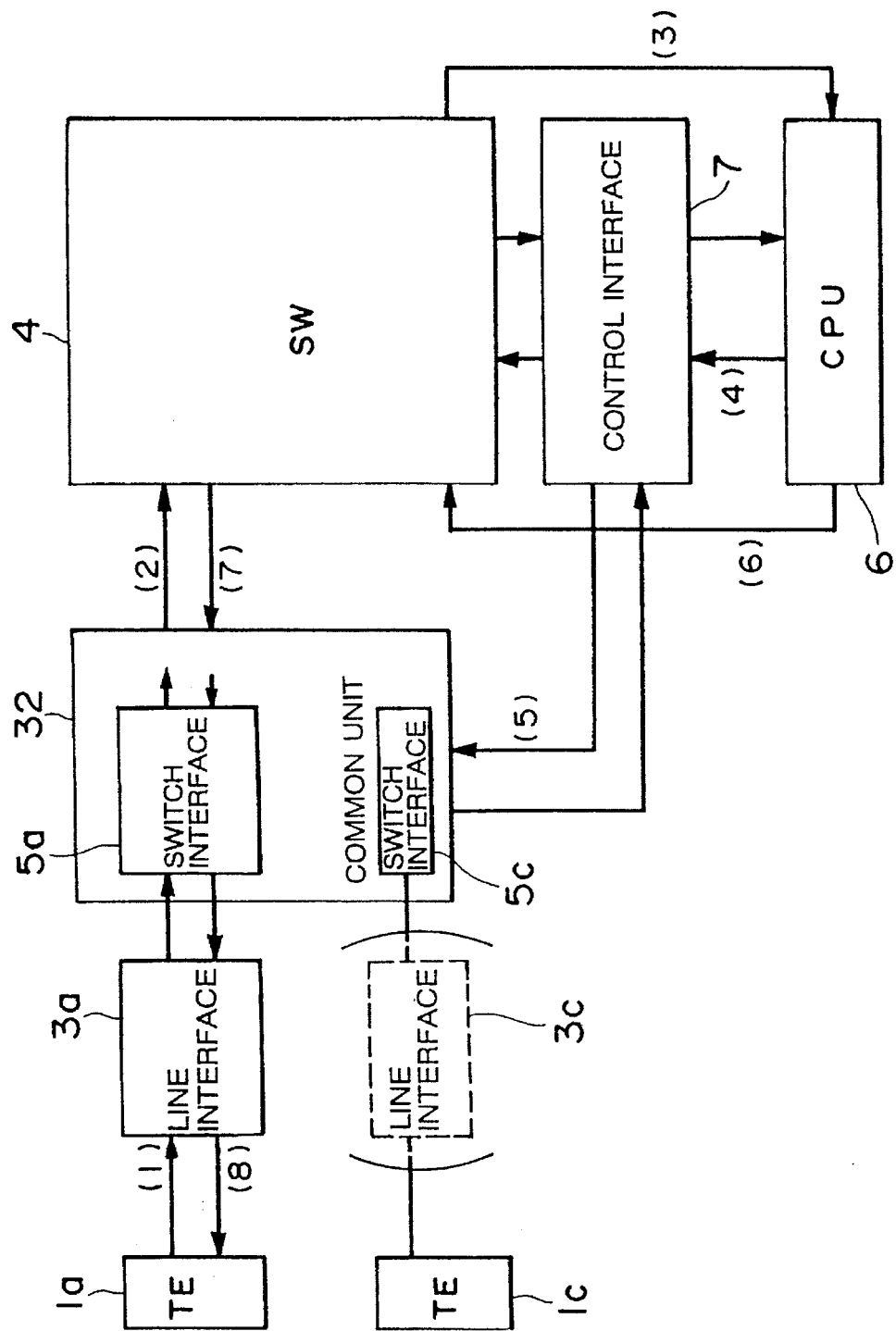
FIG. 44 is a block diagram into which FIG. 43 has been redrawn.

The operation of the thus constructed ATM switching equipment in the embodiment 6 is the same to the embodiment 5 except for the fact that a target to be removed is the individual unit 31 and the fact that the switch interface 5 is provided within the common unit 32. Therefore, the elements in FIG. 44 are marked with the same symbols as those in FIG. 41, and their explanations will be omitted.

Figure 45:
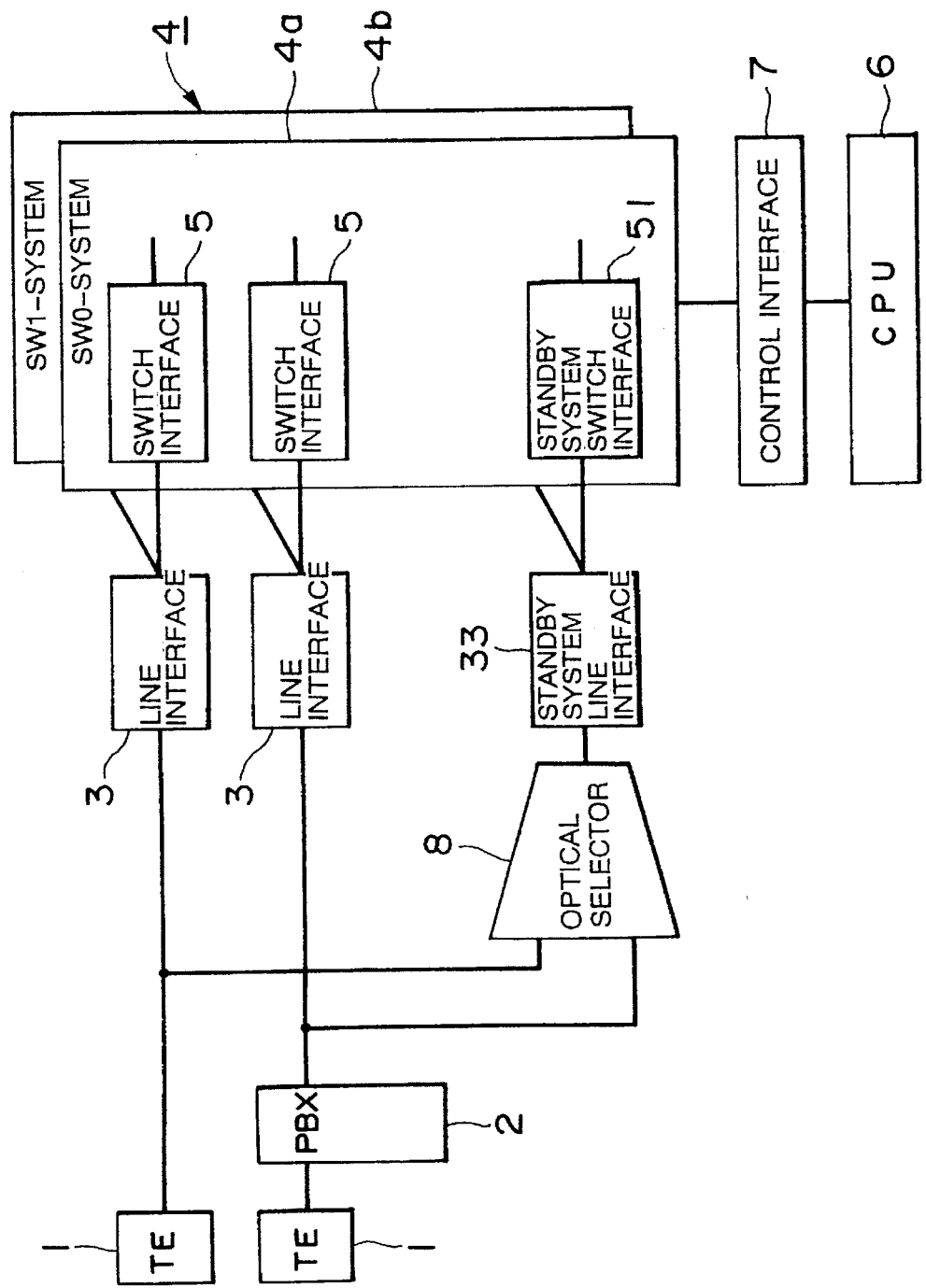
FIG. 45 is a block diagram showing a construction of a further embodiment of the ATM switching equipment including the cell frame detection circuit.

FIG. 45 illustrates the ATM switching equipment in accordance with an embodiment 7 of the present invention. This embodiment 7 is characterized by including all the components of the ATM switching equipment in the embodiment 5 and further standby line interfaces 33. The standby line interface 33 is utilized by switching if any line interface 3 breaks down or is removed. Note that the repetitive explanations of the constructive elements common to the embodiment 5 will be omitted in some cases.

That is, the subscriber's lines of FIG. 45 are provided with branch lines between the subscriber's terminals (TE) 1 thereof or the private branch exchanges (PBX) 2 and the line interfaces 3. All these branch lines are connected to the I/O terminals of the optical selector 8 on the side of the subscriber's terminals.

This optical selector 8 connects one of the plurality of branch lines connected thereto on the side of the subscriber's terminals to the line interface-side I/O terminal or performs selective switching with no connection. This switching may be done manually. Further, the optical selector 8 receives data about the existence or non-existence of the line interface from the CPU 6 and may effect switching corresponding thereto.

The line interface-side I/O terminal of this optical selector 8 is connected to the standby system line interface 33. This standby system line interface 33 is connected to a standby system switch interface 51 within the switch (SW) 4.

This standby system line interface 33 incorporates absolutely the same configuration and function as those of the active system line interfaces 3. Further, the standby system switch interface 51 has absolutely the same configuration as that of the active system switch interface 5.

Other configurations and control contents in the ATM switching equipment in this embodiment 7 are the same as those in the ATM switching equipment in the embodiment 5. In this embodiment 7, however, it is possible to easily avoid the abnormal state by providing the optical selector 8, the standby system line interface 33 and the standby system switch interface 51. Thus, if any line interface 3 breaks down or is removed, the optical selector 8 connects the branch line corresponding to the broken-down or removed line interface 3 to the standby system line interface 33.

That is, the active system line interface 3 is completely replaced with the standby system line interface 33, and, hence, it is possible to minimize the time during which the CPU 6 blocks the line. Note that the optical selector 8 can effect instantaneous switching on the basis of the data about the existence or non-existence of the line interface 3, which data comes from the CPU 6.

Figure 46:
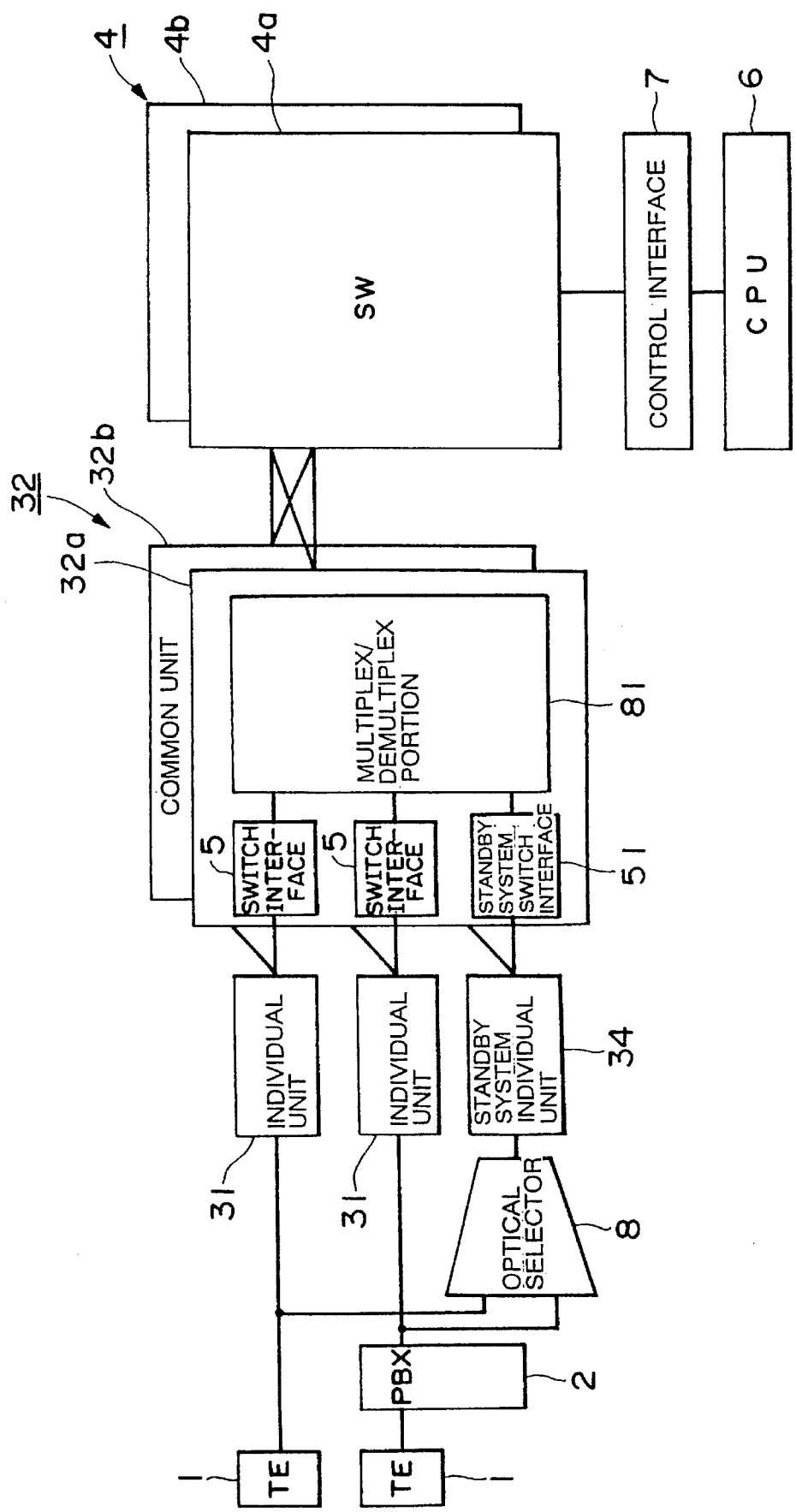
FIG. 46 is a block diagram illustrating a configuration of still another embodiment of the ATM switching equipment including the cell frame detection circuit.

The standby system shown in embodiment 7 can also be adopted in the ATM switching equipment in which the line interface is separated into the individual units and the common units. FIG. 46 illustrates an embodiment 8 of the thus constructed ATM switching equipment.

The embodiment 8 is characterized by further providing all the constructive elements of the ATM switching equipment in the embodiment 6 (see FIG. 42) with a standby individual unit 34. Note that the repetitive explanations of the constructive elements common to the embodiment 6 will be omitted as the case may be.

That is, the common unit side I/O terminal of the optical selector 8 incorporating the same function as that in the embodiment 7 is connected to the standby system individual unit 34. This standby system individual unit 34 is connected to the standby system switch interface 51 within the common unit 32. This standby system individual unit 34 has absolutely the same configuration and function as those of the active system individual unit 31.

Figure 47:
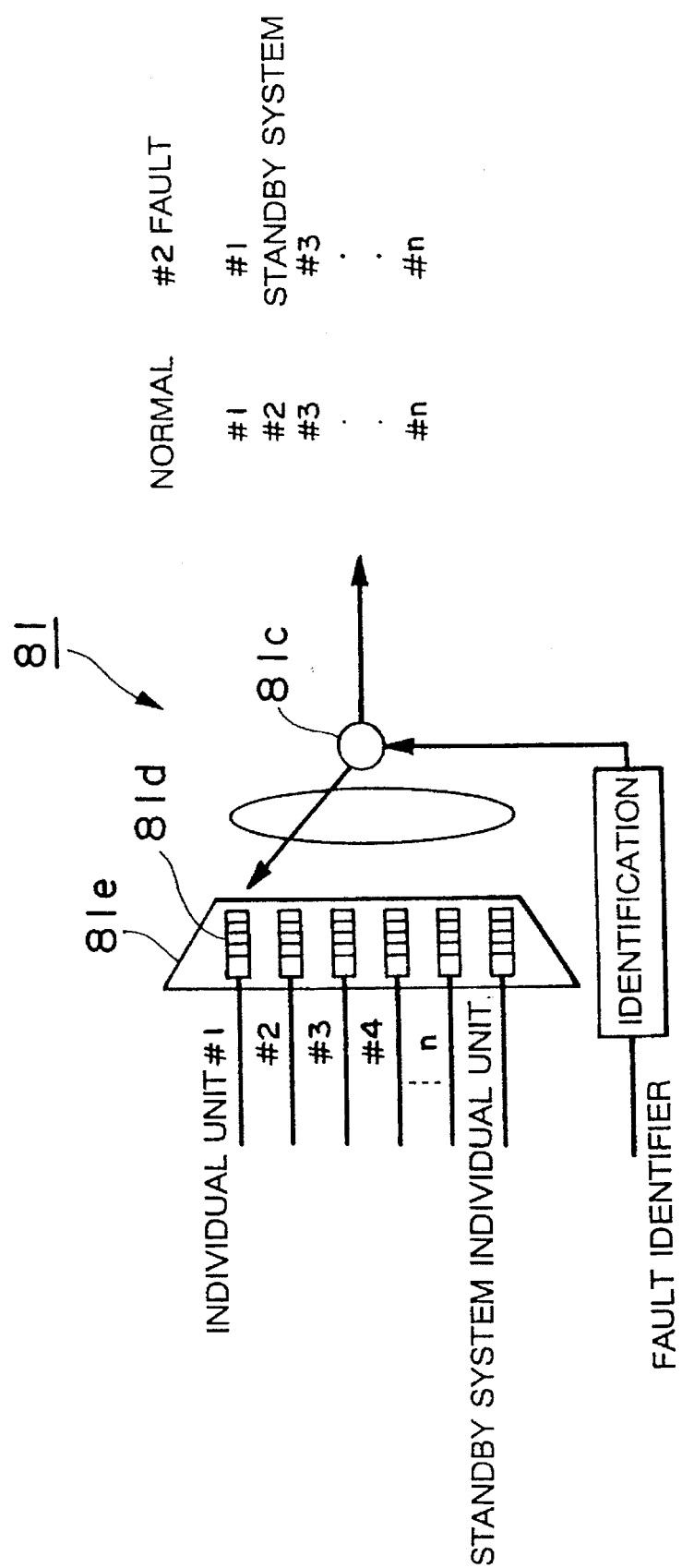
FIG. 47 is a conceptual diagram showing a configuration of a multiplex/demultiplex portion.

Explained next is a configuration of the multiplex/demultiplex portion 81 within the common unit 32 which is adopted in this embodiment 8. FIG. 47 is a diagram schematically illustrating the configuration of this multiplex/demultiplex portion 81. More specifically, the multiplex/demultiplex portion 81 comprises a buffer portion 81e and a switch portion 81c.

The buffer portion 81e has a plurality of buffer elements 81d respectively connected to signal lines (#1-n) from the active system individual units 31 and a signal line extending from the standby system individual unit 34. The switch portion 81c sequentially makes conductive the plurality of buffer elements in accordance with a fixed sequence, thereby effecting multiplexing.

Transmitted from the CPU 6 to this switch portion 81c is a fault identifier indicating when any individual unit 31 breaks down or is removed. The switch portion 81c selects n-sets of the individual units from (n+1) sets of the individual units in accordance with this fault identifier, thereby performing multiplexing.

Specifically, switching is conducted in the sequence of #1–#n in the normal status. If any individual unit 31 breaks down or is removed, the switch portion 81c executes switching to make a conduction to the standby system individual unit 34 in place of the buffer element corresponding to this individual unit 31 in accordance with the fault identifier. For example, when the fault identifier indicates #2, the switching is conducted in the sequence of #1, standby, #3, . . . , #n.

Note that this fault identifier is transmitted also to the optical switch 8. In the same way as in the embodiment 7, the individual unit is switched over based on the fault identifier. Thus, on the upstream side, multiplexing of n:1 is effected. Whereas on the downstream side, demultiplexing of 1:n is likewise conducted.

Other configurations and control contents in the ATM switching equipment in this embodiment 8 are the same as those in the ATM switching equipment in accordance with the embodiment 6 of FIG. 42. In this embodiment 8, however, the configuration of the multiplex-demultiplex portion is modified by providing the optical selector 8, the standby system individual unit 34 and the standby system switch interface 51. The abnormal state can be thereby instantaneously avoided.

To be more specific, if any line interface 3 breaks down or is removed, the optical selector 8 connects the branch line corresponding to the broken-down or removed active system individual unit 31 to the standby system individual unit 34. Further and simultaneously, the multiplex/demultiplex portion 81 sets the active system individual unit 31 off the switching target but substitutes the standby system individual unit 34 as the switching target.

With this operation, the active system individual unit 31 is instantaneously completely replaced with the standby system individual unit 34, and it is therefore possible to minimize the time for which the CPU 6 blocks the line.

Given next is an explanation of a test for a fault restoration executed in the embodiment 8. In the ATM switching equipment, when newly inserting a package of the line interface or the individual unit, before setting on-line, it is required that a continuity test for a channel be performed to detect a route disconnection of the channel within the equipment and an abnormality in cell routing.

That is, the cell generating portion inputs, to the channel, test cells to which data of a sequence number and a pseudo random pattern are added. The cell generating portion then collects the relevant cells after the cells have been transmitted via all the line interfaces. Subsequently, these collected cells are checked, and an on-channel conductive state and a cell transfer quality are checked.

It should be noted that in the conventional ATM switching equipment, it is impossible to detect the fact that the line interface or the individual unit has been removed or inserted. It is therefore required that the continuity test is executed manually.

Figure 48:
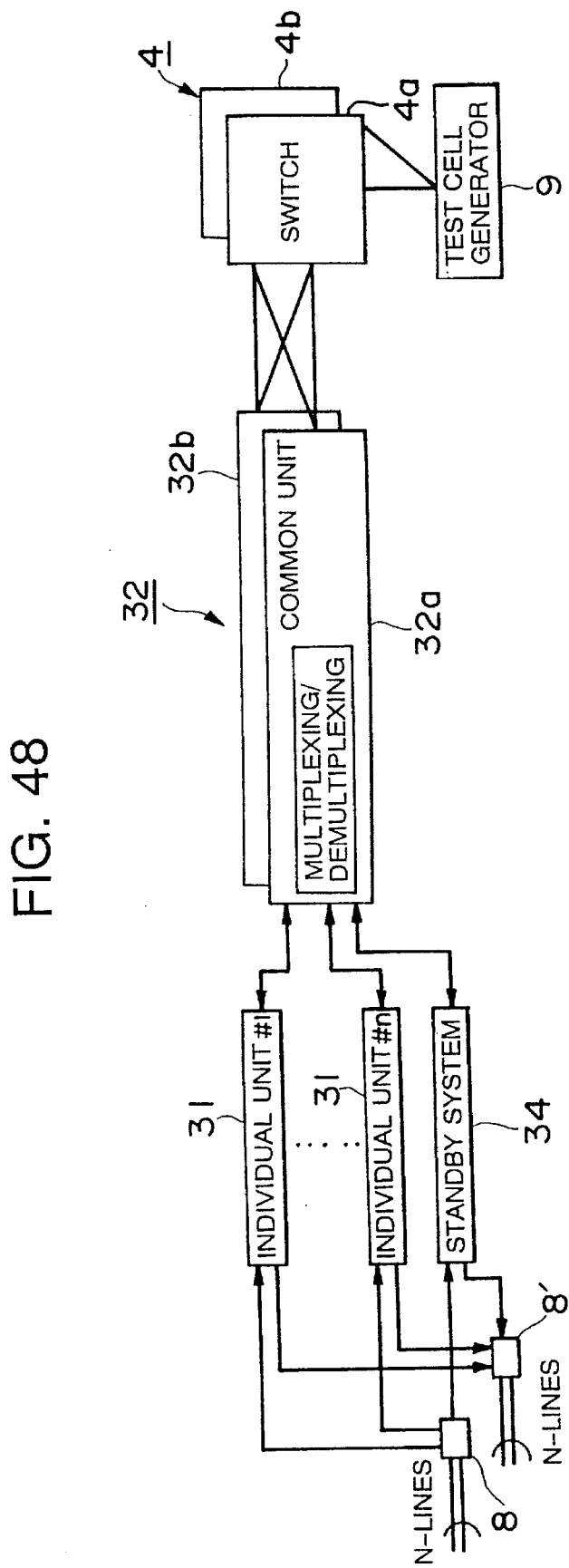
FIG. 48 is a block diagram into which FIG. 46 has been redrawn, wherein a test cell generator is connected to a switch.

With the embodiment 8 configuration, this continuity test can be automatically executed. That is, as shown in FIG. 48, the ATM switching equipment in the embodiment 8 includes a test cell generator 9 for generating and collecting the test cells, this generator 9 being connected to the switch (SW) 4 or the common unit 32 (see FIG. 49).

Figure 49:
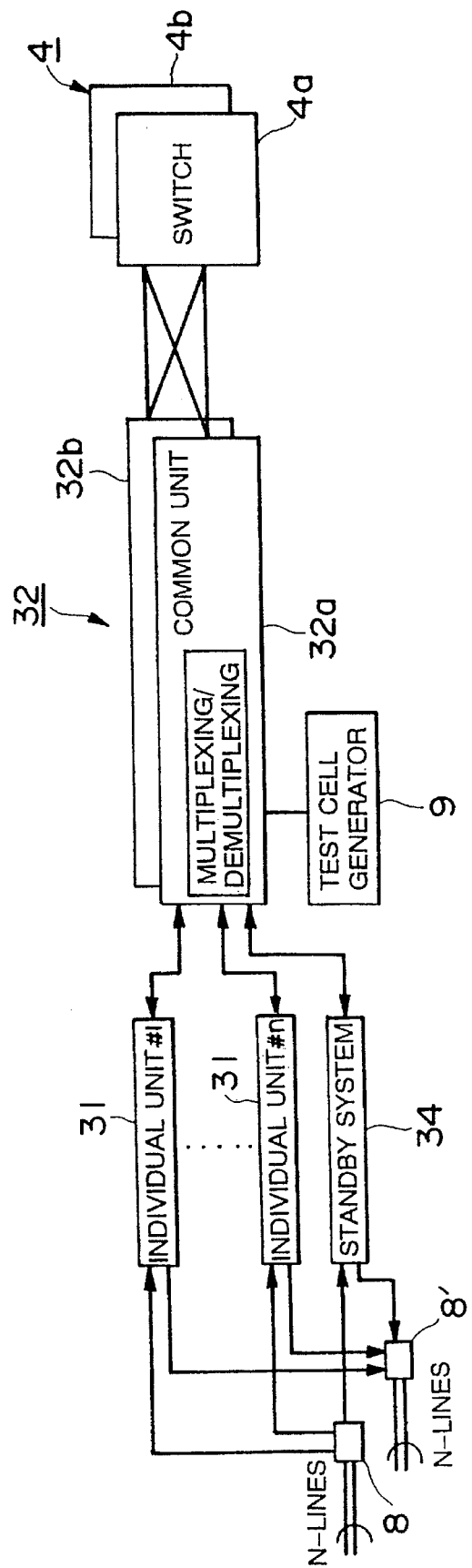
FIG. 49 is a block diagram into which FIG. 46 has been redrawn, wherein the test cell generator is connected to the common unit.

Then, the CPU 6, as will be discussed later, controls this test cell generator 9 to perform the continuity test, thus setting on-line. Note that FIGS. 48 and 49 are redrawn diagrams of FIG. 46, wherein the corresponding constructive elements are marked with the same symbols.

Figure 50:
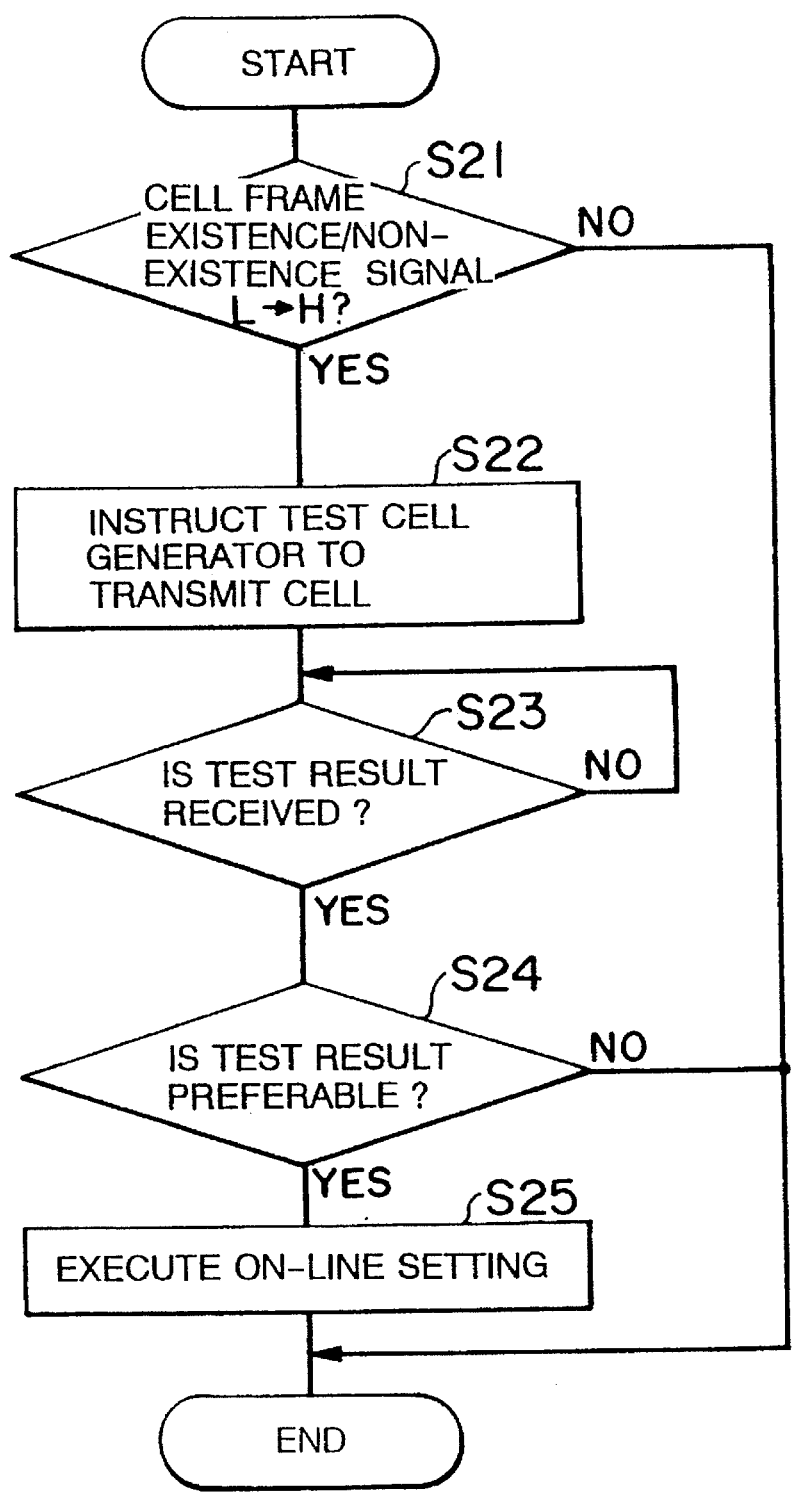
FIG. 50 is a flowchart showing the processing for executing a continuity test in the CPU of FIG. 46.

FIG. 50 shows a flowchart for the processes executed by the CPU 6 on the occasion of this continuity test. The CPU 6, as a result of the processing in FIG. 40, determines that the connection to the called subscriber is impossible, and thereafter, this processing is executed periodically by interrupt processing.

At first, the CPU 6 checks whether or not the cell frame existence/non-existence signal changes from "L" to "H" in step S21. In this case, when mounting the individual unit or the package of the line interface incorporating the normal function, the cell frame existence-non-existence signal immediately becomes "H" owing to the configuration of the cell frame detection circuit 22 shown in FIG. 39.

If no change is seen, the processing comes to an end. If changed, the operation proceeds to step S22. In this step S22, the CPU 6 instructs the test cell generator 9 to transmit the cells.

The test cell generator 9 receiving this instruction transmits the above-structured test cells. The transmitted test cells pass through all the line interfaces in a predetermined route and return to the test cell generator 9. The test cell generator 9 compares the structure of the collected test cell with the structure of the test cell before being transmitted. Then, the test cell generator 9, if some fault is seen, notifies the CPU 6 of a defect but, if no fault is seen, notifies the CPU 6 of being well-conditioned.

The CPU 6, upon receiving a result of this test (step S23), determines whether the test result is satisfactory or not (step S24). Subsequently, if the test result is preferable, the on-line setting is executed, and the individual unit or the package of the newly mounted line interface is incorporated into the system (step S25).

On the other hand, if the test result is not preferable, the processing is finished. Then, there is a waiting period until the individual unit or the package of another line interface is inserted.

The continuity test is executed as described above, thereby making it possible to execute the on-line setting by automatically performing the continuity test. Note that when the test cell generator 9 is, as illustrated in FIG. 49, connected to the common unit 32 itself, the test cell can flow through only the line interface without flowing through the normally functioning switch. The continuity test can be executed for a short time. Further, the test cell may be flow through only the newly inserted individual unit by directly connecting the test cell generator 9 per individual unit 31.

Figure 51:
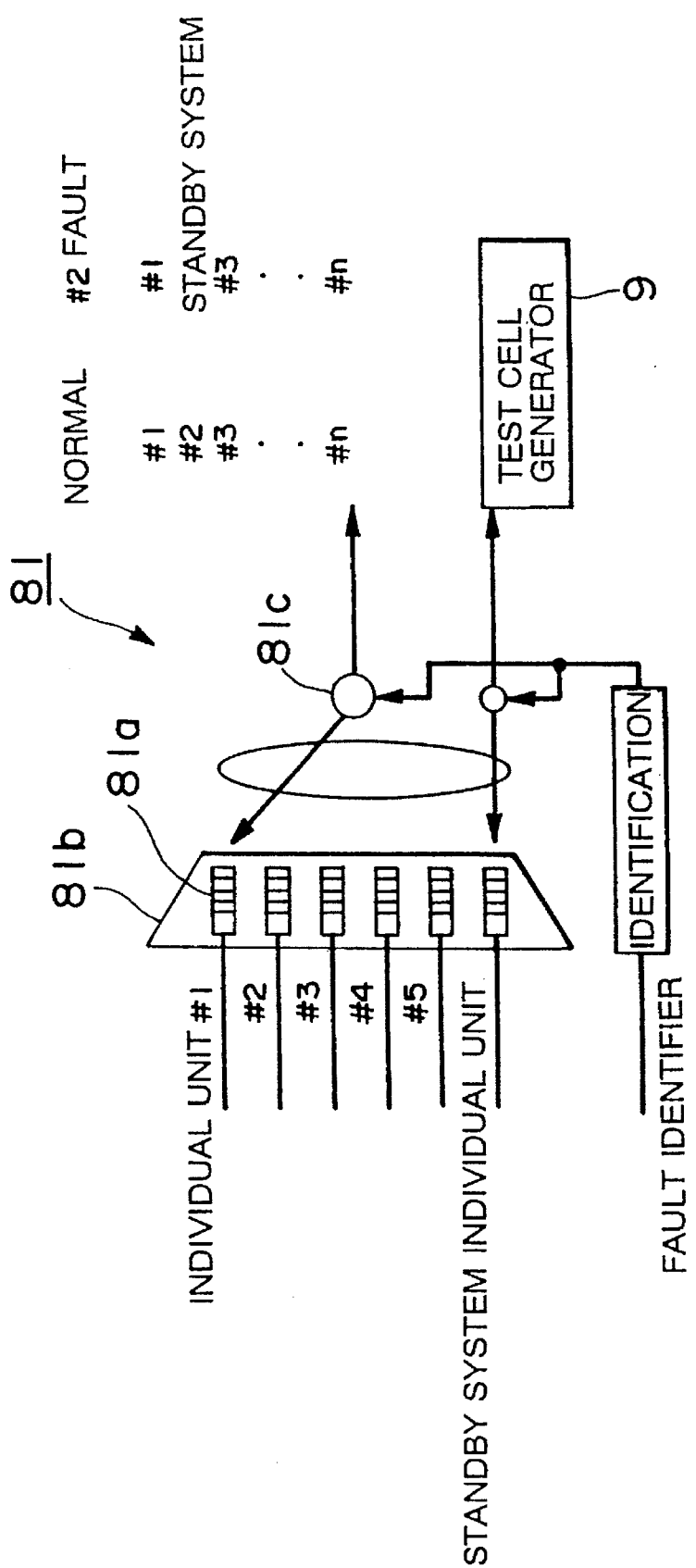
FIG. 51 is a conceptual diagram illustrating the multiplex/demultiplex portion and the test cell generator of FIG. 47.

Note that there will be explained a configuration for generating the test cells at a normal time. FIG. 51 illustrates a configuration of the multiplex/demultiplex portion 81 in such a case. The same constructive elements as those in FIG. 47 are marked with the same symbols. In this instance, the test cell generator 9 is connected to the standby system individual unit 34 at the normal time, thereby checking whether or not this individual unit 34 normally works. Then, if a fault occurs in any active system individual unit 31, the test cell generator 9 is connected to the fault line and performs a test for restoring the fault line.

The configuration for the thus conducted continuity test is applicable not only to the embodiment 8 but also any of the embodiments 5 through 7.

Note that the gist of each of the embodiments discussed above lies in a recognition of the fault when the line interface 3 or the individual unit 31 breaks down. If the fault can be predicted beforehand, however, a replacement thereof can be executed at midnight at which time the usage frequency of the lines seems to be comparatively small.

With this arrangement, it is possible to avoid the inconvenience that the line is blocked during the use of the line by the user. Then, if a manufacturing number and a date of replacement are printed on the package or the individual unit of the line interface, the user can recognize the previous date of replacement thereof.

Further, when the line interface is inserted, the data on the manufacturing number and the date of replacement are inputted through a keyboard and stored in the memory of the CPU 6. Then, when reaching the date of replacement, these items of data are displayed on a display unit, thus notifying the user of the approaching date of replacement. This makes it possible to prevent the fault from happening in the midst of using the line by the user. Note that the memory of the CPU 6 is, e.g., a RAM.

It is apparent that, in this invention, a wide range of different working modes can be formed based on the invention without deviating from the spirit and scope of the invention. This invention is not restricted by its specific working modes except being limited by the appended claims.

What is claimed is:

1. Switching equipment for performing a switching process of a fixed length cell consisting of data and a cell header, said switching equipment comprising:

a line interface for accommodating a plurality of lines and, at the same time, processing cells from each line;

said line interface including:

individual units, respectively connected to the plurality of lines accommodated therein, for individually processing the cells; and a common unit, connected to said individual units, for batch-processing the cells processed by said individual units, said common unit including:

a cell multiplex portion for multiplexing a cell sent from each of said individual units;

a monitoring cell portion for measuring at least one of a cell error characteristic, a cell loss characteristic and a cell delay characteristic by using a monitoring cell;

an alarm transfer cell management portion for managing an alarm transfer cell; and a header converting portion for converting a virtual path identifier and a virtual channel identifier which are written to a cell header into an output destination virtual path identifier and an output destination virtual channel identifier.

2. Switching equipment according to claim 1, wherein each of said individual units includes:

a terminal portion for terminating the line;

a cell synchronous portion, connected to said terminal portion, for effecting cell error control on the basis of header error control data written to said cell header and performing a cell synchronous detection; and an interface portion, connected to said cell synchronous portion, for transferring the cell to said common unit.

3. Switching equipment according to claim 2, wherein said common unit further includes:

a band management portion, connected to said cell multiplex portion, for managing a band that should be used by a subscriber of a subscriber's terminal via the line by monitoring a flow rate of the cells;

said alarm transfer cell management portion being connected to said band management portion;

said monitoring cell portion being connected to said alarm transfer cell management portion;

an accounting portion, connected to said monitoring cell portion, for collecting pieces of accounting data by counting the number of cells;

said header converting portion being connected to said accounting portion; and a control unit for controlling each of said portions of said common unit.

4. Switching equipment according to claim 2, wherein said cell synchronous portion adds an identification flag for identifying a self individual unit to said cell header, and said common unit performs the cell processing for each line on the basis of said identification flag added to said cell header within the cell sent from each of said individual units.

5. Switching equipment according to claim 2, wherein said individual units include identification flag portions, individually connected to said common unit, for generating identification flags for identifying self individual units in synchronism with the cells, and said common unit performs the cell processing for each line on the basis of the identification flags sent from said respective identification flag portions.

6. Switching equipment according to claim 3, further comprising a switching equipment processor connected to said control unit, wherein said switching equipment processor transmits control commands, for controlling said individual units, to said plurality of individual units through said control unit and fault monitoring commands for monitoring faults of said individual units and receives a reply to the command which is transmitted from each of said individual units through said control unit.

7. Switching equipment according to claim 1, wherein the cell in each of said individual units is composed of a data cell in which the data is decomposed to a fixed length, a clock pulse synchronized with said data cell, a cell enable signal indicating whether said data cell is valid or not and a cell frame signal having a bit indicating a heading of said data cell, at least three signal lines are connected for each line between each of said individual units and said common unit, and wherein each of said individual units writes said cell enable signal to said data cell and, at the same time, serially transfers said data cell to said common unit via one single signal line of said three signal lines and transfers said clock pulse and said cell frame signal to said common unit via said other two signal lines.

8. Switching equipment according to claim 7, wherein said cell frame signal indicating the heading of the data cell is employed for indicating whether said data cell is valid or not.

9. Switching equipment according to claim 1, wherein each of said individual, units and said common unit includes real time processing portions for executing said processing of the cells in real time and processing portions for executing said processing on the cells with a predetermined time delay, said processing portion having:

a cell extracting portion for extracting an item of header data and an item of alarm transfer cell data out of the cell;

a cell processing portion for performing a plurality of processes on the basis of said header data and said alarm transfer cell data; and a cell inserting portion for controlling the cell transmitted from said cell extracting portion on the basis of the result of processing by said cell processing portion and, at the same time, inserting said alarm transfer cell data.

10. Switching equipment for performing a switching process of a fixed length cell having data, header data and alarm transfer cell data, said switching equipment comprising:

a line interface for accommodating a plurality of lines and, at the same time, processing cells said line interface including:

a first processing portion for executing the processing of the cell in real times, and a second processing portion, connected to said first processing portion, for executing the processing of the cell with a predetermined time delay;

said second processing portion having:

a cell extracting portion for extracting said header data and said alarm transfer cell data out of the cell;

a cell processing portion for performing a plurality of processes on the basis of said header data and said alarm transfer cell data; and a cell inserting portion for controlling the cell transmitted from said cell extracting portion on the basis of the result of processing by said cell processing portion and, at the same time, inserting said alarm transfer cell data.

11. Switching equipment according to claim 10, wherein said cell processing portion includes:

a band management portion for managing, when the number of cells exceeds a predetermined quantity on the basis of said header data, a using band of a subscriber by giving an indication to dispose of the cells;

a header converting portion for converting a virtual path identifier and a virtual channel identifier within the header data into an output destination virtual path identifier and an output destination channel identifier; and an alarm transfer cell management portion for managing said alarm transfer cell data.

12. Switching equipment according to claim 11 wherein said cell inserting portion disposes of the cells in accordance with the processing by said band management portion, rewrites said header data in accordance with the processing by said header converting portion and inserts said alarm transfer cell data in accordance with the processing by said alarm transfer cell management portion.

13. Switching equipment according to claim 10, wherein said first processing portion is a cell management portion for measuring a cell error characteristic, a cell loss characteristic and a cell delay characteristic by use of a monitoring cell.

14. Switching equipment according to claim 1, wherein each of said individual units includes:

a photoelectric converting portion for converting an optical signal containing data from a subscriber terminal via the line into an electric signal, and a cell synchronous portion, connected to said photoelectric converting portion, for effecting a cell error control on the basis of a header error control data written to the cell header and performing a cell synchronous detection, and wherein said common unit includes:

a conversion table for storing a virtual path identifier written to the cell header per cell and an output destination virtual path identifier in a corresponding relationship, and a header converting portion for converting said virtual path identifier written to the cell header into the output destination virtual path identifier with reference to said conversion table.

15. Switching equipment according to claim 6, wherein said common unit includes a fixed accounting portion for notifying said switching equipment processor of being a fixed accounting subscriber without counting the number of cells.

16. Switching equipment according to claim 3, wherein said common unit uses whole bands given to the line.

17. Switching equipment according to claim 1, wherein said individual units include:

a subscriber individual unit connected to a subscriber's terminal via the line; and a private branch exchange individual unit connected to another subscriber's terminal by the line and by a private branch exchange, wherein each of said subscriber individual units and said private branch exchange individual units includes:

a photoelectric converting portion for converting an optical signal containing data coming from said subscriber's terminal via the line into an electric signal;

a cell synchronous portion, connected to said photoelectric converting portion, for performing cell error control on the basis of header error control data written to the cell header and effecting a cell synchronous detection;

a conversion table for storing a virtual path identifier and a virtual channel identifier that are written to the cell header per cell, an output destination virtual path identifier and an output destination virtual channel identifier in a corresponding relationship; and a header converting portion for converting said virtual path identifier and said virtual channel identifier that are written to the cell header into the output destination virtual path identifier and the output destination virtual channel identifier with reference to said conversion table, and wherein said conversion table provided in said subscriber individual unit stores the virtual path identifiers and the virtual channel identifiers, the number of which is less than the number of the virtual path identifiers and virtual channel identifiers within said conversion table provided in said private branch exchange individual unit.

18. Switching equipment according to claim 17, wherein said header converting portion includes:

a first conversion table for storing internal identifiers for regulating all the virtual channel identifiers when simultaneously using the plurality of virtual paths, corresponding to the virtual path identifier and virtual channel identifier that are written to the cell header per cell; and a second conversion table for storing the output destination virtual path identifiers and the output destination virtual channel identifiers, corresponding to the internal identifiers, and wherein the virtual path identifier and virtual channel identifier that are written to the cell header are converted into the output destination virtual path identifier and the output destination channel identifier with reference to said first and second conversion tables.

19. Switching equipment according to claim 1, wherein said individual units includes:

an active system individual unit, connected respectively to each of a plurality of subscriber's terminals, for generating a fault line identifier when a fault occurs;

at least one standby system individual unit; and a switching portion, connected to each of said active and standby system individual units, for performing a switchover to any standby system individual unit on the basis of the fault line identifier when the fault is caused in any of said active system individual units.

20. Switching equipment according to claim 19, wherein a plurality of optical signals having different wavelengths are employed for distinguishing an upstream direction from a downstream direction of the optical signals between the subscriber's terminal and said active system individual unit, and each of the subscriber's terminals, said active system individual unit and said standby system individual units include a wavelength division multiplex portion for dividing and multiplexing the plurality of said optical signals having said different wavelengths.

21. Switching equipment according to claim 19, wherein said switching portion is constructed of a photocoupler for diverting the optical signals from each of the lines to said active system individual unit corresponding to the line and an optical switch for supplying said standby system individual unit with one optical signal among the optical signals inputted to said photocoupler.

22. Switching equipment according to claim 20, wherein said wavelength division multiplex portion is constructed of a photocoupler composed of two input terminals and two output terminals and an optical isolator, connected to one terminal of said photocoupler, for transmitting the optical signal in only one direction.

23. Switching equipment according to claim 1, wherein said cell is composed of a data cell in which the data is decomposed to a fixed length, a cell enable signal indicating whether said data cell is valid or not and a cell frame signal containing a bit indicating a heading of said data cell, said switching equipment including:

a cell transfer portion, connected to said line interface, for transferring the cell sent from said line interface toward other lines; and a detecting portion, provided in said cell transfer portion, for detecting whether or not the cell is transmitted from said line interface, and wherein said detecting portion detects a change in said cell frame signal added to the cell transmitted from said line interface and detects, when the frame signal does not change for a duration longer than a normal cell periodic time, that the cell is not yet transmitted.

24. Switching equipment according to claim wherein said cell transfer portion is connected to said plurality of line interfaces and includes a header converting portion for converting a header of the data cell and a switch for transferring the cell.

25. Switching equipment according to claim 23, further comprising a cell enable control line for outputting, when said detecting portion detects that the cell is not yet transmitted, the cell enable signal indicating an invalid condition.

26. Switching equipment according to claim 23, further comprising a control unit for blocking, when said detecting portion detects that the cell is not yet transmitted, the line to a subscriber's terminal connected to said cell-untransmitted line interface.

27. Switching equipment according to claim 26, wherein said control unit transmits a signal indicating an unconnectable state back to another subscriber's terminal which calls a destination subscriber's terminal connected to said cell-untransmitted line interface.

28. Switching equipment according to claim 23, further comprising:
   a test cell generating portion for generating test cells;
   a testing portion for collecting said test cells after said test cells have passed through said line interface, checking said test cells and further checking a condition of said line interface on the basis of said test cell checking; and
   a control unit for operating said test cell generating portion and said testing portion, when said detecting portion detects a transmission of the cell after once detecting that the cell is not yet transmitted.

29. Switching equipment according to claim 28, wherein said cell transfer portion further includes a header converting portion for converting a header of the data cell, and
   said test cell generating portion is connected to said header converting portion.

30. Switching equipment according to claim 23, further comprising:
   a standby system line interface connected to said cell transfer portion; and
   a switching portion for connecting, when said detecting portion detects that said line interface does not yet transmit the cell, a subscriber's terminal to said standby system line interface.

31. Switching equipment according to claims 23, wherein said detecting portion detects that the cell is not yet transmitted from said line interface when said line interface is disconnected from said cell transfer portion.

32. Switching equipment according to claim 1, wherein said individual units are composed of a plurality of groups each having a plurality of line individual units provided per line,
   said common unit has a plurality of line common units one more than the number of said plurality of groups, said respective line individual units being connected mutually to said respective line common units, and
   each of said line common units corresponding to the number of the groups among said plurality of line common units selects the plurality of said corresponding line individual units and processes the cells in common, said remaining one line common unit being a standby system common unit employed when a fault occurs in one of said line common units.

33. Switching equipment according to claim 32, wherein each of said plurality of line common units includes a fault notifying portion for notifying all other common units of a fault identification number, when a fault occurs in a self common unit, and
   said remaining single common unit processes the cells from said plurality of corresponding individual units by effecting a switchover to said single common unit itself from said fault common unit on the basis of the fault identification number received from said fault common unit.

34. Switching equipment according to claim 1, wherein said individual units include:
   a synchronous digital hierarchy individual unit for processing the data in a synchronous digital hierarchy format which is transmitted via the lines and, at the same time, generating an identification number indicating said individual unit itself; and
   an asynchronous transfer mode individual unit for processing the data in an asynchronous transfer mode format which is transmitted via the lines and, at the same time, generating an identification number indicating said individual unit itself, and
   wherein said common unit includes:
   a control unit for controlling said synchronous digital hierarchy individual unit and said asynchronous transfer mode individual unit on the basis of the identification numbers received when at least one of said synchronous digital hierarchy individual unit and said asynchronous transfer mode individual unit is connected.

35. Switching equipment according to claim 34, wherein said control unit performs, when identifying said synchronous digital hierarchy individual unit from the identification number, synchronous digital hierarchy physical layer alarm processing but performs asynchronous transfer mode layer alarm processing, when identifying said asynchronous transfer mode individual unit.

36. Switching equipment as claimed in claim 8 wherein said cell enable signal is multiplexed into said cell frame signal whereby said frame signal is high for two bits when said cell is valid and high for one bit when said call is invalid.

37. A line interface for accommodating a plurality of lines and, at the same time, processing cells from each line,
   said line interface comprising:
   individual units, respectively connected to the plurality of lines accommodated therein, for individually processing the cells; and
   a common unit, connected to said individual units, for batch-processing the cells processed by said individual units,
   said common unit comprising:
   a cell multiplex portion for multiplexing a cell sent from each of said individual units;
   a monitoring cell portion for measuring at least one of a cell error characteristic, a cell loss characteristic and a cell delay characteristic by using a monitoring cell;
   an alarm transfer cell management portion for managing an alarm transfer cell; and
   a header converting portion for converting a virtual path identifier and a virtual channel identifier which are written to said cell header into an output destination virtual path identifier and an output destination virtual channel identifier.

38. A line interface as claimed in claim 37, wherein each of said individual units includes:
   a terminal portion for terminating a respective line;
   a cell synchronous portion, connected to said terminal portion, for effecting cell error control on the basis of header error control data written to said cell header and performing a cell synchronous detection; and
   an interface portion, connected to said cell synchronous portion, for transferring the cell to said common unit.

* * * * *